(12) United States Patent
Abe et al.

(10) Patent No.: US 6,507,383 B1
(45) Date of Patent: Jan. 14, 2003

(54) IN-PLANE SWITCHING LIQUID CRYSTAL DISPLAY APPARATUS WITH REDUCED CAPACITANCE BETWEEN PIXEL ELECTRODES AND COMMON ELECTRODES

(75) Inventors: Makoto Abe, Hitachi (JP); Etsuko Nishimura, Hitachiohta (JP); Kikuo Ono, Mobara (JP); Yoshiaki Nakayoshi, Mobara (JP); Masatoshi Wakagi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/582,655
(22) PCT Filed: Mar. 21, 2000
(86) PCT No.: PCT/JP00/01712
§ 371 (c)(1),
(2), (4) Date: Jun. 29, 2001
(87) PCT Pub. No.: WO01/71417
PCT Pub. Date: Sep. 27, 2001

(51) Int. Cl.$^7$ ............................................. G02F 1/1343
(52) U.S. Cl. ........................................ 349/141; 349/138
(58) Field of Search ........................................ 349/141

(56) References Cited

U.S. PATENT DOCUMENTS 6,281,953 B1 * 8/2001 Lee et al. ..................... 349/43

* cited by examiner

Primary Examiner—Toan Ton
Assistant Examiner—Timothy L Rude
(74) Attorney, Agent, or Firm—Antonelli, Terry, Stout, & Kraus, LLP

(57) ABSTRACT

A liquid crystal display unit in which a voltage is applied to a pixel electrode and a common signal electrode constituted by two upper and lower transparent conductive layers having insulation layers disposed therebetween so that a liquid crystal is driven to control display can improve any one or both of reduction of a writing time of the liquid crystal (reduction of a capacitance between the pixel electrode and the common signal electrode) and reduction of a driving voltage of the liquid crystal. An inter-layer insulation layer between the transparent electrodes formed of different layers is constituted by at least one or a laminated structure of a part of a gate insulation layer, a part of a surface protection layer of a thin film transistor and an applied-type insulation layer and insulation layers in an area which is positioned above the lower transparent electrode.

26 Claims, 36 Drawing Sheets (a)

(b)

(a)

(b)

(a)

(b)

(A)

(B)

(C)

(D)

(E)

(F)

(G)

(A)

(B)

(C)

(D)

(E)

(F)

(G)

(a)

(b)

(a)

(b)

(a)

(b)

(a)

(b)

(c)

IN-PLANE SWITCHING LIQUID CRYSTAL DISPLAY APPARATUS WITH REDUCED CAPACITANCE BETWEEN PIXEL ELECTRODES AND COMMON ELECTRODES

TECHNICAL FIELD

The present invention relates to a liquid crystal display unit and more particularly to a structure of a liquid crystal display unit using transparent electrodes as a pixel electrode and/or a common electrode.

BACKGROUND ART

Many liquid crystal display units adopt an active matrix system having a structure including thin film transistors (TFT) as switching elements in a display area in which pixels are provided. The liquid crystal display unit of this kind adopts a structure having a liquid crystal layer disposed between a pair of substrates. TFT elements, a pixel electrode, wiring and electrodes for scanning signals and image signals, terminals for connecting wiring and external driving circuits and the like are formed on one substrate (TFT substrate) and a color filter and an opposite electrode are formed on the other substrate (CF substrate). There is adopted a twisted nematic display system in which a voltage is applied between the pixel electrode on one substrate and the opposite electrode on the other substrate to drive the liquid crystal and control display.

In contrast to the above system, as a system capable of improving a visual field angle or viewing angle and contrast which are problems to be solved in a liquid crystal display unit, JP-A-6-160878 discloses a liquid crystal display unit including a common signal electrode disposed on the TFT substrate instead of the opposite electrode disposed on the substrate on which the color filter is formed and in which a voltage is applied between the pixel electrode in the form of teeth of a comb and the common signal electrode to drive the liquid crystal and control display. The pixel electrode and the common signal electrode may be made of metal for electrodes or wiring or Indium Tin Oxide (ITO) used in a transparent pixel electrode.

As an example in which the ITO electrode is used, S. H. Lee et al. describe in SID '98 DIGEST, p.371 (1998) and SID '99 DIGEST, p.202 (1999) a technique that the pixel electrode and the common signal electrode are constituted by two ITO electrodes constituting upper and lower layers between which an insulation layer is disposed and a width of the pixel electrode in the form of teeth of a comb and the common signal electrode and a distance between the electrodes are made minute to be optimized so that a voltage is applied between the two upper and lower ITO electrodes to drive the liquid crystal.

DISCLOSURE OF THE INVENTION

In the above related art, when driving of the liquid crystal and a manufacturing process are considered, it is understood that there are two problems in regard to the driving of the liquid crystal and two problems in regard to the process due to a cross-sectional structure.

The problems will be described.
(1) Problem of Increasing Writing Time of Voltage to Liquid Crystal In the related art, since the width of the two upper and lower ITO electrodes formed into teeth of a comb and the distance therebetween are made minute to thereby control driving of the liquid crystal, a deviation in alignment of the two upper and lower ITO electrodes in a photolithographic process upon processing of the two upper and lower ITO electrodes and a deviation in processing dimensions produce uneven display characteristic as they are and more particularly scattered brightness. In order to avoid this problem, a method that the lower ITO electrode is formed on a substantially whole surface within a unit pixel area is adopted. Since the lower ITO electrode is formed on the substantially whole surface within the unit pixel area, it is not necessary to consider a deviation in alignment of the upper and lower ITO electrodes. Consequently, scattering of the display characteristic can be reduced.

In the related art, a parasitic capacitance connected in parallel to a liquid crystal layer is newly formed in a portion where the two upper and lower ITO electrodes constituting the pixel electrode and the common signal electrode overlap each other through an inter-layer insulation layer. This parasitic capacitance can be effectively utilized as a capacitance for improving the voltage holding characteristic of the liquid crystal, whereas there causes a problem that a time required until a desired voltage is applied to the liquid crystal layer, that is a writing time of a voltage to the liquid crystal is increased, so that the voltage cannot be applied to the liquid crystal sufficiently, when a voltage is applied between the two upper and lower ITO electrodes.

A method of changing a structure of the insulation layer disposed between the two upper and lower layer ITO electrodes is also one of measures for reducing the parasitic capacitance, although there is a problem that a driving voltage of the liquid crystal is increased as described later.
(2) Problem of Increasing Driving Voltage of Liquid Crystal When a voltage is applied to the liquid crystal, a potential difference applied to the two upper and lower ITO electrodes is utilized, while an insulation layer also exists in the area where the insulation layer does not exist in a conventional structure, that is, the area which is positioned above the lower ITO electrode and where the upper ITO electrode does not exist and the insulation layer forms a capacitance connected in series to the liquid crystal between the two upper and lower ITO electrodes. Accordingly, part of the potential difference applied to the two upper and lower ITO electrodes is absorbed by the capacitance connected in series to the liquid crystal layer. Consequently, it is necessary to apply between the two upper and lower ITO electrodes the potential difference larger than a desired voltage to be applied to the liquid crystal in consideration of a voltage drop.

More particularly, there is a problem that the driving voltage is increased due to the insulation layer. When the driving voltage is increased, the power consumption is increased and the increased power consumption is not suitable to a portable type liquid crystal display unit particularly. Further, when the driving voltage is increased, a cheap low-voltage driver cannot be used and accordingly there is a problem that the liquid crystal display unit cannot be provided cheaply.

In the conventional structure, as methods of reducing the parasitic capacitance connected in parallel to the liquid crystal layer, (1) a method of increasing a thickness of an insulation layer between the two upper and lower ITO electrodes and (2) a method of changing material of the insulation layer and introducing material having a small dielectric constant or adding a new layer are considered. In other words, when the number of insulation layers is n, the dielectric constant of the k-th insulation layer $\epsilon_k$ and the thickness thereof $d_k$ in the portion where the two upper and lower ITO electrodes overlap each other, $S_A$ defined by $$\frac{1}{\sum_{k=1}^{n}\frac{d_k}{\varepsilon_k}}$$

is made small to thereby reduce the parasitic capacitance. In the conventional structure, however, when the parasitic capacitance is reduced, $S_A$ of the insulation layer existing in an area which is positioned above the lower ITO electrode and where the upper ITO electrode does not exist, that is, the insulation layer forming the capacitance connected in series to the liquid crystal layer is also made small to thereby reduce the capacitance connected in series to the liquid crystal layer. Consequently, a voltage drop due to the capacitance connected in series to the liquid crystal is increased to thereby increase the driving voltage of the liquid crystal.

Conversely, in order to reduce the driving voltage of the liquid crystal, when $S_A$ of the insulation layer disposed in an area which is positioned above the lower ITO electrode and where the upper ITO electrode does not exist, that is, the insulation layer forming the capacitance connected in series to the liquid crystal layer is increased, $S_A$ of the inter-layer insulation layer, that is, the insulation layer forming the parasitic capacitance connected in parallel to the liquid crystal layer is also increased, so that the parasitic capacitance is increased in this case. As described above, in the conventional structure, the reduction of the writing voltage to the liquid crystal and the driving voltage of the liquid crystal have the trade-off relation and it is impossible to reduce the capacitance connected in parallel to the liquid crystal and increase the capacitance connected in series to the liquid crystal.

The problem of processing due to the cross-sectional structure is now described.

(3) Problem of Short-Circuit Between Two Upper and Lower Transparent Electrodes

Generally, a silicon nitride layer formed by the CVD method, for example, is used for the insulation layer of TFT elements. For example, Monosilane, ammonia or the like is used as reaction gas and accordingly the atmosphere for forming layers is the atmosphere of reduction plasma containing active hydrogen. Therefore, when the silicon nitride layer is formed on the ITO layers constituting the two upper and lower transparent electrodes, the surface of the ITO layers constituting the transparent conductive layers of oxide is exposed to the atmosphere of reduction plasma. It is known that the ITO surface is reduced depending on the forming condition and the silicon nitride layer is grown on the ITO extraordinarily (Jpn. J. appl. Phys., 32, p.5072 (1993)). Unevenness of the surface of obtained laminated layers becomes remarkable due to the extraordinary growth, and minuteness and insulation characteristics of the silicon nitride layer itself are reduced. The more the flow rate of the reaction gas which is a supply source of active hydrogen and the higher a temperature of a substrate, the more the reaction of the extraordinary growth of the silicon nitride layer is accelerated. However, in order to obtain a good quality silicon nitride layer for a gate insulation layer of a thin film transistor, it is necessary to maintain the temperature of the substrate to be as high a temperature as about 300 degrees and the layer is formed on the condition that the extraordinary growth tends to be generated. Accordingly, the process that the silicon nitride layer is formed on the ITO layer is in a situation that crack, pinhole and coating defect in a peripheral portion of the silicon nitride layer constituting the inter-layer insulation layer tend to be produced.

When the crack, pinhole and coating defect in the peripheral portion are produced in a portion where the two upper and lower ITO electrodes overlap each other, there occurs a problem that an insulation defect is caused between the upper and lower ITO electrodes and the two upper and lower ITO electrodes are short-circuited.

(4) Problem of Melting of Lower Transparent Electrode, Metal Wiring and Metal Electrode Upon Processing of Upper Transparent Electrode Generally, the wet etching method is used for processing of the upper ITO electrode layer. Solution of strong acid such as hydracid bromide, hydrochloric acid, aqua regia (solution of hydrochloric acid and nitric acid), hydrochloric acid solution of ferric chloride is used as an etching liquid. When the upper ITO electrode is processed, the insulation layer formed on the lower ITO electrode serves to protect the lower transparent electrode, although when there is a defective portion such as crack, pinhole and coating defect in the peripheral portion, wet etching solution of the ITO layer permeates the insulation layer through the defective portion. When the surface of the lower ITO electrode is directly exposed to the permeated etching solution, the lower ITO electrode is melted and wiring is broken. Further, there is a possibility that an electrode and wiring of metal disposed in a layer lower than the upper ITO electrode are also corroded due to the same phenomenon.

It is an object of the present invention to provide a panel of a liquid crystal display unit including a pixel electrode PX and a common signal electrode constituted by two upper and lower transparent conductive layers having insulation layers disposed therebetween, which can reduce any one or both of a writing time to a liquid crystal and a driving voltage of the liquid crystal and has excellent numerical aperture and transmission factor.

Further, it is another object of the present invention to provide a structure which can attain reduction of defect such as corrosion and disconnection of an electrode constituted by the transparent conductive layer disposed in the lower layer and an electrode and wiring made of material, caused through a defective portion of the insulation layer when the transparent conductive layer disposed in the upper layer is processed through the insulation layer by etching and reduction of short-circuit defect due to defective insulation of the two upper and lower transparent electrodes and can be fabricated with good yield.

A liquid crystal display unit according to an embodiment 1 of the present invention includes a pair of substrate, a liquid crystal layer disposed between the pair of substrates, a plurality of scanning signal lines, a plurality of image signal lines intersecting the plurality of image signal lines in matrix manner and a plurality of thin film transistors each formed in the vicinity of each intersection between the scanning signal lines and the image signal lines disposed on one (first substrate) of the substrates, a plurality of pixels at least one of which is formed in each area enclosed by the plurality of scanning signal lines and image signal lines and each of which includes a common signal electrode connected across a plurality of pixels and a pixel electrode connected to the thin film transistor corresponding thereto, the common signal electrode and the pixel electrode partially overlapping each other through an inter-layer insulation layer, at least part of each of the pixel electrode and the common signal electrode being constituted by a transparent conductive layer, one of the pixel electrode and the common signal electrode disposed on the side of the liquid crystal layer through an insulation layer being formed into slits or teeth of a comb, and further comprises the following means.

(1) The inter-layer insulation layer includes at least one insulation layer or more except a first insulation layer having function of a gate insulation layer of the thin film transistor and a second insulation layer having function of a surface protection layer of the thin film transistor and at least one insulation layer or more except the surface protection layer of the thin film transistor and the gate insulation layer included in the inter-layer insulation layer is selectively formed in conformity with a second electrode in an area where the second electrode is disposed rather than an area which is positioned above a first electrode of the pixel electrode and the common signal electrode, nearer to the first electrode through the insulation layer and where the second electrode does not exist.

(2) In a structure in which a liquid crystal having $\Delta\in$ of a negative value is used as the liquid crystal layer, when $$\frac{1}{\sum_{k=1}^{n}\frac{d_k}{\varepsilon_k}}$$

is $S_A$ where the number of insulation layers included in the inter-layer insulation layer is n and a dielectric constant of a k-th insulation layer is $\in_k$, a thickness thereof being $d_k$, and $$\frac{1}{\left(\sum_{i=1}^{m}\frac{d_l}{\varepsilon_l}\right)+\frac{\sum_{k=1}^{n}d_k-\sum_{i=1}^{m}d_l}{\varepsilon_{LC}}}$$

(where $m \geq 1$) is $S_B$ where the number of insulation layers disposed between a first orientation layer disposed above a first substrate and a first electrode of the pixel electrode and the common electrode, nearer to the first substrate through insulation layers in an area which is positioned above the first electrode and where a second electrode does not exist is m and a dielectric constant of an insulation layer constituting a first layer is $\in_1$, a thickness thereof being $d_1$, a dielectric constant of a liquid crystal in a vertical direction to a director of the liquid crystal being $\in_{LC}$, $S_A<S_B$ is satisfied.

(3) In a structure in which a liquid crystal having $\Delta\in$ of a positive value is used as the liquid crystal layer, when $$\frac{1}{\sum_{k=1}^{n}\frac{d_k}{\varepsilon_k}}$$

is $S_A$ where the number of insulation layers included in the inter-layer insulation layer is n and a dielectric constant of a k-th insulation layer is $\in_k$, a thickness thereof being $d_k$, and $$\frac{1}{\left(\sum_{i=1}^{m}\frac{d_l}{\varepsilon_l}\right)+\frac{\sum_{k=1}^{n}d_k-\sum_{i=1}^{m}d_l}{\varepsilon_{LC}}}$$

(where $m \geq 1$) is $S_B$ where the number of insulation layers disposed between a first orientation layer disposed above a first substrate and a first electrode of the pixel electrode and the common electrode, nearer to the first substrate through insulation layers in an area which is positioned above the first electrode and where a second electrode does not exist is m and a dielectric constant of an insulation layer constituting a first layer is $\in_1$, a thickness thereof being $d_1$, a dielectric constant of a liquid crystal in the parallel direction to a director of the liquid crystal being $\in_{LC}$, $S_A<S_B$ is satisfied.

(4) In the structure in which a liquid crystal having $\Delta\in$ of a negative value is used as the liquid crystal layer, when $$\frac{1}{\sum_{k=1}^{n}\frac{d_k}{\varepsilon_k}}$$

is $S_A$ where any insulation layer does not exist between the first orientation layer disposed above the first substrate and the first electrode in the area which is positioned above the first electrode of the pixel electrode and the common electrode nearer to the first substrate through the insulation layers and where the second electrode does not exist and the number of insulation layers included the inter-layer insulation layer is n, a dielectric constant of the k-th insulation layer being $\in_k$, a thickness thereof being $d_k$ and $$\frac{\varepsilon_{LC}}{\sum_{k=1}^{n}d_k}$$

is $S_B$ where a dielectric constant of the liquid crystal in the vertical direction to the director of the liquid crystal is $\in_{LC}$, $S_A<S_B$ is satisfied.

(5) In the structure in which a liquid crystal having $\Delta\in$ of a positive value is used as the liquid crystal layer, when $$\frac{1}{\sum_{k=1}^{n}\frac{d_k}{\varepsilon_k}}$$

is $S_A$ where any insulation layer does not exist between the first orientation layer disposed above the first substrate and the first electrode in the area which is positioned above the first electrode of the pixel electrode and the common electrode nearer to the first substrate through the insulation layers and where the second electrode does not exist and the number of insulation layers included the inter-layer insulation layer is n, a dielectric constant of the k-th insulation layer being $\in_k$, a thickness thereof being $d_k$ and $$\frac{\varepsilon_{LC}}{\sum_{k=1}^{n}d_k}$$

is $S_B$ where a dielectric constant of the liquid crystal in the parallel direction to the director of the liquid crystal being $\in_{LC}$, $S_A<S_B$ is satisfied.

With the structures of the above (1) to (5), the trade-off relation between the writing time of a voltage to the liquid crystal and the driving voltage of the liquid crystal which is the problem in the related art structure can be solved. That is, even when any one of the writing time of the voltage to the liquid crystal and the driving voltage of the liquid crystal is improved, the other can ensure the same characteristic as that of the related art structure. Further, a combination of the structures of (1) to (5) can improve oth of the writing time of the voltage to the liquid crystal and the driving voltage of the liquid crystal.

As a method of solving the trade-off relation of the writing time of the voltage to the liquid crystal and the driving voltage, concretely, as described in (1), by adopting the structure that the insulation layer disposed in the area where the upper transparent electrode exists, that is, the insulation layer forming a parasitic capacitance connected in parallel to the liquid crystal layer is not formed in the area which is positioned above the lower transparent electrode and where the upper transparent electrode does not exist, that is, the structure that the insulation layer is selectively formed, the inter-layer insulation layer can be thickened or the structure of the inter-layer insulation layer can be varied to thereby reduce the parasitic capacitance connected in parallel to the liquid crystal layer and change the capacitance connected in series to the liquid crystal layer, so that the trade-off relation of the writing time of the voltage to the liquid crystal and the driving voltage which is the problem in the related art structure can be solved.

Further, with respect to reduction of the driving voltage, as described in (1) to (5), there is adopted the structure that the insulation layer disposed in the area which is positioned above the lower transparent electrode and where the upper transparent electrode does not exist, that is, the insulation layer forming the capacitance connected in series to the liquid crystal is selectively removed rather than the insulation layer between the two upper and lower transparent electrodes in the area where the upper transparent electrode exists, that is, the insulation layer forming the parasitic capacitance connected in parallel to the liquid crystal. Thus, the liquid crystal exists in the area where the insulation layer is selectively removed. In this connection, in order to attain the reduction effect of the driving voltage, $$\frac{\varepsilon_{LC}}{\sum_{i=1}^{j} d_i}$$

where the dielectric constant of the liquid crystal is $\in_{LC}$ must be made larger than $$\frac{1}{\sum_{i=1}^{j} \frac{d_i}{\varepsilon_i}}$$

where the number of insulation layers removed selectively is j and the dielectric constant of an i-th insulation layer is $\in_i$, the thickness thereof being $d_i$. Here, $\in_{LC}$ is the dielectric constant in the parallel direction to the director of the liquid crystal in case of the liquid crystal of $\Delta\in$ having a positive value and $\in_{LC}$ is the dielectric constant in the vertical direction to the director of the liquid crystal in case of the liquid crystal of $\Delta\in$ having a negative value. In other words, it is the dielectric constant as viewed from the lower substrate toward the upper substrate when a voltage is applied to the liquid crystal. Only when the above equation is satisfied, the reduction effect of the driving voltage can be obtained. $\in_{LC}$ of the liquid crystal layer of the liquid crystal display unit generally realized is equal to or larger than 7 and accordingly when it is considered that the selectively formed insulation layer is made of silicon nitride ($\in$=6 to 7), silicon oxide ($\in$=3 to 4) or the like, it may be considered that the insulation layer can be selectively removed to reduce the driving voltage in almost all cases.

Further, as a combination of the above systems, concretely, the inter-layer insulation layer is formed into a laminated structure including a part of the insulation layer having function of a gate insulation layer, a part of the insulation layer having function of a surface protection layer of the thin film transistor, for example, and a new insulation layer other than them and the new insulation layer is selectively formed in the area which is positioned above the lower transparent electrode and where the upper transparent electrode exist rather than the area which is positioned above the lower transparent electrode and where the upper transparent electrode does not exist. Further, the insulation layer used in the related art structure can be selectively formed in the same area as the new insulation layer to thereby realize both of reduction of the driving voltage of the liquid crystal and reduction of the writing time of the voltage to the liquid crystal.

More concrete structures for realizing the structures described above are now described.

(6) In (1) to (5), at least one of the number of layers, a thickness of material forming the layers and a dielectric constant of the material forming the layers is different among the inter-layer insulation layer and insulation layers disposed between the first orientation layer formed above the first substrate and the first electrode in the area which is positioned above the first electrode and where the second electrode does not exist.

(7) In (1) to (6), the inter-layer insulation layer is constituted by a single layer and the single layer is selectively formed in conformity with a shape of the second electrode in a part of an area where the second electrode is disposed rather than the area which is positioned above the first electrode and where the second electrode does not exist.

(8) In (7), the inter-layer insulation layer is a part of a first insulation layer having function of a gate insulation layer of the thin film transistor or a part of a second insulation layer having function of a surface protection layer of the thin film transistor.

(9) In (7), the inter-layer insulation layer is a third insulation layer other than a first insulation layer having function of a gate insulation layer of the thin film transistor or a second insulation layer having function of a surface protection layer of the thin film transistor.

(10) In (1) to (6), the inter-layer insulation layer is constituted by two layers and at least one layer thereof is selectively formed in conformity with a shape of the second electrode in a part of an area where the second electrode is disposed rather than the area which is positioned above the first electrode and where the second electrode does not exist.

(11) In (10), the inter-layer insulation layer is constituted by two layers including a part of a first insulation layer having function of a gate insulation layer of the thin film transistor and a part of a second insulation layer having function of a surface protection layer of the thin film transistor.

(12) In (10), one layer of the inter-layer insulation layers is a part of a first insulation layer having function of a gate insulation layer of the thin film transistor or a part of a second insulation layer having function of a surface protection layer of the thin film transistor and the other is a third insulation layer other than the first and second insulation layers, which is selectively formed in conformity with the shape of the second electrode in the part of the area where the second electrode is disposed rather than the area which is positioned above the first electrode and where the second electrode does not exist.

(13) In (10), one layer of the inter-layer insulation layers is any of a part of a first insulation layer having function of a gate insulation layer of the thin film transistor or a part of a second insulation layer having function of a surface protection layer of the thin film transistor and the other is a fourth insulation layer other than the first and second insulation layers, which is formed in a part of an area except an area for forming a through-hole for connecting the second electrode to other electrode wiring and an area for exposing a terminal.

(14) In (10), the inter-layer insulation layer is constituted by a laminated layer including a third insulation layer other than a first insulation layer having function of a gate insulation layer of the thin film transistor or a second insulation layer having function of a surface protection layer of the thin film transistor, which is selectively formed in conformity with the shape of the second electrode in the part of the area where the second electrode is disposed rather than the area which is positioned above the first electrode and where the second electrode does not exist, and a fourth insulation layer formed in a part of an area except an area for forming a through-hole for connecting the second electrode to other electrode wiring and an area for exposing a terminal.

(15) In (1) to (6), the inter-layer insulation layer is constituted by three or more layers and at least one layer thereof is selectively formed in conformity with a shape of the second electrode in a part of an area where the second electrode is disposed rather than the area which is positioned above the first electrode and where the second electrode does not exist.

(16) In (15), the inter-layer insulation layer includes a part of a first insulation layer having function of a gate insulation layer of the thin film transistor, a part of a second insulation layer having function of a surface protection layer of the thin film transistor, and all of a third insulation layer except the first and second insulation layers, which is selectively formed in conformity with the shape of the second electrode in a part of an area which is positioned above the first electrode and where the second electrode is disposed.

(17) In (15), the inter-layer insulation layer includes a part of a first insulation layer having function of a gate insulation layer of the thin film transistor, a part of a second insulation layer having function of a surface protection layer of the thin film transistor, and all of a fourth electrode except the first and second electrodes, which is formed in a part of an area except an area for forming a through-hole for connecting the second electrode to other electrode wiring and an area for exposing a terminal.

(18) In (15), the inter-layer insulation layer includes at least any one of a part of a first insulation layer having function of a gate insulation layer of the thin film transistor and a part of a second insulation layer having function of a surface protection layer of the thin film transistor, a third insulation layer except the first and second insulation layers, which is selectively formed in conformity with the shape of the second electrode in a part of an area which is positioned above the first electrode and where the second electrode is disposed, and a fourth insulation layer formed in a part of an area except an area for forming a through-hole for connecting the second electrode to other electrode wiring and an area for forming a terminal.

(19) In (1) to (18), when a width of a pattern of the insulation layer selective formed in conformity with the second shape in a part of the area where the second electrode is disposed rather than the area which is positioned above the first electrode and where the second electrode does not exist is $W_{ISO}$ ($\mu$m) and a width of the second electrode and a space between the second electrodes formed into slits or teeth of a comb are $W_{EL}$ ($\mu$m) and $W_{SP}$ ($\mu$m), respectively, $$W_{ISO}-2 \leq W_{EL} \leq W_{ISO}+2$$

$$W_{ISO}>0$$

$$W_{ISO}<W_{EL}+W_{SP}$$

are satisfied.

(20) In (7), (9), (10), (12) to (19), the third and fourth insulation layers are constituted by applied-type insulation layers.

(21) In (20), the applied-type insulation layer is formed by means of printing, spin coat or the like and more particularly the applied-type insulation layer is an insulation layer made of organic resin or Si.

(22) In (21) and (22), the applied-type insulation layer used as the third insulation layer is of photo-image type.

(23) In (20) to (22), the third insulation layer is processed in self-alignment with the second electrode collectively, so that the first area is formed in the second area selectively.

(24) In (20) to (23), a thickness of the third insulation layer is 0.2 $\mu$m to 4.0 $\mu$m.

(25) In (20) to (24), a dielectric constant of the third insulation layer is 1.5 to 6.5.

(26) In (20) and (21), a thickness of the applied-type insulation layer used as the fourth insulation layer is 0.1 $\mu$m to 2 $\mu$m.

(27) When a fifth insulation layer having a dielectric constant equal to or larger than 7.0 is selectively formed in a first area which is positioned above the first electrode and where the second electrode does not exist and a thickness of a fifth insulation layer is $D_A$, a total thickness of insulation layers disposed between a first orientation layer disposed above the first substrate and the first electrode in an area which is positioned above the first electrode and where the second electrode does not exist being $D_B$, a thickness of the inter-layer insulation layer being $D_C$, a thickness of the second electrode being $D_D$, $D_A+D_B \leq D_C+D_D$ is satisfied.

With the structure of the above (27), the driving voltage can be reduced regardless of the dielectric constant of the liquid crystal. The problems in the processes described in the example of the related art can be also solved with this structure at the same time.

In this system, the insulation layer having function of the gate insulation layer and the insulation layer except the surface protection layer of the thin film transistor are newly added and the applied-type insulation layer is applied to the insulation layers. The applied-type insulation layer has function of leveling a step or a difference in level existing in the groundwork by coating and embedding the step when the applied-type insulation layer is coated. In other words, the applied-type insulation layer has function of coating the crack, pinhole and coating defect in a peripheral portion existing in the silicon nitride layer. With this function, a short-circuit defect caused by an insulation defect between the two upper and lower transparent electrodes can be prevented by the applied-type insulation layer formed selectively so as to reduce the parasitic capacitance. Further, by implementing the process of selectively forming the applied-type insulation layer after formation of the upper transparent electrode, even the area which is positioned above the lower transparent electrode and where the upper transparent electrode does not exist can be coated by the applied-type insulation layer upon processing of the upper transparent electrode.

Thus, the crack, pinhole and coating defect in a peripheral portion of the insulation layer existing in the area which is positioned above the lower transparent electrode and where the upper transparent electrode does not exist are also coated with and embedded by the applied-type insulation layer to be protected and accordingly it can be prevented that wet etching solution for the upper transparent electrode permeates lower layers through the defective portion. That is, melting and disconnection of the lower transparent electrode caused upon processing of the upper transparent electrode can be prevented. Further, corrosion and disconnection of electrodes and wiring made of metal can be also prevented by the same effect.

Moreover, even when the process of selectively forming the applied-type insulation layer is implemented before formation of the upper transparent electrode, a part of the applied-type insulation layer is left in the area requiring the coating protection in the portion where the upper transparent electrode does not exist or the applied-type insulation layer made of different material and different from the selectively formed applied-type insulation layer is added to be formed in the area for forming a through-hole for connecting the upper transparent electrode to other electrode wiring and the area except a portion for exposing a terminal and which requires the coating protection, to thereby solve the above problems.

BEST MODE FOR CARRYING OUT THE INVENTION

Figure 34:
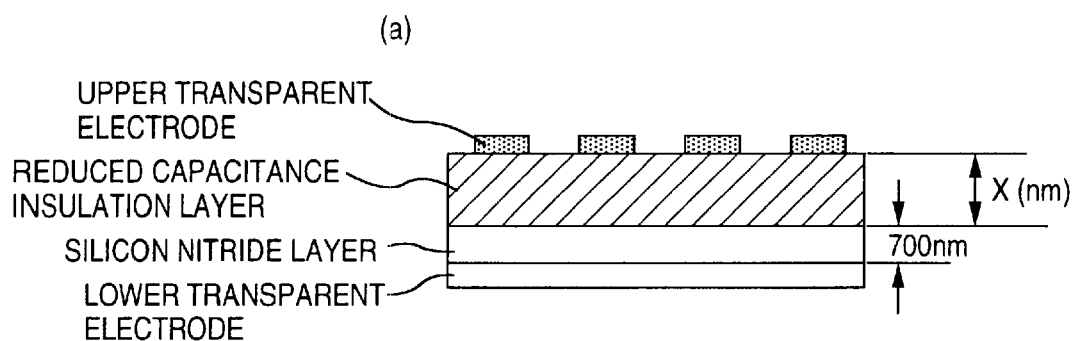
FIG. 34 shows an effect of reduced capacitance in case where a reduced capacitance insulation layer is added newly to the insulation layer existing between two upper and lower transparent electrodes.
Figure 34:
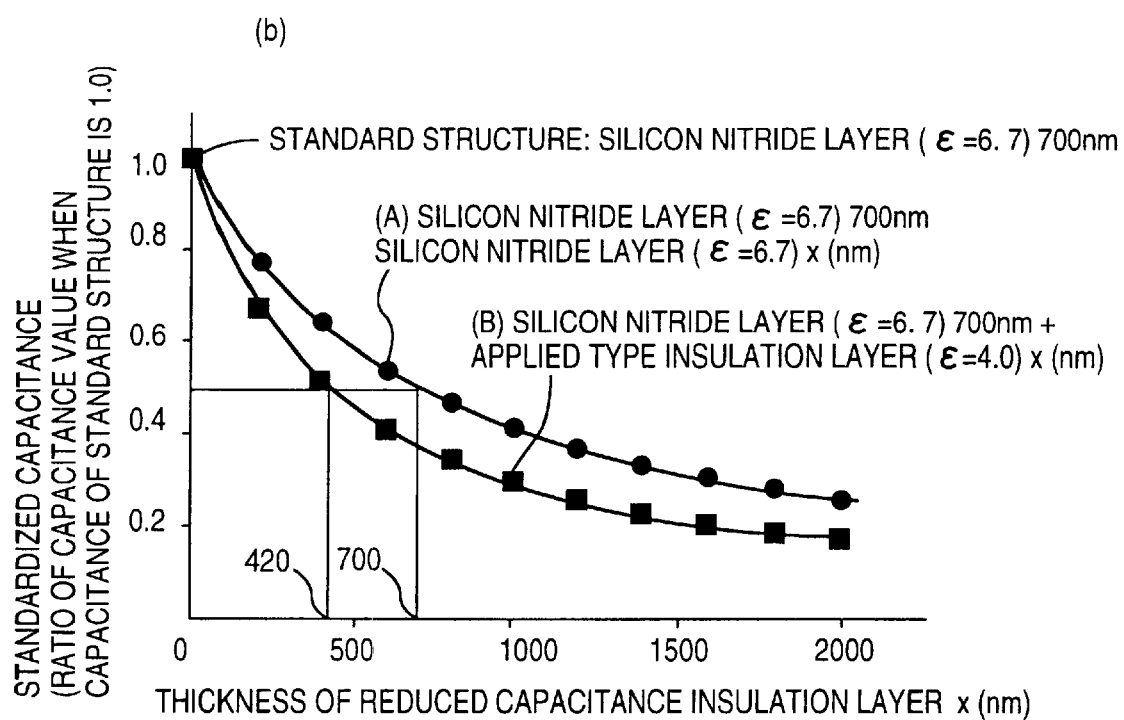
Figure 35:
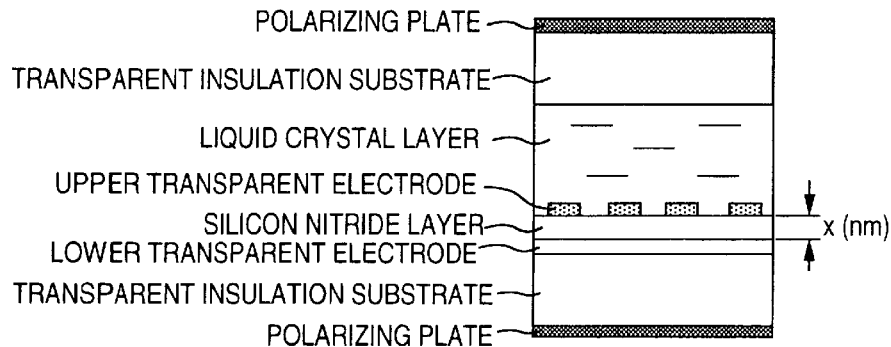
FIG. 35 shows an effect of a reduced driving voltage of the liquid crystal in case where a structure of an insulation layer (thickness of layer) disposed in an area which is positioned above a lower transparent electrode and where an upper transparent electrode does not exist is changed.
Figure 35:
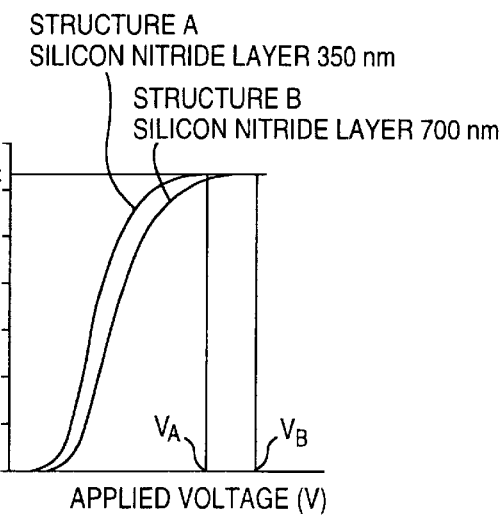
Figure 35:
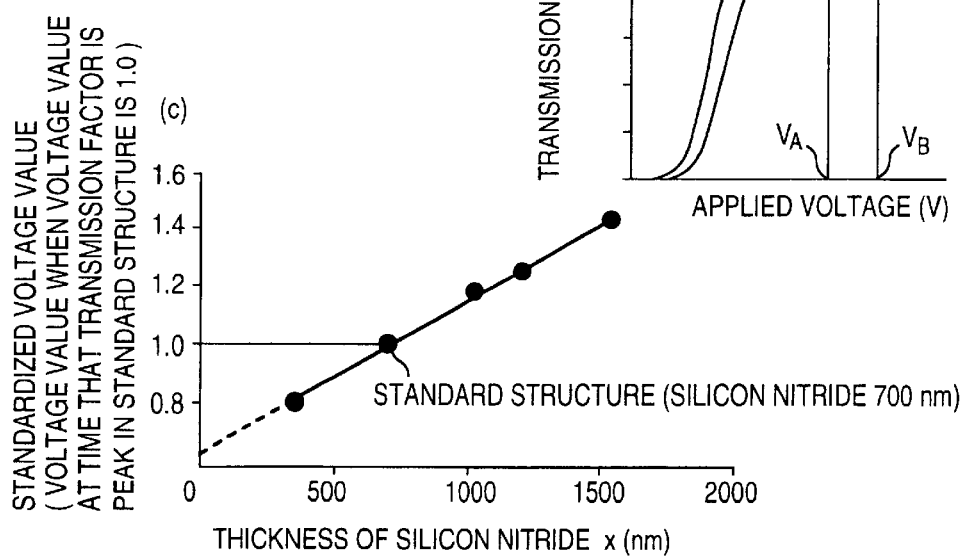
Figure 36:
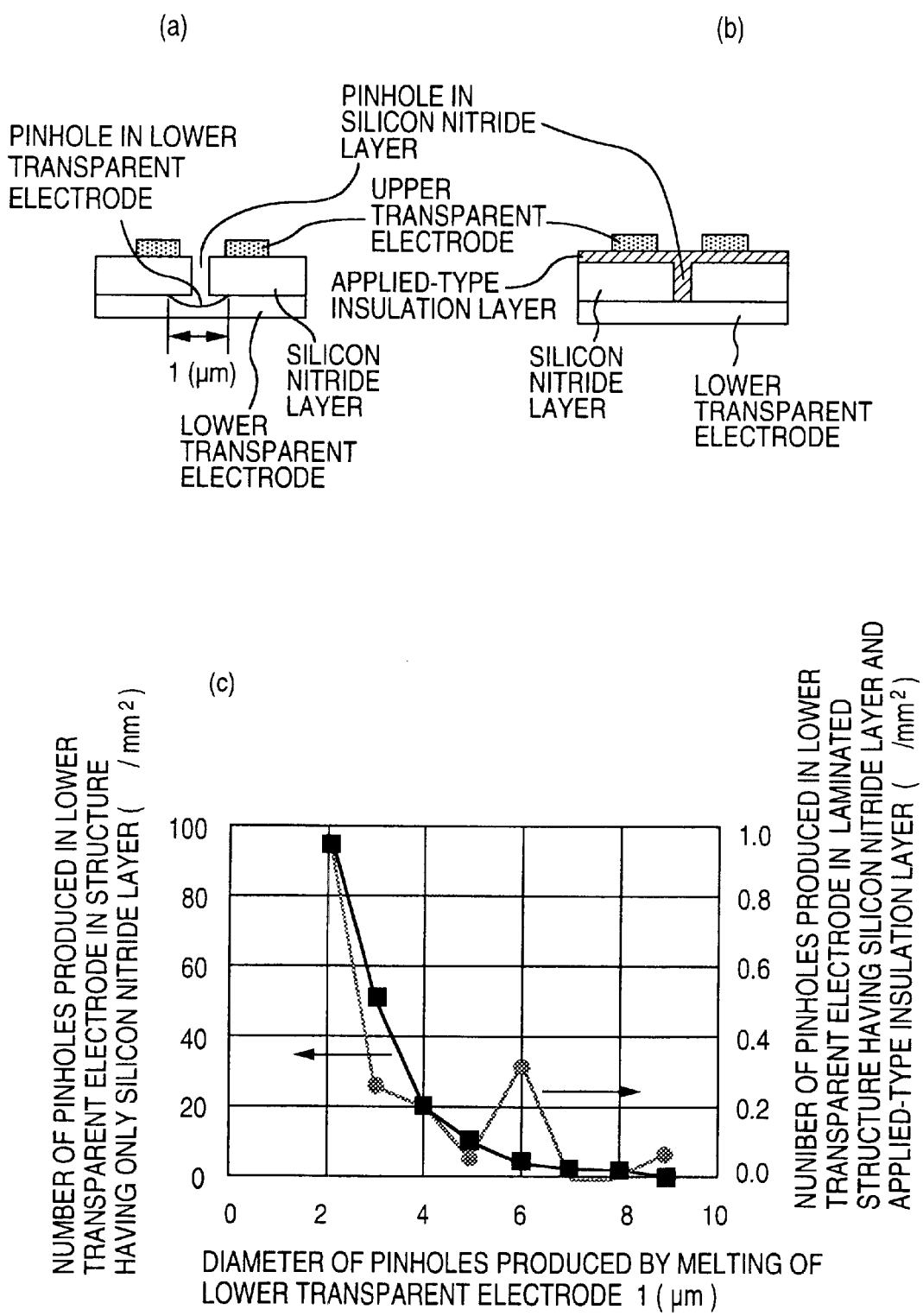
FIG. 36 shows the redundancy effect of processing by coating and embedding a defective portion of an insulation layer in case where an applied-type insulation layer is disposed between upper and lower transparent electrodes.

Referring now to FIGS. 34, 35 and 36, the principle of the present invention is described before definite embodiments are described.

In description of FIGS. 34 to 36, an example of the above-mentioned related art structure is assumed as a standard structure and effects of the present invention are verified by comparison. Concretely, the standard structure is structured so that an upper transparent electrode is processed to be formed into slits or teeth of a comb on a glass substrate and a lower transparent electrode is formed on a substantially whole surface within a unit pixel area and is not formed into a pattern of slits or teeth of a comb. Further, a width of the upper transparent electrode and a space therebetween are fixed. A silicon nitride layer (dielectric constants ∈=6.7) is used as an insulation layer between two upper and lower transparent electrodes and a thickness thereof is set to 700 nm. The silicon nitride layer formed between the two transparent electrodes is formed even in an area which is positioned above the lower transparent electrode and where the upper transparent electrode does not exists. This structure corresponds to a structure of FIG. 34(a) where x is equal to 0 and a structure of FIG. 35(a) where x=700 nm.

First of all, referring to FIG. 34, the effect of a reduced capacitance in case where one insulation layer (reduced capacitance insulation layer) for reducing a capacitance is newly added to the standard structure which is the related art structure is described.

FIG. 34(a) shows a structure used for studying the effect of the reduced capacitance insulation layer. The reduced capacitance insulation layer mentioned here is different from a silicon nitride layer having a thickness of 700 nm which is an insulation layer existing in the standard structure as shown in FIG. 34(a) and is an insulation layer which is newly added between two upper and lower transparent layers. Further, a standardized parasitic capacitance is defined as a ratio of a parasitic capacitance value of each structure to a parasitic capacitance value of the standard structure.

FIG. 34(b) is a diagram showing change of the standardized parasitic capacitance versus a thickness x of the reduced capacitance insulation layer. Material of the reduced capacitance insulation layer is used as a parameter. Concretely, as the reduced capacitance insulation layer, a case (A) where silicon nitride (∈=6.7) is applied and a case (B) where an applied-type insulation layer (∈=4.0) constituted by organic material is applied are shown.

It is understood from FIG. 34(b) that the silicon nitride (A) and the applied-type insulation layer (B) applied as the reduced capacitance insulation layer are required to be 700 nm and 420 nm in thickness, respectively, in order to reduce the parasitic capacitance value to a half as compared with the standard structure in each structure, that is, in order to make the standardized capacitance value equal to 0.5. The difference of the thickness is dependent on the dielectric constant ∈ of the reduced capacitance insulation layer and the applied-type insulation layer having the smaller dielectric constant can obtain the effect of the reduced parasitic capacitance with thinner thickness. Further, it is understood that the single insulation layer constituting the reduced capacitance insulation layer of (A) and (B) can be added to thereby reduce the parasitic capacitance, that is, a writing time of a voltage to the liquid crystal although there is a difference in the effect.

The effect of the reduced parasitic capacitance is not almost dependent on the structure of the insulation layer in an area which is positioned above the lower transparent electrode and where the upper transparent electrode does not exist, that is, the structure of the insulation layer in an area for forming a capacitance connected in series to the liquid crystal layer when the liquid crystal display unit is structured (thickness of the reduced capacitance insulation layer in this verification) but is dependent on the structure of the insulation layer disposed in an area which is positioned above the lower transparent electrode and where the upper transparent electrode exists, that is, the insulation layer in an area where the parasitic capacitance connected in parallel to the liquid crystal layer is formed when the liquid crystal display unit is structured (thickness of the reduced capacitance insulation layer in this verification).

On the other hand, when a deposited layer is used as the reduced capacitance insulation layer as in the silicon nitride layer of (A), the plasma CVD method or the like is used to form the silicon nitride layer, for example. Accordingly, there occurs a new problem that it takes a time to form the layer as a thickness of the layer is increased, so that the throughput is reduced. On the contrary, when the applied-type insulation layer of (B) is used as the reduced capacitance insulation layer, the spin coat method or the like is used to form the applied-type insulation layer, for example. In the spin coat method, since the viscosity of material is adjusted to control the thickness, there is a merit that the throughput is not almost changed for the thickness differently from the deposit type CVD method.

From the above description, as the method of reducing the parasitic capacitance, that is, the method of reducing the writing time of a voltage to the liquid crystal, it is understood that it is more desirable to use, as the reduced capacitance insulation layer, the applied-type insulation layer having the small dielectric constant, the small thickness and the unchangeable throughput for increased thickness and obtaining the effect of the reduced parasitic capacitance.

Referring now to FIG. 35, the effect of a reduced driving voltage of the liquid crystal in case where a structure of the insulation layer is changed in the standard structure which is the related art structure is described.

FIG. 35(a) is a diagram showing a structure used to verify the effect of the reduced driving voltage. FIG. 35(b) is a diagram showing an example of change of the transmission factor versus a voltage applied between two upper and lower transparent electrodes in the structure shown in FIG. 35(a).

In the structure shown in FIG. 35(a), when a voltage is applied between the two upper and lower transparent electrodes, the liquid crystal layer exhibits optical characteristics different in accordance with the applied voltage therebetween and the transmission factor is changed. At this time, the transmission factor to the voltage applied between the two upper and lower transparent electrodes is as shown in FIG. 35(b). Since a liquid crystal which is normally black is used as the liquid crystal, the transmission factor is substantially 0 when the applied voltage is 0 volt. As the applied voltage is increased, the transmission factor is gradually increased and when the applied voltage reaches a fixed voltage, for example, $V_A$ for the structure A and $V_B$ for the structure B, the transmission factor reaches a peak $T_{max}$. Since the liquid crystal is driven by the voltage from 0 volt to the voltage exhibiting the peak transmission factor, the driving voltage of the liquid crystal can be reduced by lowering the voltage exhibiting the peak transmission factor. The structures A and B are different with respect to the thickness of the silicon nitride layer disposed between the two upper and lower transparent electrodes. The thickness x of the silicon nitride layer is 350 nm for the structure A and the thickness thereof is 700 nm in the standard structure for the structure B. As compared with the two structures with regard to the applied voltage versus transmission factor characteristic, it is understood that the peak values of the transmission factor are substantially the same value while the voltage value at the time that the transmission factor is the peak value in the structure B is 1.25 times larger than the applied voltage in the structure A. This is due to a difference of thickness of the insulation layer disposed in the area which is positioned above the lower transparent electrode and where the upper transparent electrode does not exist, that is, the insulation layer constituting the capacitance connected in series to the liquid crystal layer, as described above. The reason is that the capacitance in the structure that the thickness of the silicon nitride layer is thicker is made smaller and accordingly a large voltage drop is produced in the case of the structure B, so that the voltage cannot be applied to the liquid crystal effectively by the voltage drop. The voltage value at the time that the transmission factor is the peak value does not almost depend on the structure of the insulation layer in the area which is positioned above the lower transparent electrode and where the upper transparent electrode exists, that is, the structure of the insulation layer in the area where the parasitic capacitance connected in parallel to the liquid crystal layer is formed, which corresponds to the thickness of the insulation layer in this verification.

FIG. 35(c) is a diagram showing change of the standardized voltage versus the thickness x when the silicon nitride layer is used as the insulation layer disposed between the two upper and lower transparent electrodes. The standardized voltage is defined as a ratio of the voltage value at the time that the transmission factor is the peak value in each structure to the voltage value at the time that the transmission factor is the peak value in the standard structure.

The capacitance connected in series to the liquid crystal layer becomes smaller as the thickness is made smaller. Accordingly, it is understood that the voltage drop is increased so that the voltage value at the time the transmission factor is the peak value is increased linearly.

On the other hand, it is understood that the applied voltage is reduced linearly in the structure that the thickness of the insulation layer is made smaller as compared with the standard structure. When the insulation layer is made thinner gradually, the voltage value at the time that the transmission factor is the peak value is gradually reduced as shown by solid line of FIG. 35(c). Although realization is impossible in the structure shown in FIG. 35(a), it is understood that the voltage at the time that the transmission factor is the peak value can be made to be about 0.6 times that in the standard structure when the thickness is equal to 0. That is, in the structure used in this verification, it is understood that it is desirable to form the insulation layer disposed between the two upper and lower transparent electrodes as thin as possible with regard to the voltage at the time that the transmission factor is the peak value.

Further, in FIG. 35, the silicon nitride having the dielectric constant of 6.7 as an example is used for the insulation layer between the two upper and lower transparent conductive layers, while when the applied-type insulation layer ($\in$=4.0) constituted by organic material, for example, having the dielectric constant smaller than that of the silicon nitride layer is used, it is easily conjectured that the slope of the straight line shown in FIG. 35(c) is further increased and the voltage at the time that the transmission factor is the peak value is increased.

According to the foregoing two views verified by the Inventor, by adopting the structure of the present invention, more particularly, by adopting the structure in which the insulation layer for reducing the capacitance is newly disposed only between the two upper and lower transparent electrodes in the area where the upper transparent electrode exists and the insulation layer is not disposed in the area which is positioned above the lower transparent electrode and where the upper transparent electrode does not exist, it is understood that both of reduction of the driving voltage of the liquid crystal and reduction of the writing time of voltage to the liquid crystal by the reduced capacitance as compared with the related art structure can be attained.

The redundancy effect in processing in case where the applied-type insulation layer of the present invention is added between the two upper and lower transparent electrodes is now described.

FIGS. 36(a) and (b) show structures used to verify the coating and embedding effect of the applied-type insulation layer and FIG. 36(c) is a diagram for comparing the number of pinholes produced by melting the lower transparent electrode due to permeation of the etching solution caused through defective portions in the inter-layer insulation layer upon processing of the upper transparent electrode in case where the applied-type insulation layer is disposed between the two upper and lower transparent electrodes and in case where the insulation layer is not disposed therebetween. In FIG. 36(c), the abscissa axis shows a diameter of produced pinholes and the ordinate axis shows the number of produced pinholes per unit area.

In this verification, there are adopted two structures, one (a) of which includes only a silicon nitride layer as the insulation layer disposed above the lower transparent electrode and the other (b) includes a laminated structure of a silicon nitride layer and an applied-type insulation layer as the insulation layer. Results in case where the upper transparent electrode is processed in the two structures are verified. It will be understood at a look that the number of pinholes produced in the structure (b) having the laminated structure of the silicon nitride layer and the applied-type insulation layer can be reduced to about one hundredth as compared with the structure (a) including only the silicon nitride layer. This reason is that pinhole, crack or peripheral defect of lower-layer step getting-over portions produced in the silicon nitride layer is embedded by the applied-type insulation layer to be coated as shown in FIG. 36(*b*).

According to the present invention, it is understood from the foregoing description that the applied-type insulation layer can be formed in the inter-layer insulation layer between the two upper and lower transparent electrodes to thereby embed pinholes, crack and peripheral defect of the lower-layer step getting-over portion produced in the silicon nitride layer and repair them by means of the coating effect, so that melting or disconnection of the lower transparent electrode produced upon processing of the upper transparent electrode can be reduced greatly and the yield can be improved largely. Similarly, wiring, electrodes and the like of metal disposed below the upper transparent electrode can be also prevented from being corroded or melted.

Further, it is needless to say that short-circuit defect due to insulation defect of the two upper and lower transparent electrodes can be also reduced by coating the above-mentioned defective portions of the silicon nitride.

The definite embodiments of the present invention are now described on the basis of the foregoing views with reference to the accompanying drawings.

Embodiment 1

Referring now to FIGS. 1 to 10, a first embodiment of the present invention is described.

In FIGS. 1 to 10, SUB1 represents a transparent insulation substrate on which thin film transistors are disposed, TFT a thin film transistor which is a switching transistor for a pixel, CL a common signal line, CE a common signal electrode, GE a scanning signal electrode, GL a scanning signal line, SI a semiconductor layer, SD an image signal electrode constituting a source/drain electrode of the thin film transistor, DL an image signal line, PX a pixel electrode, GI a gate insulation layer of the TFT, PAS a surface protection layer of the thin film transistor, NSI an electrode constituted by a silicon layer doped with an impurity such as phosphorus in order to insure contact of the semiconductor layer and the source/drain electrode of the thin film transistor, TH a through-hole, OIL1 an applied-type insulation layer formed selectively in order to reduce a capacitance, BM a light blocking pattern, CF a color filter, OC an overcoat layer, and SUB2 a transparent insulation substrate disposed on the color filter side. Further, ORI1 and 2 represent orientation layers, POL1 and 2 polarizing plates, GTM a terminal for scanning signal line, DTM a terminal for image signal line, CTM a terminal for common signal line, CB a bus line for common signal line, SL seal material, TC1 a pad electrode for the scanning signal line and common signal line terminal, and TC2 a pad electrode for the image signal line terminal DTM.

Figure 1:
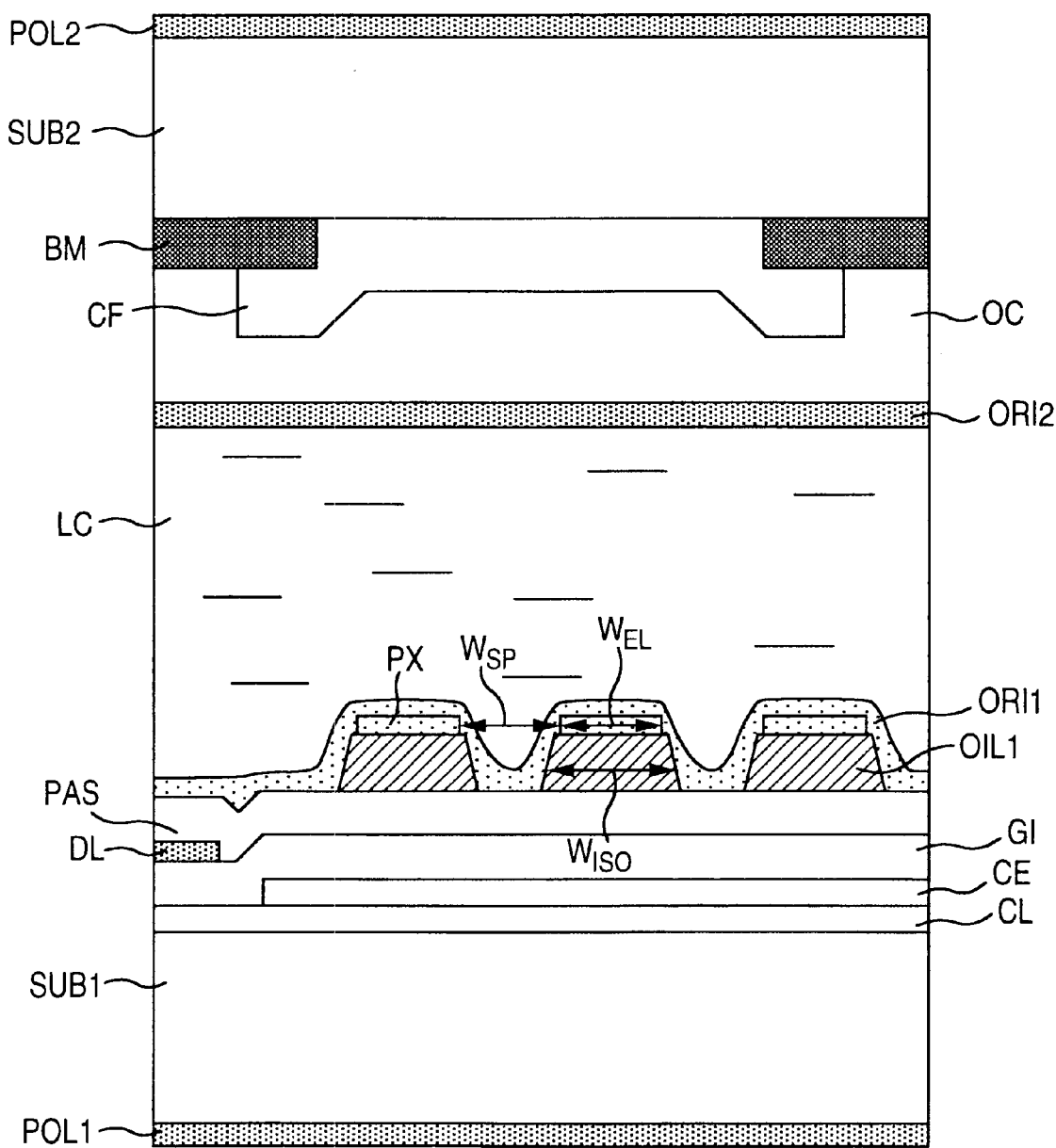
FIG. 1 is a cross-sectional view, taken along line shown by A–A' of FIG. 2 described below, of an active matrix type liquid crystal unit showing a first embodiment of the present invention.
Figure 2:
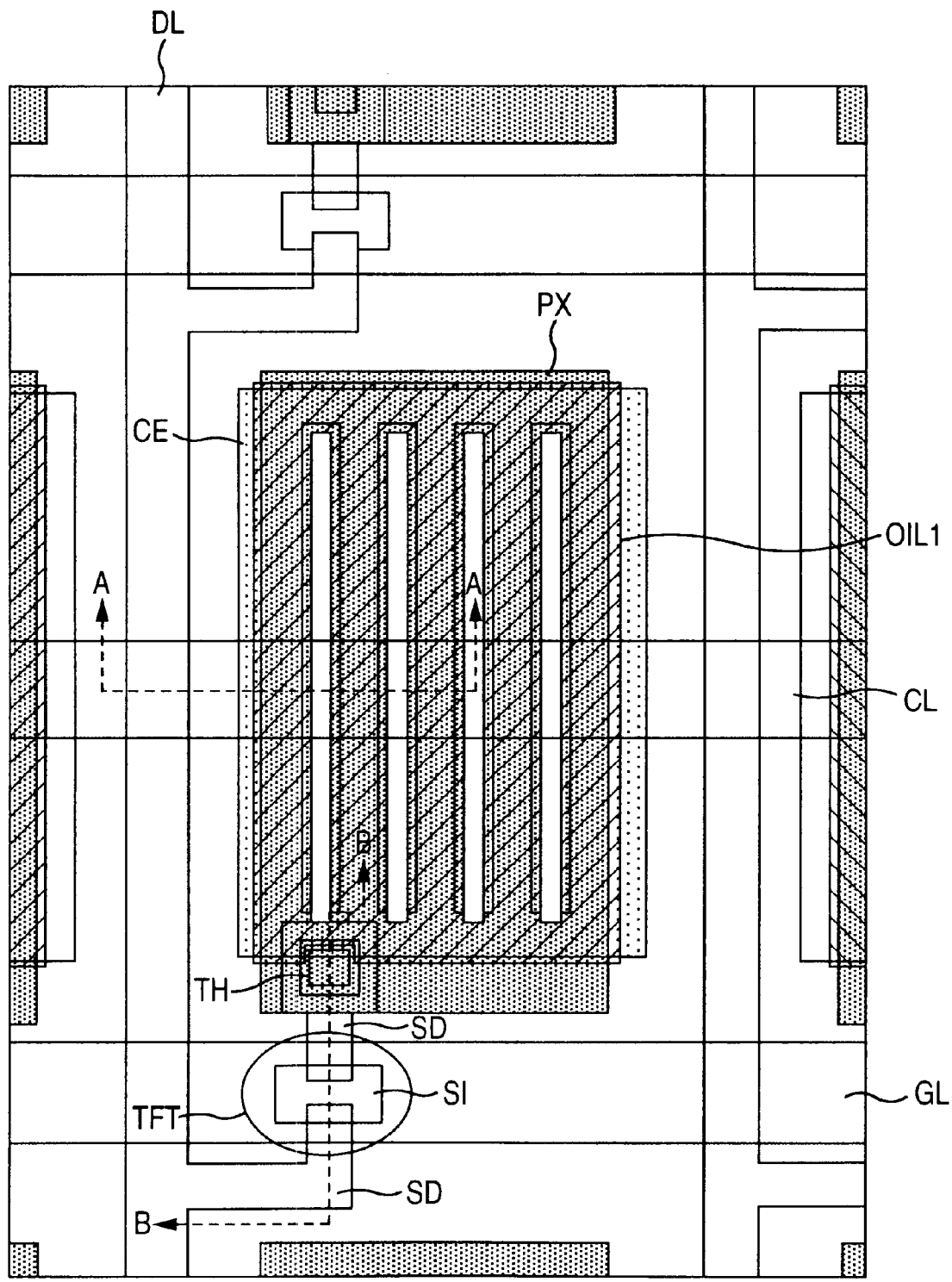
FIG. 2 is a plan view showing a surface on a transparent insulation substrate on which a thin film transistor for a unit pixel is disposed, of the active matrix type liquid crystal display unit showing the first embodiment of the present invention.
Figure 3:
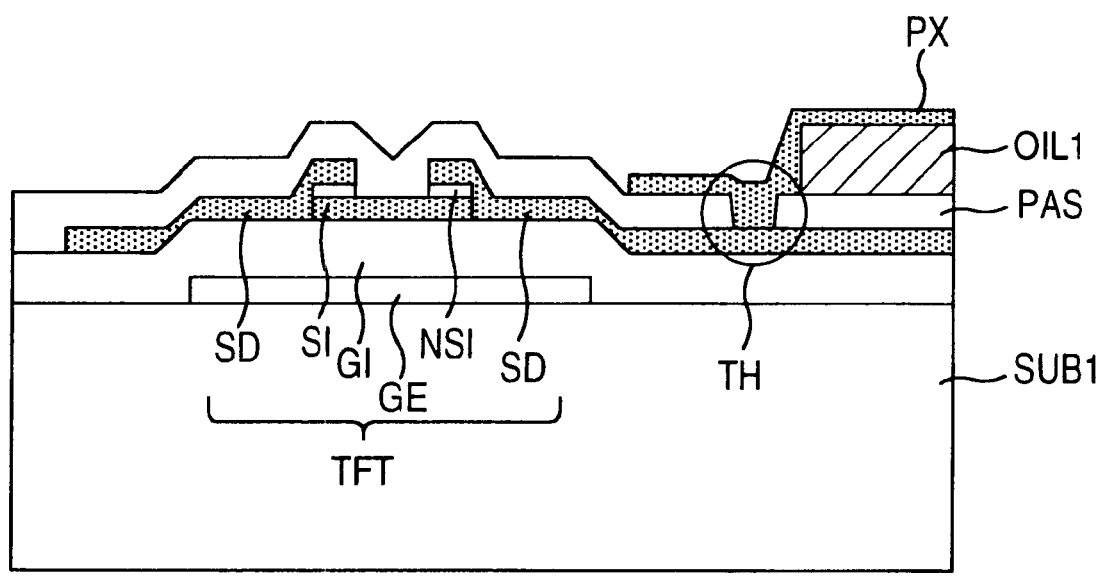
FIG. 3 is a cross-sectional view, taken along line shown by B–B' of FIG. 2, of the transparent insulation substrate on which the thin film transistor is disposed.

FIG. 1 is a cross sectional view, taken along line shown by A–A' of FIG. 2 described later, of an active matrix type liquid crystal display unit showing the first embodiment of the present invention. FIG. 2 is a plan view showing a surface of the transparent insulation substrate SUB1 on which a thin film transistor for a unit pixel is disposed, of the active matrix type liquid crystal display unit showing the first embodiment of the present invention. FIG. 3 is a cross-sectional view, taken along line shown by B–B' of FIG. 2, of the transparent insulation substrate SUB1 on which the thin film transistor is disposed.

The transparent insulation substrate SUB1 on which the thin film transistor TFT is disposed is named a TFT substrate and the transparent insulation substrate SUB2 disposed opposite to the TFT substrate through a liquid crystal layer LC is named a CF substrate. As shown in FIG. 1, the light blocking pattern BM is formed on a surface of the CF substrate on the side of the liquid crystal layer LC so as to define each pixel area and the color filter CF is formed on an opening of the light blocking pattern for determining a substantial pixel area. The overcoat layer OC made of resin, for example, is formed to cover the color filter CF and the orientation layer ORI1 is formed on the overcoat layer OC. Polarizing plates POL1 and 2 are formed on the outer surfaces of the TFT substrate and the CF substrate (surfaces opposite to the surface disposed on the side of the liquid crystal layer LC).

In the first embodiment, inter-layer insulation layers disposed between the gate insulation layer GI and the common signal electrode CE constituted by the two upper and lower transparent conductive layers are constituted by laminated layers including the gate insulation layer GI, the surface protection layer PAS of the thin film transistor, and the applied-type insulation layer OIL1 of the present invention.

According to the embodiment, the applied-type insulation layer OIL1 is selectively formed in conformity with a shape of the pixel electrode PX in an area which is positioned above the common signal electrode CE and where the pixel electrodes PX exist, so that a parasitic capacitance formed between the common signal electrode CE and the pixel electrode PX and connected in parallel to the liquid crystal layer LC can be reduced without increase of a driving voltage of the liquid crystal. For example, when the applied-type insulation layer OIL1 is formed by using material having the dielectric constant of 4.0 and has a thickness of 1.0 $\mu$m, the parasitic capacitance between the two upper and lower transparent electrodes is reduced to about one third as compared with the case where the applied-type insulation layer OIL1 is not formed. Consequently, a writing time of a voltage to the liquid crystal can be also shortened to about one third while being substantially proportional to the reduction of the parasitic capacitance. Consequently, a liquid crystal panel having high quality of image can be provided without reduction of image quality due to shortage of writing of voltage to the liquid crystal. Further, as described above, the insulation layer disposed in the area which is positioned above the common signal electrode CE and where the pixel electrode PX does not exist becomes a factor causing a voltage drop, while in the embodiment since the applied-type insulation layer OIL1 is formed selectively, it is structured that the applied-type insulation layer OIL1 does not exist in the area which is positioned above the common signal electrode CE and where the pixel electrode PX does not exist except an overflowed applied-type insulation layer OIL1. Accordingly, the insulation layer which is the factor causing the voltage drop is not increased. Therefore, it can be prevented to increase the driving voltage.

Further, according to the embodiment, crack, pinhole and coating defect in a peripheral portion of the silicon nitride layer can be coated by the coating effect of the applied-type insulation layer OIL1, so that the short-circuit defects caused by the insulation defect of the two upper and lower transparent electrodes can be prevented.

In the embodiment, as shown in FIG. 2, the single thin film transistor TFT, the single pixel electrode PX and the single common signal electrode CE are formed in the area sectioned by the scanning signal lines GL and the image signal lines DL to form a pixel. The pixel electrode PX is connected to one of the image signal electrodes SD constituting the source/drain electrode of the thin film transistor TFT through the through-hole TH and the other of the image signal electrodes SD is connected to the image signal line DL. Further, the common signal electrode CE is formed in the whole area of the unit pixel area except at least the periphery of the pixel area. The common signal line CL disposed in the X direction is electrically connected to the common signal line CL formed by using the same process and the same material as those of the scanning signal electrode GE. Further, at least a portion of the pixel electrode PX is divided into a plurality of portions in the form of teeth of a comb within the pixel or is processed to be formed into slits.

There has been described that when the applied-type insulation layer OIL1 is formed in the area which is positioned above the common signal electrode CE and where the pixel electrode PX does not exist, the driving voltage is increased. On the other hand, the applied-type insulation layer OIL1 may be formed in an area excluding the area which is positioned above the common signal electrode CE and where the pixel electrode PX does not exist, such as an area which does not depend on the driving voltage, that is, an area where the scanning signal line GL, the image signal line DL and the thin film transistor TFT exist. In this case, there is also provided the function serving as a protection layer for preventing melting of the scanning line and the image line existing in the lower layer upon processing of the pixel electrode PX or the lines GL, DL and CL and the electrodes GE, DE and CE of the common signal electrode by means of the coating effect of the applied-type insulation layer OIL1 in addition to reduction of the parasitic capacitance between the common signal electrode CE and the pixel electrode PX. However, the applied-type insulation layer OIL1 is never formed in terminal exposed portions for the scanning signal and the image signal and a through-hole TH portion for connecting the pixel electrode PX to one of the image signal electrode SD constituting the source/drain electrode of the thin film transistor TFT.

As shown in FIG. 3, the thin film transistor TFT uses the reverse-staggered type thin film transistor. When a voltage higher than a threshold value of the thin film transistor is applied to gate electrode GE, the semiconductor layer SI is conductive, so that a path between the image signal electrodes SD constituting the source/drain electrodes of the thin film transistor TFT is conductive. At this time, a voltage applied to the image signal line DL is transmitted to the pixel electrode PX. Further, when the voltage applied to the gate electrode GE is lower than the threshold voltage of the thin film transistor, the image signal electrodes SD constituting the source/drain electrodes of the thin film transistor TFT are insulated from each other and the voltage applied to the image signal line DL is not transmitted to the pixel electrode, so that the pixel electrode PX holds the voltage transmitted when the image signal electrodes SD constituting the source/drain electrodes are conductive.

The through-hole TH is formed on the surface protection layer PAS of the thin film transistor. The through-hole TH is formed to connect one of the image signal electrodes SD constituting the source/drain electrode of the thin film transistor to the pixel electrode PX. The pixel electrode PX gets over a step of the through-hole TH and comes into contact with the source/drain electrodes of the thin film transistor to be electrically connected thereto.

In the embodiment, a width of the pixel electrode PX processed in the form of slits and a space therebetween are both set to be 3 μm, for example. The applied-type insulation layer is formed in conformity with the shape of the pixel electrode PX only in the area which is positioned above the common signal electrode CE and where the pixel electrode PX exists and a width of its pattern is set to be 4 μm.

The pattern width $W_{ISO}$ (μm) of the applied-type insulation layer OIL1 formed selectively in conformity with the shape of the pixel electrode PX has desirably a margin or space with respect to the width $W_{EL}$ of the pixel electrode PX in consideration of the alignment accuracy of pattern and the accuracy of the processing dimensions in the photolithographic process. Concretely, it is preferable that the pattern width $W_{ISO}$ of the applied-type insulation layer OIL1 satisfies the condition of $W_{EL}-2 \leq W_{ISO} \leq W_{EL}+2$(μm) where $W_{ISO}>0$, $W_{ISO}<W_{EL}+W_{SP}$ and $W_{SP}$ (μm) is a space between the pixel electrodes.

In the embodiment, a width of one protrusion of the applied-type insulation layer OIL1 with respect to the pixel electrode PX is set to a value larger than 0 μm and smaller than 1 μm, for example, 0.5 μm. That is, $W_{ISO}=W_{EL}+1$(μm). Consequently, the applied-type insulation layer OIL1 is overflowed to exist even in the area which is positioned above the common signal electrode CE and where the pixel electrode PX does not exist, while even if any alignment deviation is produced, variation of the parasitic capacitance due to scattering of the process can be reduced since a portion of the pixel electrode PX is not disposed on the applied-type insulation layer OIL1.

Further, in the above structure, the pattern width of the applied-type insulation layer OIL1 is made larger than the width of the pixel electrode PX as a structure that the parasitic capacitance can be reduced at the maximum when the applied-type insulation layer OIL1 is used, while the same effect can be obtained even in the structure that the pattern width $W_{ISO}$ of the applied-type insulation layer OIL1 is made smaller than the width $W_{EL}$ of the pixel electrode PX, that is, in the structure that the pixel electrode PX is overflowed from the pattern of the applied-type insulation layer OIL1. In this case, however, the effect of the reduction of the parasitic capacitance is reduced by the portion of the pixel electrode PX overflowed from the applied-type insulation layer OIL1 as compared with the structure shown in the embodiment.

A shape of an end of the substrate, an electric circuit and a shape of a terminal portion in the embodiment are now described.

Figure 4:
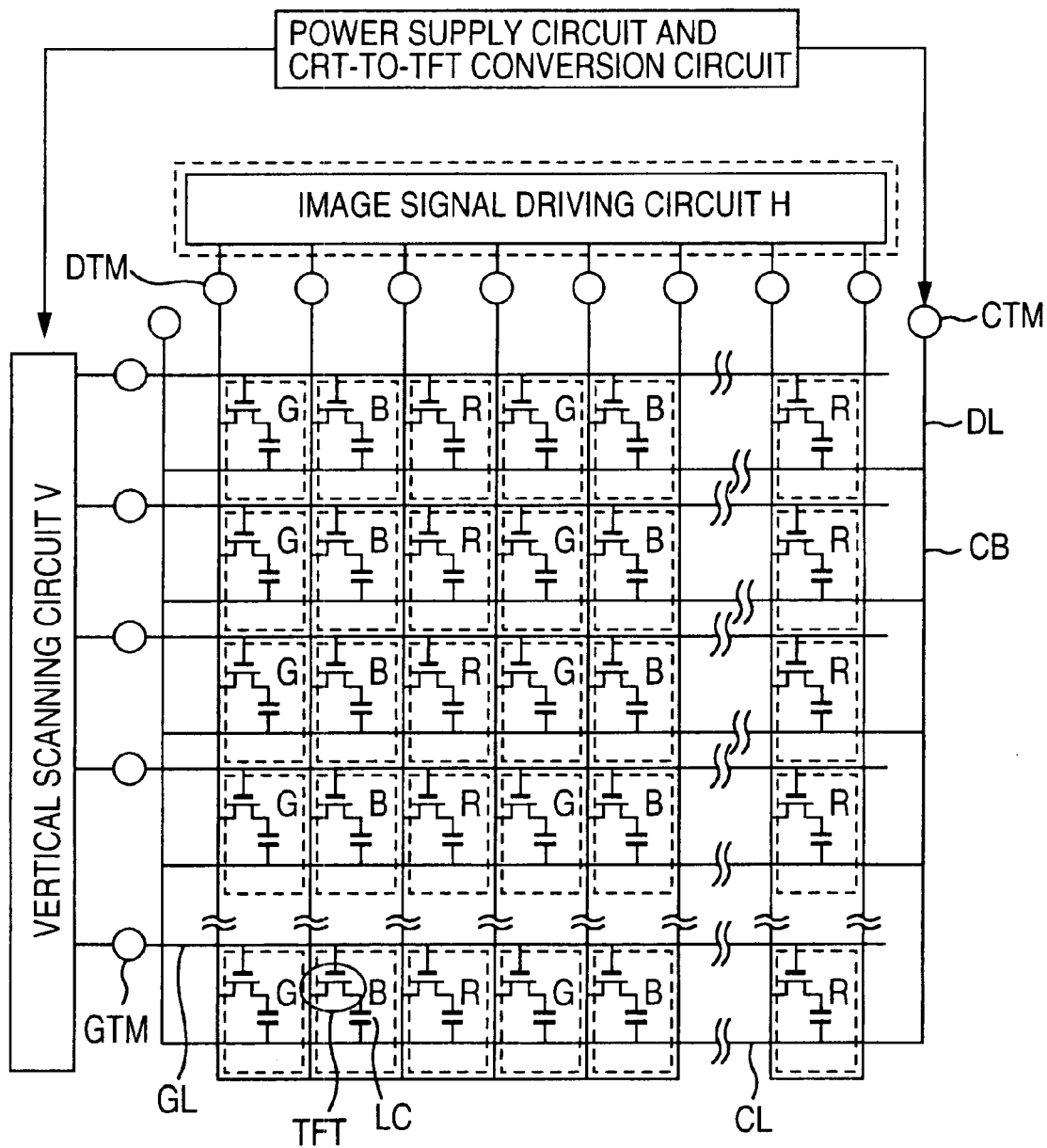
FIG. 4 is a schematic diagram illustrating an electric circuit of the active matrix type liquid crystal display unit according to the embodiment of the present invention.
Figure 5:
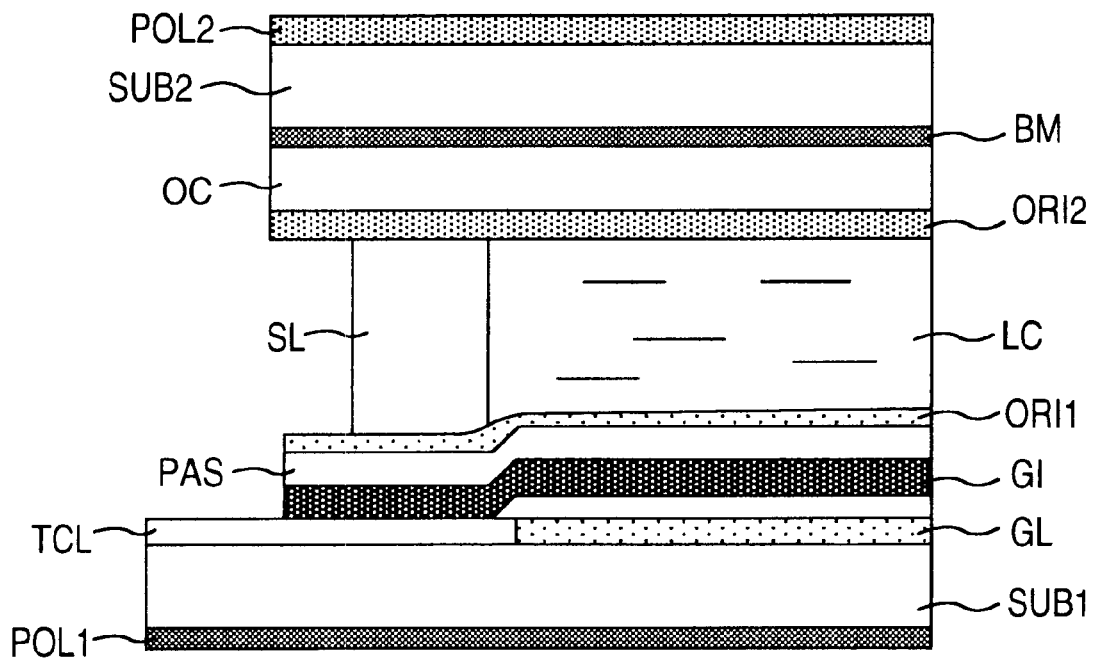
FIG. 5 shows cross sections illustrating an end of a substrate of the active matrix type liquid crystal display unit according to the embodiment of the present invention.
Figure 5:
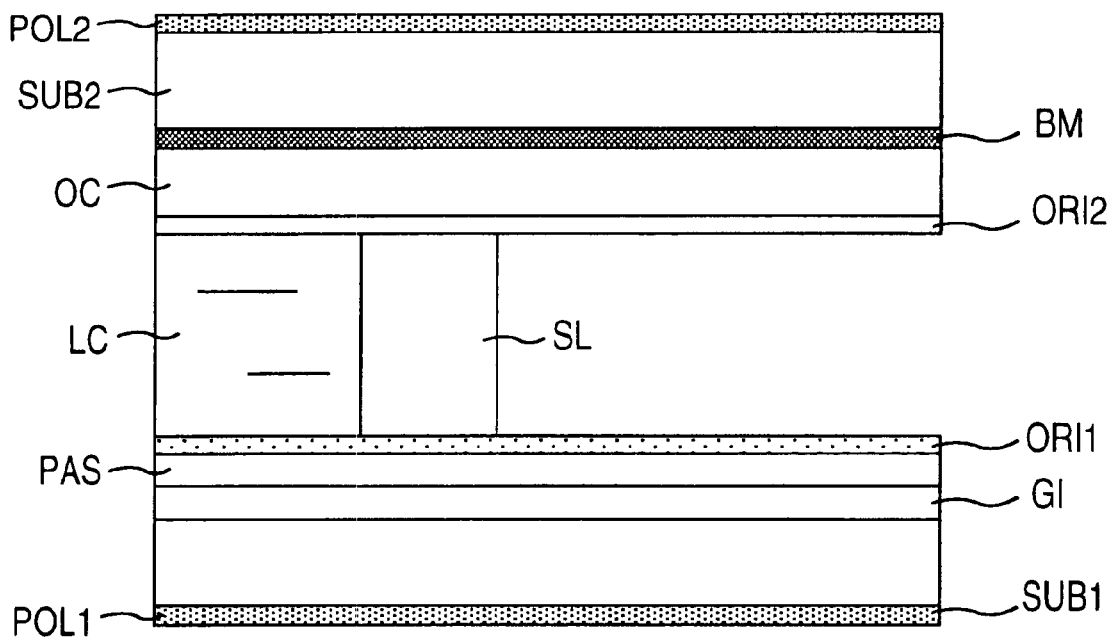

FIG. 4 is a diagram schematically illustrating an electric circuit of the active matrix type liquid crystal display unit according to the embodiment of the present invention. FIG. 5 shows cross sections illustrating an end of a substrate of the active matrix type liquid crystal display unit according to the embodiment of the present invention and particularly FIG. 5(a) shows the end where the terminal GTM for scanning signal line is disposed while FIG. 5(b) shows the end where a liquid crystal sealing opening is disposed.

As shown in the electric circuit of FIG. 4, a scanning signal (voltage signal) is successively supplied by a vertical scanning circuit through the scanning signal line terminal GTM to each of the scanning signal lines GL extending in the x direction and disposed side by side in the y direction. The thin film transistor TFT in each of the pixel areas disposed along the scanning signal lines GL is driven by the scanning signal. An image signal is supplied from an image signal driving circuit through the image signal line terminal DTM to each of the image signal lines DL extending in the y direction and disposed side by side in the x direction in synchronism with the timing of the scanning signal. The image signal is applied to the pixel electrode PX through the thin film transistor TFT in each pixel area. In each pixel area, a counter voltage diverging from the bus line CB of the common signal line is applied through the common signal line terminal CTM to the common signal electrode CE formed together with the pixel electrode PX to produce an electric field between the pixel electrode PX and the common signal electrode CE. The light transmission factor of the liquid crystal is controlled by an electric field (horizontal electric field) having a component dominantly parallel to the transparent insulation substrate SUBI of the above electric field. In FIG. 4, symbols R, G and B shown in each pixel area represent that red, green and blue filters are formed, respectively.

Fixing of the TFT substrate to the CF substrate is made by seal material SL formed around the CF substrate as shown in FIG. 5 and the seal material SL has the function serving as sealing material for sealing the liquid crystal between the transparent insulation substrates SUB1 and SUB2. The scanning signal line terminal GTM, the image signal line terminal DTM and the common signal line terminal CTM are formed in the area which is positioned on the periphery of the TFT substrate outside of the seal material SL and is not covered by the filter substrate.

In FIG. 5, the terminal GTM for the scanning signal line GL among them is illustrated as an example. Each terminal is connected through an anisotropic conductive layer having conductive particles dispersed in bonding agent to external driving circuit described in conjunction with FIG. 5 by means of the TCP (Tape Carrier Package) or COG (Chip On Glass) connection method. Further, a liquid crystal injecting opening not shown is formed in a portion (lower side of FIG. 5) of the seal material SL and after the liquid crystal is injected from this liquid crystal injecting opening, the opening is sealed by the liquid crystal sealing material.

Figure 6:
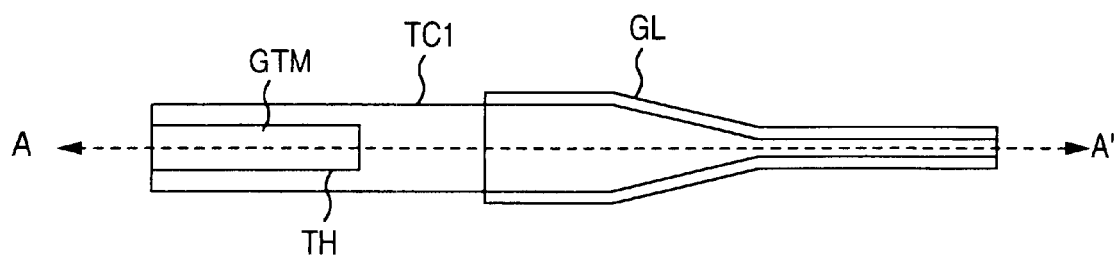
FIG. 6 shows a terminal GTM portion for a scanning signal line GL of the active matrix type liquid crystal display unit according to the embodiment of the present invention in plan view (a) and in cross section (b) taken along line shown by A–A'.
Figure 6:
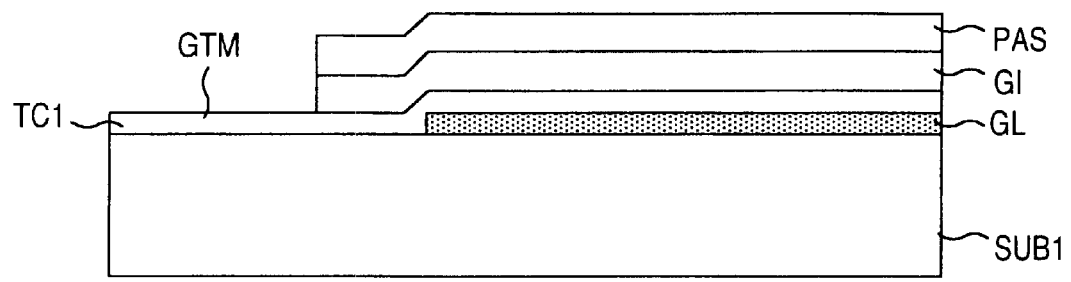

FIG. 6 shows the terminal GTM for the scanning signal line GL of the active matrix type liquid crystal display unit according to the embodiment of the present invention in plan view (a) and in cross section (b) taken along line shown by A–A'.

Figure 7:
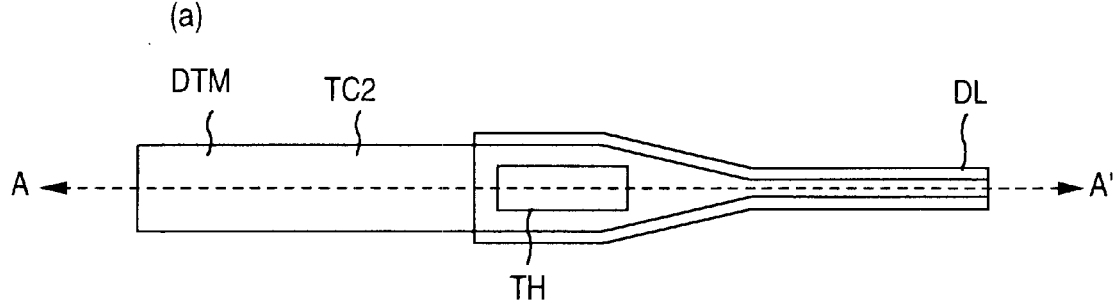
FIG. 7 shows a terminal DTM portion for an image signal line DL of the active matrix type liquid crystal display unit according to the first embodiment in plan view (a) and in cross section (b) taken along line A–A'.
Figure 7:
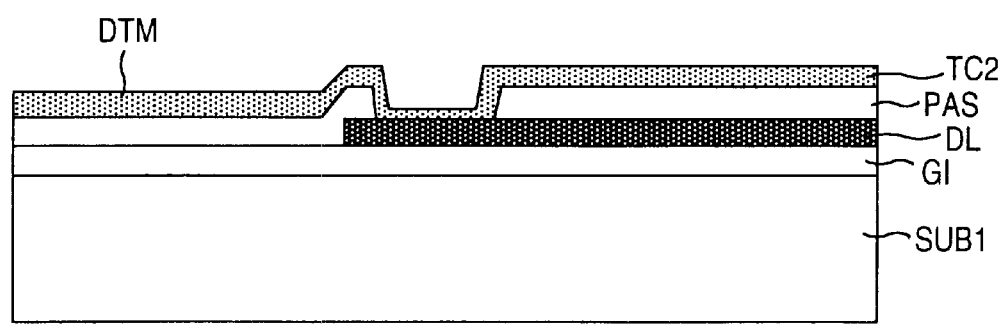

FIG. 7 shows the terminal DTM for the image signal line of the active matrix type liquid crystal display unit according to the first embodiment in plan view (a) and in cross section (b) taken along line shown by A–A'.

In formation of the scanning signal line terminal GTM, as shown in FIG. 6, an extension portion of the scanning signal line GL and a pad electrode TC1 for connection are first formed in an area where the scanning signal terminal portion on the transparent insulation substrate SUB1 is formed. The pad electrode TC1 is formed in the same process and of the same transparent conductive layer material as those in the case where the common signal electrode CE is formed. The pad electrode TC1 is formed at an end of the scanning signal line GL to cover the scanning signal line GL. Further, the gate insulation layer GI and the surface protection layer PAS of the thin film transistor TFT are successively laminated to cover the pad electrode TC1 and the scanning signal line GL and a part of the pad electrode TC1 is exposed by the through-hole TH formed in the gate electrode GI and the surface protection layer PAS to thereby form the scanning signal line terminal GTM. Usually, the exposed terminal portion of the liquid crystal display unit is made of transparent conductive layer material having excellent moisture-resistant, medicine-resistant and corrosion-resistant characteristics instead of metal material, while even in the embodiment the scanning signal line terminal GTM is formed of transparent conductive layer having excellent etching-resistant characteristic and accordingly the reliability of the exposed terminal portion can be ensured sufficiently. Further, in the embodiment, since the scanning signal line GL and the common signal line CL are formed of the same material and in the same process, the common signal line terminal CTM is also formed of the same material and in the same process as the terminal GTM for the scanning signal line GL and has the same structure naturally. In this case, as shown in FIG. 4, the common signal line terminal CTM is taken out in the opposite direction to the scanning signal line terminal GTM.

In formation of the image signal line terminal DTM, as shown in FIG. 7, the gate insulation layer GI is first formed on the transparent insulation substrate SUB1 and the extension portion of the image signal line DL is then formed in the area where the terminal for the image signal line DL is formed. Thereafter, the surface protection layer PAS of the thin film transistor TFT is formed and the through-hole TH is formed in a part of the area where the pad electrode TC2 fabricated in a later process is formed, of the area where the image signal line terminal DTM is formed. Further, the transparent conductive layer used when the pixel electrode PX is formed is used to form the pad electrode TC2. The pad electrode TC2 is electrically connected through the through-hole TH to the image signal line DL. By adopting this structure, the image signal line terminal DTM is also made of transparent conductive layer material having excellent moisture-resistant, medicine-resistant and corrosion-resistant characteristics in the same manner as the scanning signal line terminal GTM and accordingly the reliability of the exposed terminal portion can be ensured sufficiently.

Figure 8:
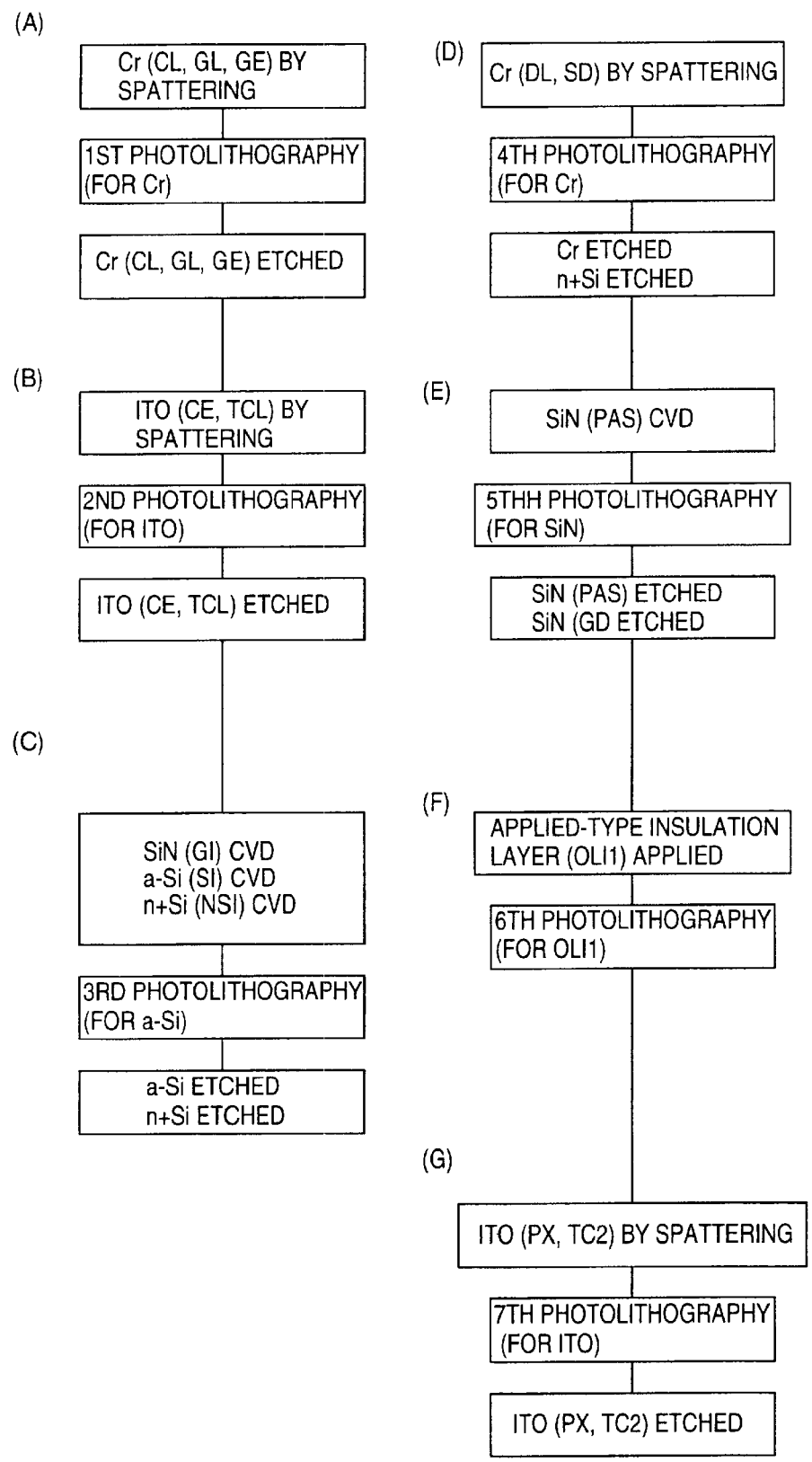
FIG. 8 is a diagram showing processing flows for realizing structure of the first embodiment of the present invention.
Figure 9:
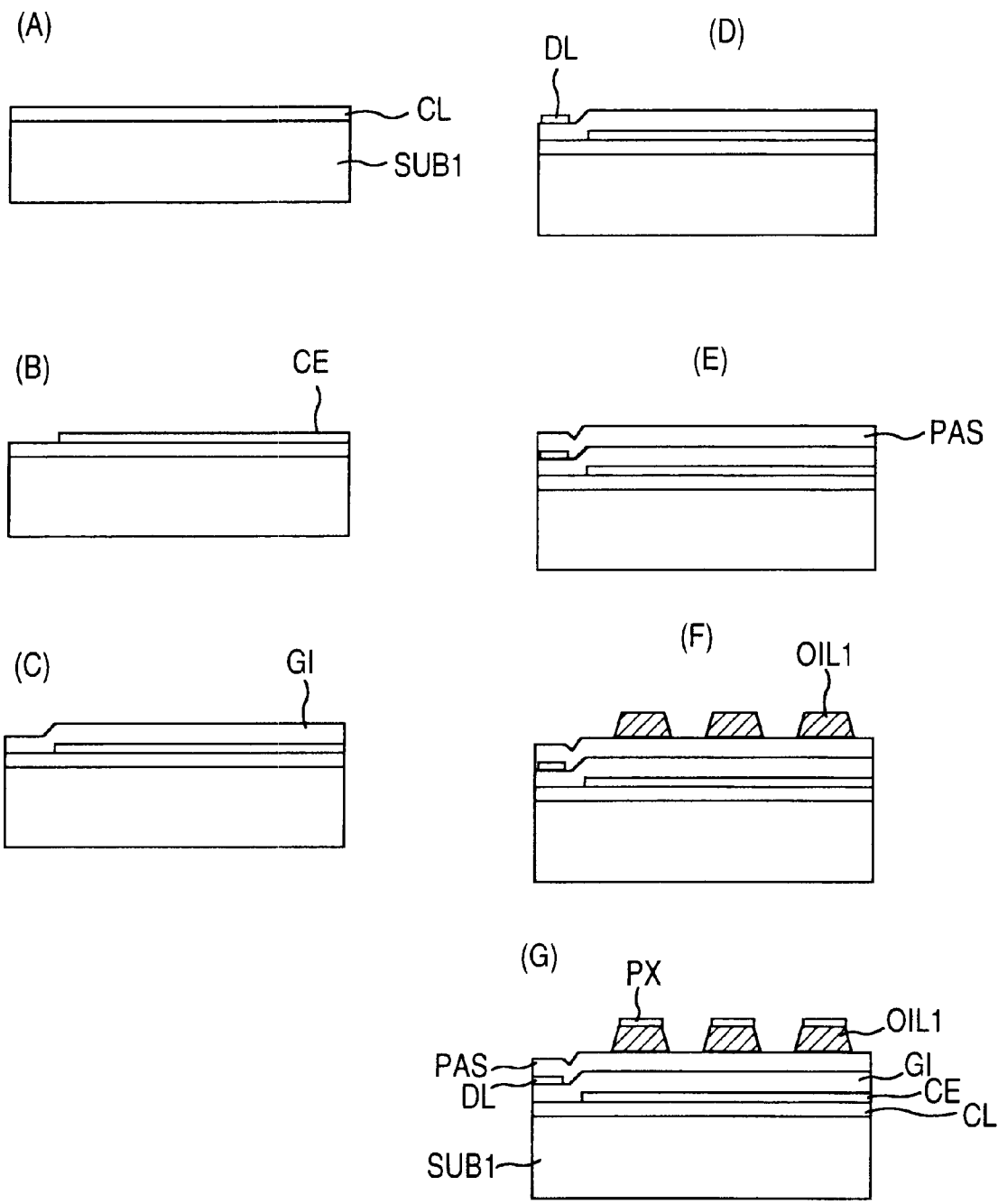
FIG. 9 shows cross sections taken along the line shown by A–A' of FIG. 2 in case where a TFT substrate is fabricated in accordance with the processing flow of FIG. 8.
Figure 10:
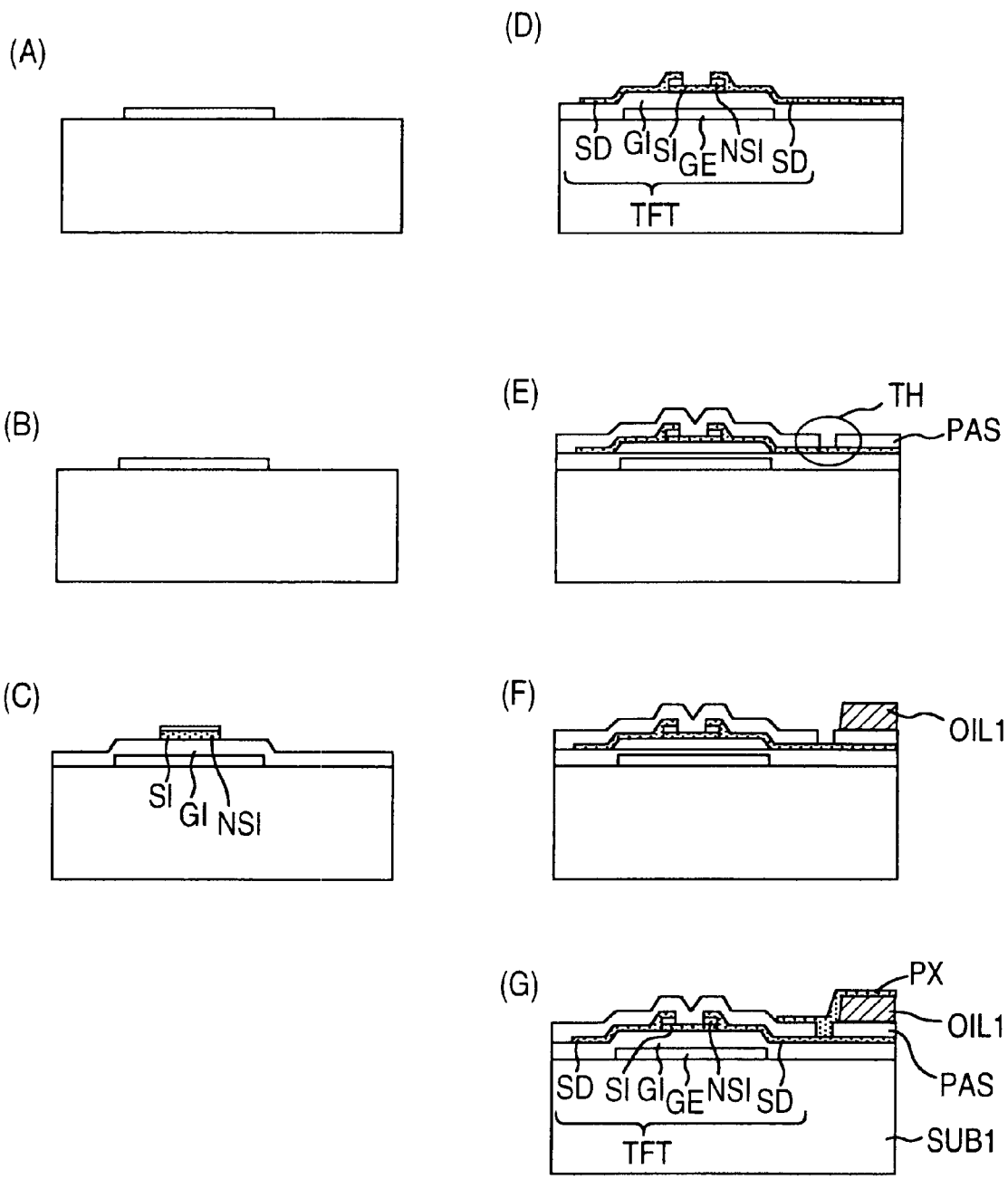
FIG. 10 shows cross sections taken along the line shown by B–B' of FIG. 2 in case where the TFT substrate is fabricated in accordance with the processing flow of FIG. 8.

In the first embodiment, an concrete example of the formation method is now described by using cross-sectional views for fabricating processes of the TFT substrate with reference to FIGS. 8 to 10.

FIG. 8 is a diagram showing processing flows for realizing structure of the first embodiment of the present invention. FIG. 9 shows cross sections taken along line shown by A–A' of FIG. 2 in case where the TFT substrate is fabricated in accordance with the processing flows of FIG. 8. FIG. 10 shows cross sections taken along line shown by B–B' of FIG. 2 in case where the TFT substrate is fabricated in accordance with the processing flows of FIG. 8.

In the embodiment 1, the TFT substrate SUB1 is ompleted by way of seven photolithographic processes (A) to (G) concretely. Description is now made in order of processes.

Process (A)

The transparent insulation substrate SUB1 is provided and Cr layer is formed on the whole surface area thereof by means of the spattering method, for example, to have a thickness of 100 to 500 nm, preferably 150 to 350 nm. Then, the photolithographic technique is used to selectively etch the Cr layer so that the scanning signal electrode GE, the line GL and the common signal line CL are formed in the pixel area and the extension portion of the scanning signal line GL is formed in the area for forming the scanning signal line terminal GTM.

Process (B)

The ITO constituting the lower transparent conductive layer is formed on the whole surface area of the transparent insulation substrate SUB1 by means of the spattering method, for example, to have a thickness of 50 to 300 nm, preferably 70 to 200 nm. Then, the photolithographic technique is used to etch the ITO layer so that the common signal electrode CE is formed in the pixel area and the pad electrodes TC1 for the scanning signal line terminals GTM and the terminal CTM for the common signal line CL are formed in the area for forming the scanning signal line terminals GTM and the area for forming the common signal line terminal CTM, respectively.

Process (C)

The silicon nitride layer constituting the gate insulation layer GI is formed on the whole surface area of the transparent insulation substrate SUB1 by means of the plasma CVD method, for example, to have a thickness of about 200 to 700 nm, preferably 300 to 500 nm. Further, an amorphous silicon layer is formed on the whole surface area of the gate insulation layer GI to have a thickness of 50 to 300 nm, preferably 100 to 200 nm and an amorphous silicon layer doped with phosphorus as n-type impurity is further formed thereon to have a thickness of 10 to 100 nm, preferably 20 to 60 nm successively by means of the plasma CVD method, for example. Then, the photolithographic technique is used to etch the amorphous silicon layer so that the semiconductor layer SI of the thin film transistor TFT is formed in the pixel area.

Process (D)

The Cr layer is formed on the whole surface area of the transparent insulation substrate SUB1 by means of the spattering method, for example, to have a thickness of 100 to 500 nm, preferably 150 to 350 nm. Then, the photolithographic technique is used to etch the Cr layer so that the image signal electrode SD constituting the source/drain electrode of the thin film transistor TFT and the image signal line DL which is the extension portion of the image-signal electrode SD are formed in the pixel area and the extension portion of the image signal line DL is formed in the area for forming the terminal DTM for the image signal line DL. Thereafter, the pattern obtained by etching the Cr layer is used as a mask to etch the amorphous silicon layer doped with phosphorus as n-type impurity.

Process (E)

An silicon nitride layer constituting the surface protection layer PAS of the thin film transistor TFT is formed on the whole surface area of the transparent insulation substrate SUB1 by means of the plasma CVD method, for example, to have a thickness of 200 to 900 nm, preferably 300 to 500 nm. Then, the photolithographic technique is used to etch the surface protection layer PAS so that the through-hole TH for exposing a part of a drain electrode of the thin film transistor TFT is formed in the pixel area. Further, the through-hole TH is extended to reach the gate insulation layer GI positioned in a lower layer of the surface protection layer PAS, so that a through-hole TH for exposing a part of the pad electrode TC1 for the scanning signal line terminal GTM is formed in the area for forming the scanning signal line terminal GTM and a through-hole TH for exposing the extension portion of the image signal line DL is formed in the area for forming the image signal line terminal DTM.

Process (F)

The applied-type insulation layer OIL1 made of insulation layer such as various organic resin containing polyimide system, acryl system polymer, epoxy system polymer and benzine cyclo buden system polymer or inorganic polymer containing Si meltable in organic solvent, for example SOG layer, is formed on the whole surface area of the transparent insulation substrate SUB1 by means of the spin coat method, for example, to have a thickness of 200 nm to 4 $\mu$m, preferably 500 to 1.5 $\mu$m. Then, the photolithographic technique is used to selectively form the applied-type insulation layer. The area where the applied-type insulation layer is formed is a part of the area where the pixel electrode PX constituted by the transparent conductive layer formed in the process (G) is disposed, in the area where the common signal electrode CE is disposed. However, the through-hole portion formed to electrically connect the pixel electrode PX and the image signal line SD constituting the source/drain electrode of the thin film transistor TFT is not disposed in the applied-type insulation layer OIL1 within the pixel area in the part of the area where the pixel electrode PX constituted by the transparent conductive layer formed in the process (G) is disposed, in the area where the common signal electrode CE is disposed.

Process (G)

The ITO layer constituting the upper transparent conductive layer is formed on the whole surface area of the transparent insulation substrate SUB1 by means of the spattering method, for example, to have a thickness of 50 to 300 nm, preferably 70 to 200 nm. Then, the photolithographic technique is used to etch the ITO layer so that the pixel electrode PX connected to the drain electrode of the thin film transistor TFT through the through-hole TH is formed in the pixel area and the pad electrode TC2 for connection is formed in the area for forming the image signal line terminal DTM.

The TFT substrate side is completed by the above processes.

On the other hand, the color filter formed by the staining techniques and the light blocking pattern BM made of Cr system or organic material are formed on the side of the CF substrate. Then, the overcoat layer constituting the leveling layer is formed and the TFT substrate and the CF substrate are stuck together, so that the liquid crystal layer LC is sealed therebetween and the polarizing plates POL1 and POL2 are disposed on the outer side of both the substrates to thereby constitute the liquid crystal display unit.

In the embodiment, the position where the common signal line CL is disposed is nearer to the transparent insulation layer SUB1 than the common signal electrode CE, while the order of layers may be reversed so that the position where the common signal electrode CE is nearer to the transparent insulation substrate SUB1 than the common signal line CL. In this case, the processes (a) and (b) shown in the TFT substrate forming process is reversed and the terminal portion of the line for the scanning signal electrode GE is formed into a shape of an embodiment 2 described later.

In the embodiment, a photo-image formation type insulation layer is used as the applied-type insulation layer OIL1, while the photolithographic process may be used to form the pattern of the applied-type insulation layer OIL1 by etching. For example, the thermosetting insulation layer may be used as the applied-type insulation layer OIL1 to form the pattern by means of the dry etching method using oxygen as reaction gas.

In this case, the thickness of the resist layer used in the photolithographic process is required to be thickened in consideration of the thickness to be etched by means of the dry etching method. Further, when the pattern is formed by the etching process, etching in the forming process of the applied-type insulation layer OIL1 can be also made using the resist used when the pixel electrode PX is formed after formation of the pixel electrode PX. However, it is necessary to previously form the through-hole TH in the terminal portion of the image signal line DL and the portion for connecting the image signal electrode SD and the pixel electrode PX constituting the source/drain electrodes of the thin film transistor before the forming process of the pixel electrode PX. By implementing the above processes, the pixel electrode PX and the applied-type insulation layer OIL1 are patterned in self-alignment manner and accordingly there occurs the effect that deviation in alignment does not occur.

Embodiment 2

A second embodiment of the present invention is now described with reference to FIGS. 11 to 18.

In FIGS. 11 to 18, the same components as those of the foregoing embodiment are designated by the same reference symbols and its repeated description is omitted.

Figure 11:
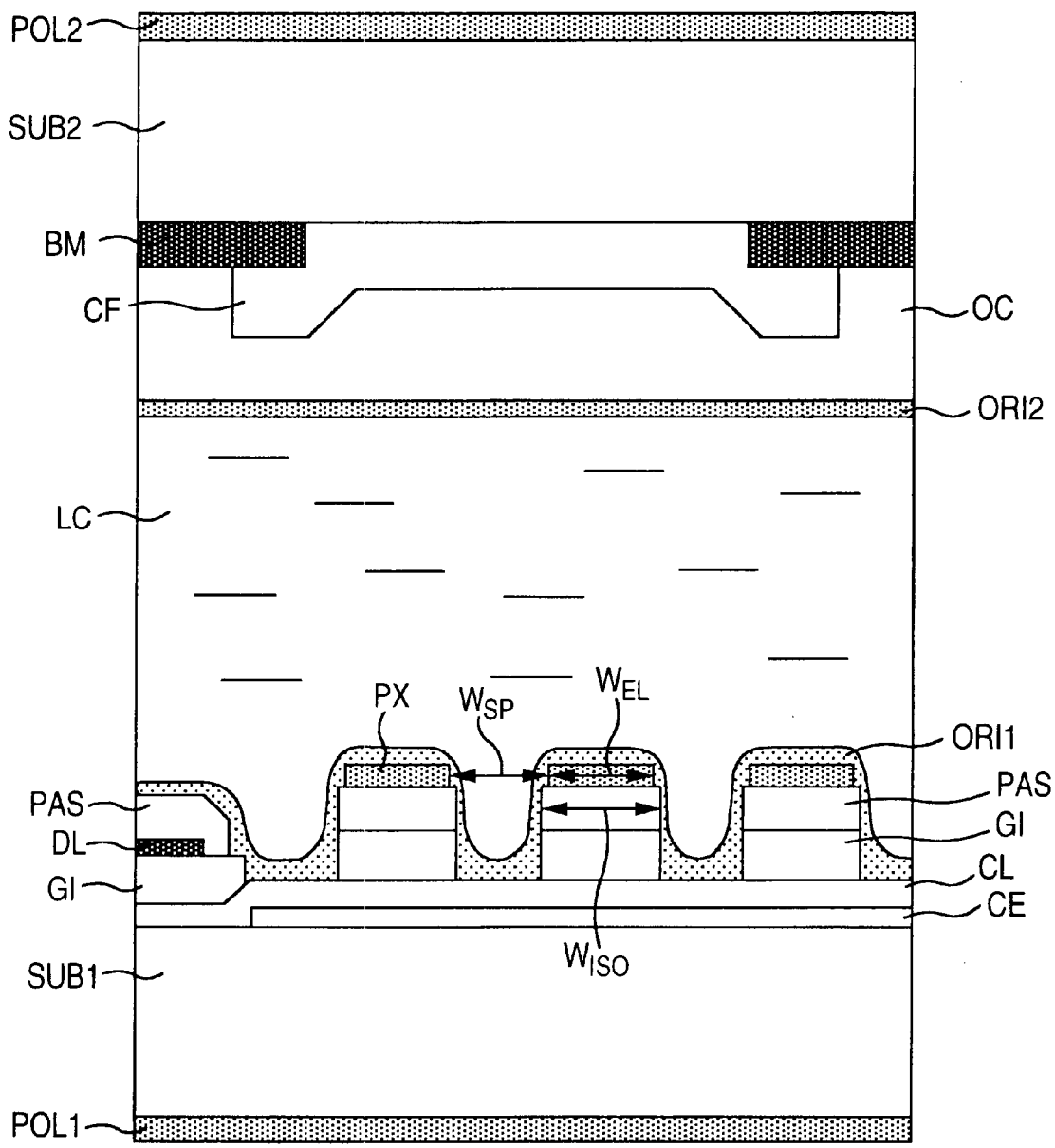
FIG. 11 is a cross sectional view including a pair of substrates opposite to each other, showing a second embodiment of the present invention, and taken along line shown by A–A' of FIG. 12 described below.
Figure 12:
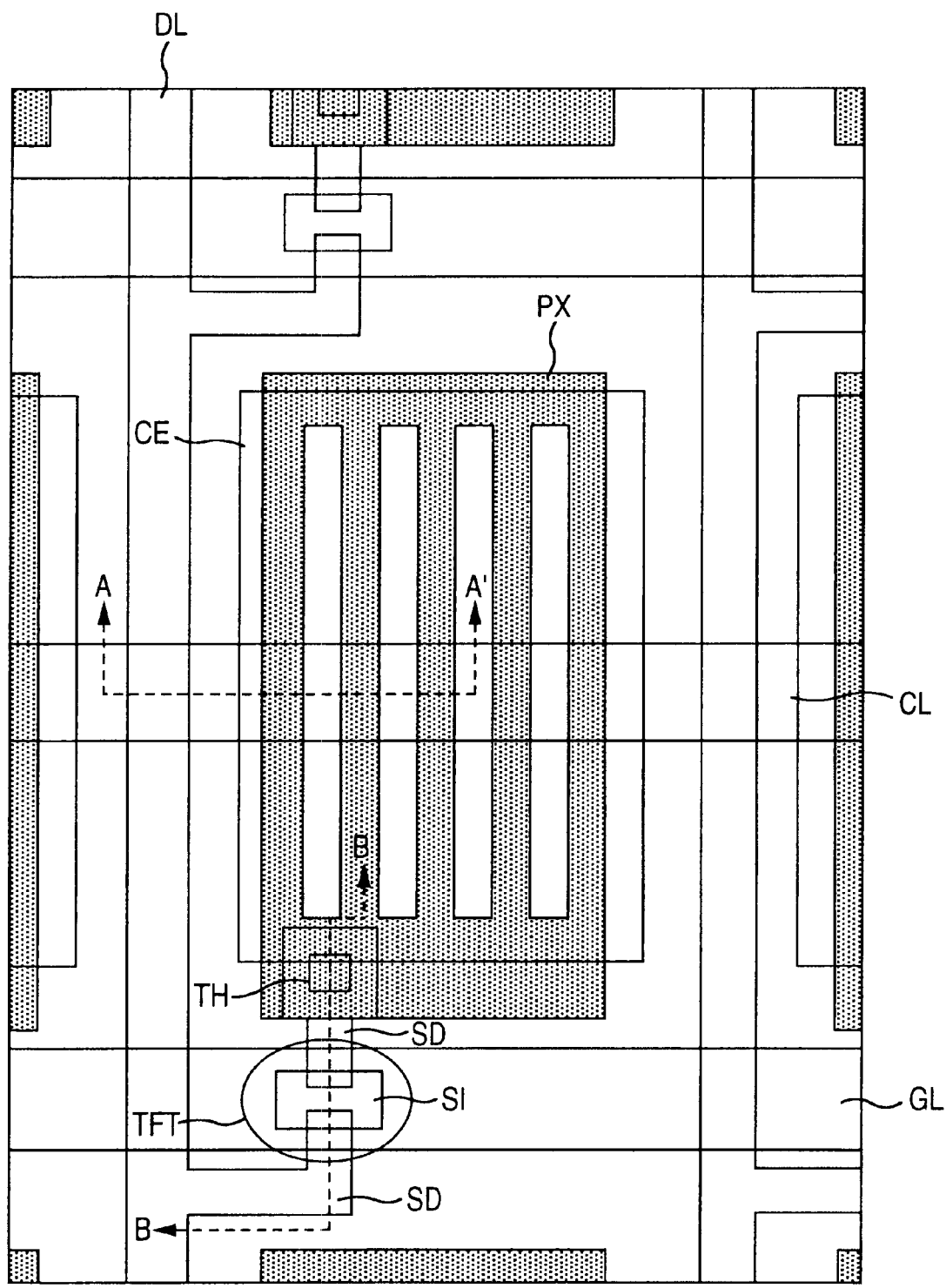
FIG. 12 is a plan view showing a surface on a TFT substrate side of a unit pixel of an active matrix type liquid crystal display unit showing a second embodiment of the present invention.
Figure 13:
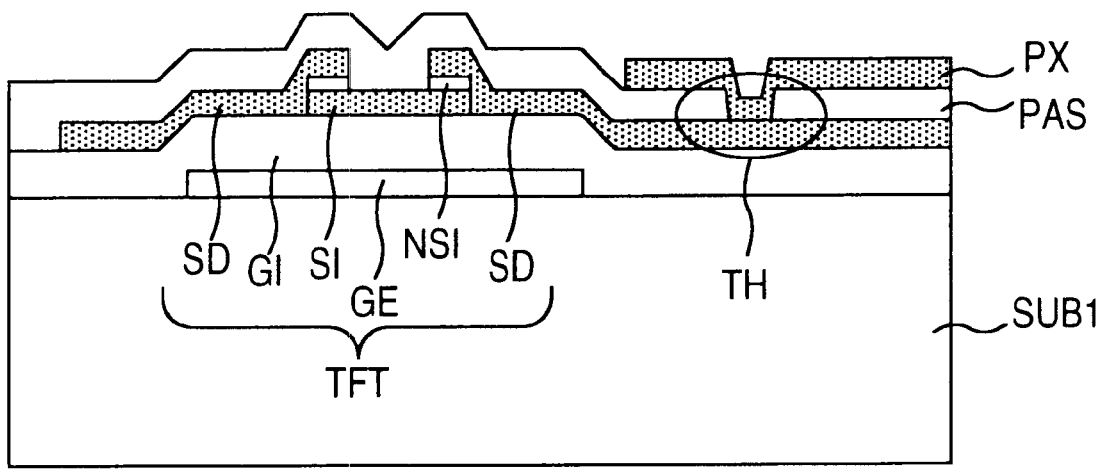
FIG. 13 is a cross sectional view on the TFT substrate side taken along line shown by B–B' of FIG. 2.

FIG. 11 is a cross sectional view, taken along line shown by A–A' of FIG. 12 described later, of the active matrix type liquid crystal display unit showing the second embodiment of the present invention. FIG. 12 is a plan view showing the surface on the side of the TFT substrate of the unit pixel, of the active matrix type liquid crystal display unit showing the second embodiment of the present invention and FIG. 13 is a cross sectional view of the TFT substrate side taken along line shown by B–B' of FIG. 12.

In the second embodiment, the inter-layer insulation layer between the pixel electrode PX and the common signal electrode CE is constituted by the laminated layers of the gate insulation layer GI and the surface protection layer PAS of the thin film transistor.

According to the embodiment, by selectively forming the insulation layer in the area which is positioned above the common signal electrode CE and where the pixel electrode PX exists rather then the area which is positioned above the common signal electrode CE and where the pixel electrode PX does not exist, that is, by selectively removing the insulation layer in the area which is positioned above the common signal electrode CE and where the pixel electrode PX does not exist, the driving voltage can be reduced. The reason thereof will be described below.

The reason causing the increase of the driving voltage of the liquid crystal is that the insulation layer existing in the area which is positioned above the common signal electrode CE and where the pixel electrode PX does not exist forms the capacitance connected in series to the liquid crystal and absorbs part of the voltage applied between the two upper and lower transparent electrodes as described above.

According to the embodiment, by selectively removing the insulation layer in the area which is positioned above the common signal electrode CE and where the pixel electrode PX does not exist, the liquid crystal LC is disposed in the area where the insulation layer is selectively removed, instead of the insulation layer. In this structure, as compared with the driving voltage in the structure that the insulation layer is not selectively removed, the driving voltage in case where the insulation layer is selectively removed is determined by the dielectric constant of the liquid crystal as viewed from the TFT substrate toward the CF substrate in case where the voltage is applied to the liquid crystal disposed in the area where the insulation layer is selectively removed.

If the dielectric constant as viewed from the TFT substrate toward the CF substrate is larger than the dielectric constant of the removed insulation layer when the voltage is applied to the liquid crystal disposed in the area where the insulation layer is selectively removed, the capacitance in that area is larger than the capacitance in case where the insulation layer is selectively removed, so that the voltage drop in the area where the insulation layer is selectively removed can be reduced correspondingly. Consequently, the voltage can be applied to the liquid crystal more effectively to thereby reduce the driving voltage. The dielectric constant as viewed from the TFT substrate toward the CF substrate when the voltage is applied to the liquid crystal disposed in the area where the insulation layer is selectively removed is the dielectric constant in the vertical direction to a director of the liquid crystal in case where $\Delta\in$ of the liquid crystal is negative and is the dielectric constant in the parallel direction to the director of the liquid crystal in case where $\Delta\in$ of the liquid crystal is positive.

When $\Delta\in$ of the liquid crystal is negative, the dielectric constant as viewed from the TFT substrate toward the CF substrate is the dielectric constant in the vertical direction to the director even when the voltage is not applied, while when $\Delta\in$ of the liquid crystal is positive, the dielectric as viewed from the TFT substrate toward the CF substrate is the dielectric constant in the vertical direction to the director of the liquid crystal when the voltage is not applied to the liquid crystal. Accordingly, the dielectric constant generally indicates a value lower than the dielectric constant ($\in=6.7$) of the silicon nitride layer removed selectively. However, when the voltage is applied, an electric field in the vertical direction to the TFT substrate is produced in the liquid crystal in the area where the insulation layer is selectively removed. The orientation condition of almost all of the liquid crystal in the area where the insulation layer is selectively removed is changed in accordance with the electric field and the director of the liquid crystal is vertical to the TFT substrate. Accordingly, when the voltage is applied to the liquid crystal, the dielectric constant as viewed from the TFT substrate toward the CF substrate is the dielectric constant in the parallel direction to the director of the liquid crystal.

Generally, the dielectric constant in the vertical direction to the director of the liquid crystal in case where the $\Delta\in$ of the liquid crystal is negative and the dielectric constant in the parallel direction to the director of the liquid crystal in case where the $\Delta\in$ of the liquid crystal is positive are larger than the dielectric constant of the silicon nitride layer and accordingly the driving voltage can be reduced in the almost all cases actually.

In the embodiment, the width of the pixel electrodes processed in the form of slits and a space therebetween were both set to 3 $\mu$m, for example. With regard to the surface protection layer PAS and the gate insulation layer GI of the thin film transistor TFT, the width of the pattern formed selectively in conformity with the shape of the pixel electrode PX above the common signal electrode CE was set to 4 $\mu$m.

In the embodiment, the gate insulation layer GI and the surface protection layer PAS of the thin film transistor are selectively formed in conformity with the shape of the pixel electrode PX. The pattern width $W_{ISO}$ ($\mu$m) of the selectively formed insulation layer has desirably a margin or space with respect to the width $W_{EL}$ ($\mu$m) of the pixel electrode PX in consideration of the alignment accuracy of pattern and the accuracy of the processing dimensions in the photolithographic process. Concretely, it is preferable that the pattern width $W_{ISO}$ of the insulation layer satisfies the condition of $W_{ISO} \leq W_{EL}+2(\mu m)$ where $W_{ISO}>0$, $W_{ISO}<W_{EL}+W_{SP}$ and $W_{SP}$ ($\mu$m) is a space between the pixel electrodes. In the embodiment, a width of one protrusion was set to a value larger than 0 $\mu$m and smaller than 1 $\mu$m, for example, 0.5 $\mu$m. That is, $W_{ISO}=W_{EL}+1(\mu m)$. Since the process of selectively forming the insulation layer is performed after the pattern of the pixel electrode PX is formed, there does not occur that the pixel electrode PX does not exist on the selectively formed insulation layer pattern even if any alignment deviation occurs between the pattern of the pixel electrode PX and the pattern of the photolithographic process, although the insulation layer is formed on one side of the pixel electrode PX. In this case, since the shape of the overflowed portion of the insulation layer from the pixel electrode PX is asymmetric in right and left portions of the pixel electrode PX, there occurs a problem that an ideal applied voltage versus transmission factor characteristic cannot be obtained, although scattering of the display characteristic due to the deviation of pattern can be reduced by making the pattern width $W_{ISO}$ (μm) of the insulation layer larger than the electrode width $W_{EL}$ (μm) of the pixel electrode PX.

In the embodiment, the silicon nitride layer is used as the insulation layer, while when a silicon oxide layer having the dielectric constant smaller than that of the silicon nitride layer is used as the insulation layer, the effect of the embodiment is remarkable.

In the embodiment, the electric circuit of the liquid crystal display unit and the shape of the terminal for the image signal line DL are the same as those of the embodiment 1 and accordingly the drawings and the description thereof are omitted.

In the embodiment, the plan view shown in FIG. 12 is the same as that of the embodiment 1 except the structure of the selectively formed insulation layer and accordingly the description thereof is omitted.

In the embodiment, the cross section shown in FIG. 13 is the same as that of the embodiment 1 except the applied-type insulation layer OIL1 and the description thereof is omitted.

Figure 14:
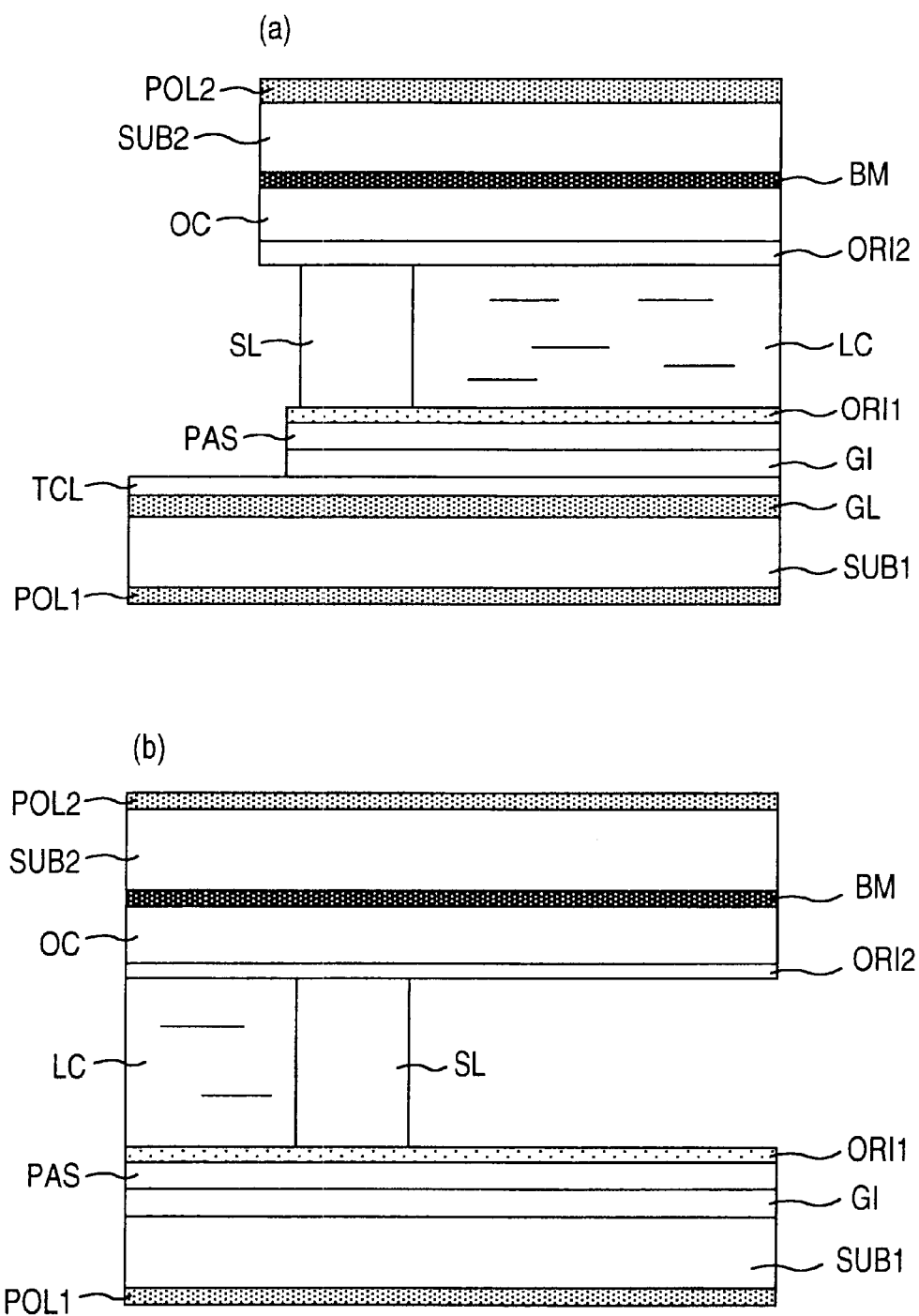
FIG. 14 shows cross sections illustrating of an end of a substrate of the active matrix type liquid crystal display unit according to the embodiment of the present invention.
Figure 15:
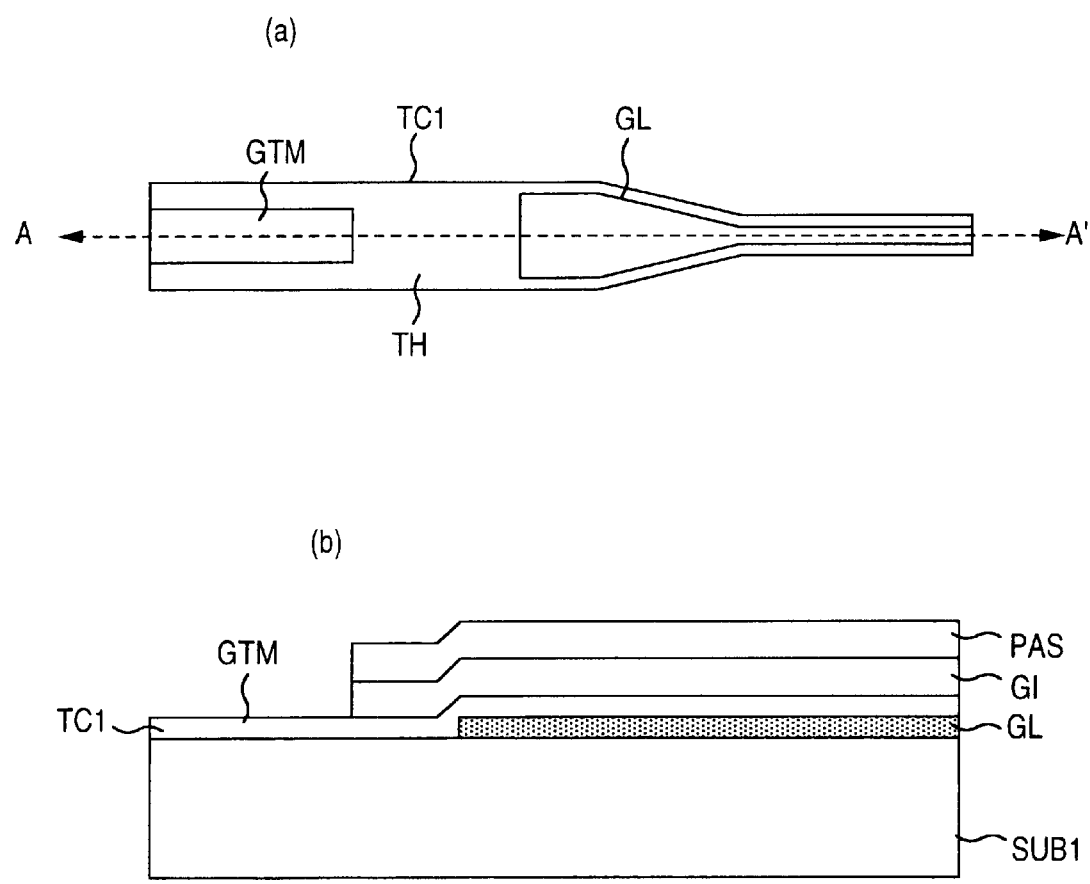
FIG. 15 shows a terminal GTM portion for a scanning signal line GL of the active matrix type liquid crystal display unit according to the second embodiment in plan view (a) and in cross section (b) taken along line shown by A–A'.

FIG. 14 shows cross sections illustrating of an end of a substrate of the active matrix type liquid crystal display unit according to the embodiment of the present invention, in which FIG. 14(a) shows the end on the side that the scanning signal line terminal GTM is disposed and FIG. 14(b) shows the end on the side that the liquid crystal sealing opening is disposed. FIG. 15 shows the terminal GTM portion for scanning signal line of the active matrix type liquid display unit according to the second embodiment in plan view (a) and in cross section (b) taken along line shown by A-A'.

In the embodiment, the shape of the substrate end shown in FIG. 14 is the same as that of the embodiment except the shape of the terminal GTM for the scanning signal line GL and the terminal GTL for the scanning signal line is described in detail in FIG. 15. Accordingly, the description of FIG. 14 is omitted.

In the embodiment, the terminal GTM for the scanning signal line having the structure that the extension portion of the scanning signal line GL and the order of layers for the pad electrode TC1 are different from the terminal GTM for the scanning signal line of the embodiment 1 is illustrated.

In formation of the scanning signal line terminal GTM, as shown in FIG. 15, an extension portion of the scanning signal line GL and a pad electrode TC1 for connection are first formed in an area where the scanning signal terminal portion on the transparent insulation substrate SUB1 is formed. The pad electrode TC1 is formed in the same process and of the same transparent conductive layer material as those in the case where the common signal electrode CE is formed. Further, the gate insulation layer GI and the surface protection layer PAS of the thin film transistor are successively laminated to cover the pad electrode TC1 and the scanning signal line GL and a part of the pad electrode TC1 is exposed by the through-hole TH formed in the gate electrode GI and the surface protection layer PAS to thereby form the scanning signal line terminal GTM. Even in the embodiment, since the scanning signal line terminal GTM is formed of the transparent conductive layer having excellent etching-resistant characteristic, the reliability of the exposed terminal portion can be ensured sufficiently. Even in the embodiment, since the scanning signal line GL and the common signal line CL are formed of the same material and in the same process, the common signal line terminal CTM is also formed of the same material and in the same process as the terminal GTM for the scanning signal line GL and accordingly the terminal CTM has the same structure as the terminal GTM naturally. In this case, as shown in FIG. 4, the common signal line terminal CTM is taken out in the opposite direction to the scanning signal line terminal GTM.

Figure 16:
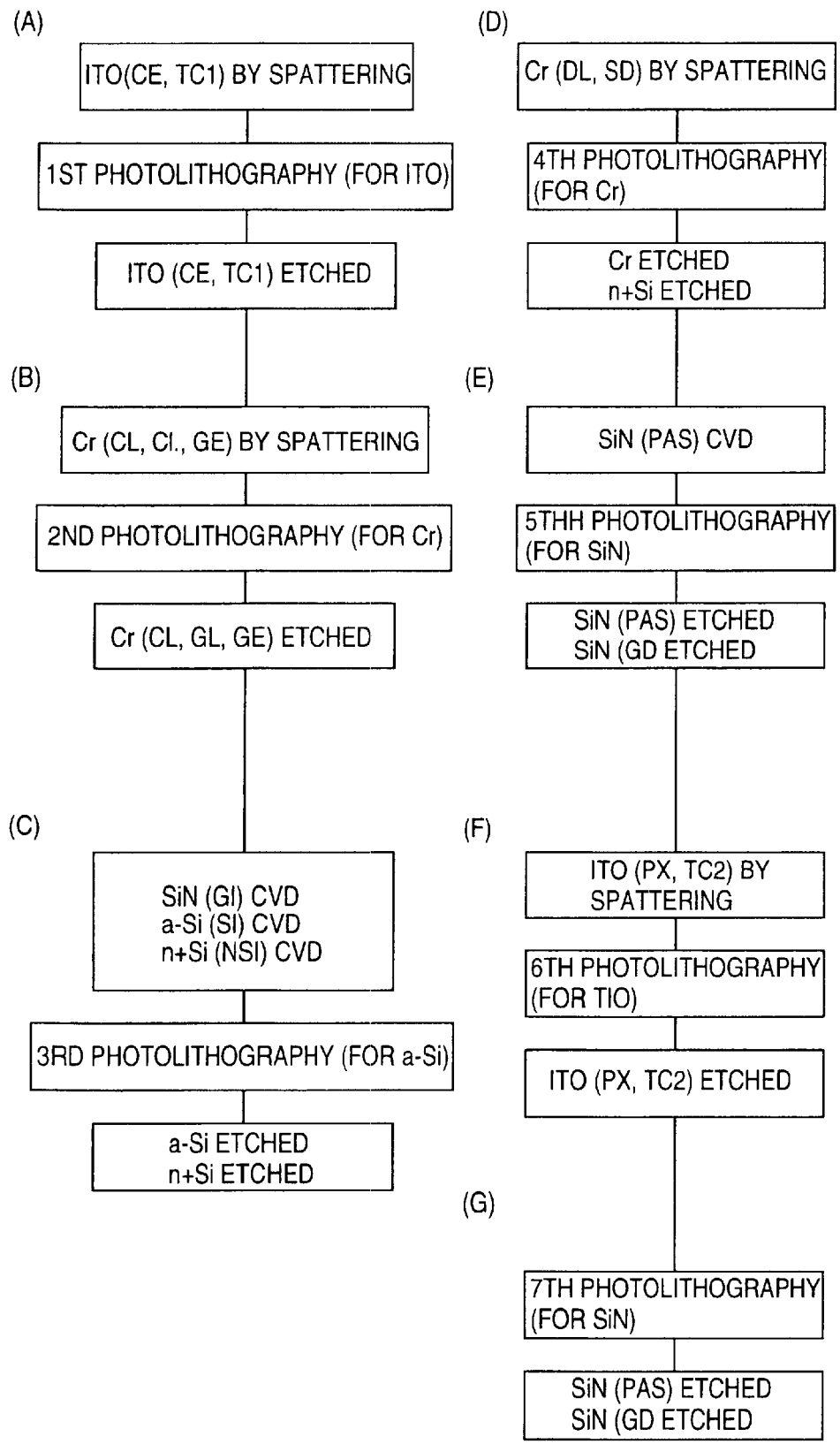
FIG. 16 is a diagram showing a processing flow for realizing structure of the second embodiment of the present invention.
Figure 17:
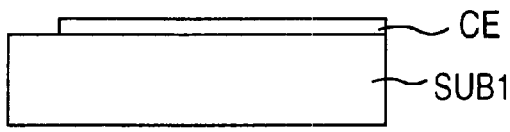
FIG. 17 shows cross sections taken along the line shown by A–A' of FIG. 12 in case where a TFT substrate is fabricated in accordance with the processing flow of FIG. 16.
Figure 17:
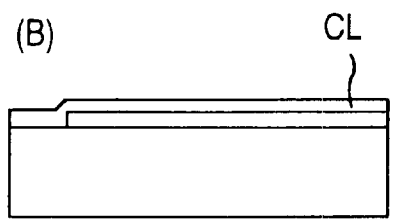
Figure 17:
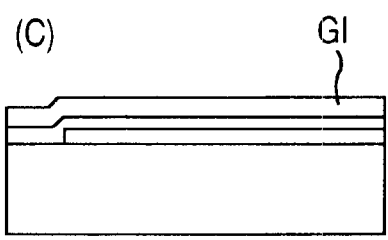
Figure 17:
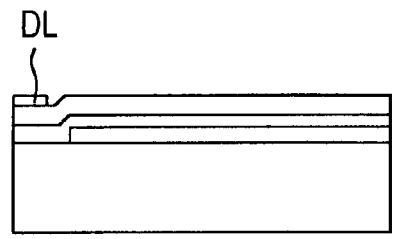
Figure 17:
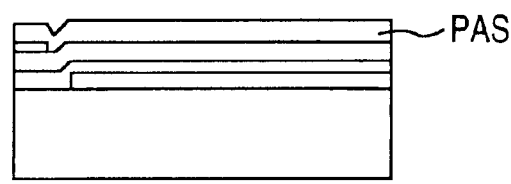
Figure 17:
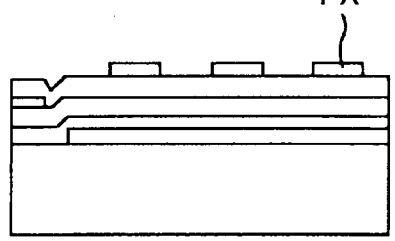
Figure 17:
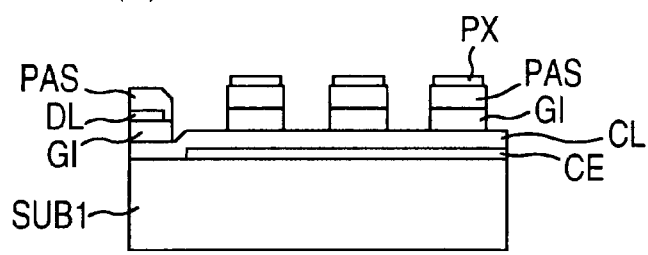
Figure 18:
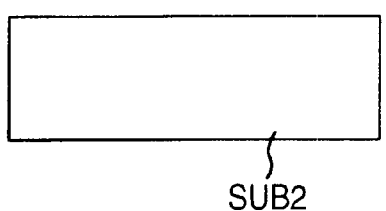
FIG. 18 shows cross sections taken along the line shown by B–B' of FIG. 12 in case where the TFT substrate is fabricated in accordance with the processing flow of FIG. 16.
Figure 18:
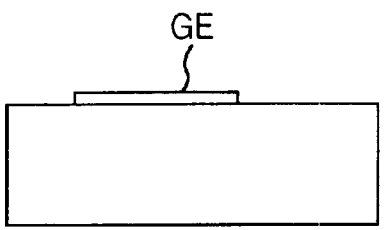
Figure 18:
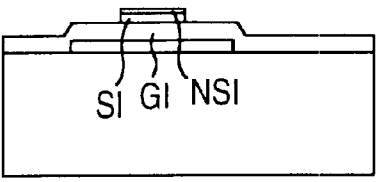
Figure 18:
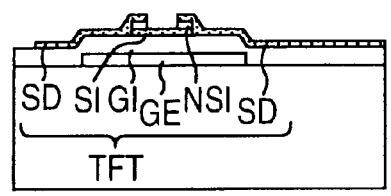
Figure 18:
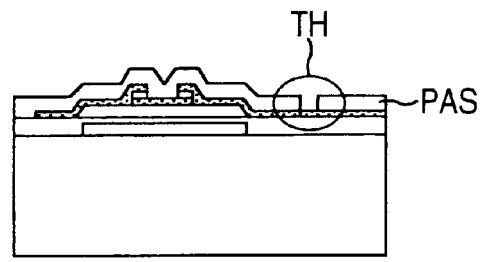
Figure 18:
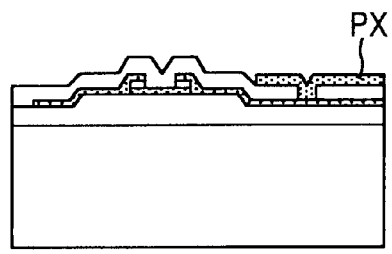
Figure 18:
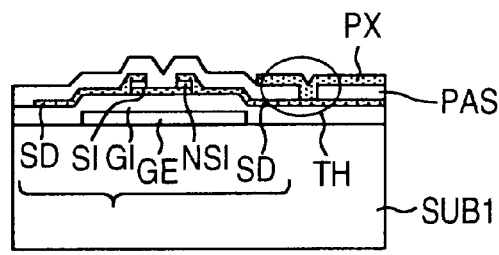

In the second embodiment, an concrete example of the forming method is now described by using cross-sectional views for fabricating processes of the TFT substrate with reference to FIGS. 16 to 18. FIG. 16 is a diagram showing processing flows for realizing structure of the second embodiment of the present invention. FIG. 17 shows cross sections taken along line shown by A-A' of FIG. 12 in case where the TFT substrate is fabricated in accordance with the processing flows of FIG. 16. FIG. 18 shows cross sections taken along line shown by B-B' of FIG. 12 in case where the TFT substrate is fabricated in accordance with the processing flows of FIG. 16.

In the embodiment 2, the TFT substrate SUB1 is completed by way of seven photolithographic processes (A) to (G) concretely. Description is now made in order of processes.

Process (A)

The transparent insulation substrate SUB1 is provided and the ITO layer constituting the lower tansparent conductive layer is formed on the whole surface area thereof by means of the spattering method, for example, to have a thickness of 50 to 300 nm, preferably 70 to 200 nm.

Then, the photolithographic technique is used to etch the polycrystal ITO layer so that the common signal electrode CE is formed in the pixel area and the pad electrodes TC1 for the scanning signal line terminal GTM and the common signal line terminal CTM are formed in the areas for forming the scanning signal line terminal GTM and the common signal line terminal CTM, respectively.

Process (B)

The Cr layer is formed on the whole surface area of the transparent insulation substrate SUB1 by means of the spattering method, for example, to have a thickness of 100 to 500 nm, preferably 150 to 350 nm. Then, the photolithographic technique is used to etch the Cr layer so that the scanning signal electrode GE, the line and the common signal line CL are formed in the pixel area and the extension portion of the scanning signal line GL is formed in the area for forming the scanning signal line terminal GTM.

Process (C)

The silicon nitride layer constituting the gate insulation layer GI is formed on the whole surface area of the transparent insulation substrate SUB1 by means of the plasma CVD method, for example, to have a thickness of about 200 to 700 nm, preferably 300 to 500 nm. Further, an amorphous silicon layer is formed on the whole surface area of the gate insulation layer GI to have a thickness of 50 to 300 nm, preferably 100 to 200 nm and an amorphous silicon layer doped with phosphorus as n-type impurity is further formed thereon to have a thickness of 10 to 100 nm, preferably 20 to 60 nm, successively by means of the plasma CVD method, for example. Then, the photolithographic technique is used to etch the amorphous silicon layer so that the semiconductor layer SI of the thin film transistor TFT is formed in the pixel area.

Process (D)

The Cr layer is formed on the whole surface area of the transparent insulation substrate SUB1 by means of the spattering method, for example, to have a thickness of 100 to 500 nm, preferably 150 to 350 nm. Then, the photolithographic technique is used to etch the Cr layer so that the image signal electrode SD constituting the source/drain electrode of the thin film transistor TFT and the image signal line DL which is the extension portion of the image signal electrode SD are formed in the pixel area and the extension portion of the image signal line DL is formed in the area for forming the image signal line terminal DTM. Thereafter, the pattern obtained by etching the Cr layer is used as a mask to etch the amorphous silicon layer doped with phosphorus as n-type impurity.

Process (E)

An silicon nitride layer constituting the surface protection layer PAS of the thin film transistor TFT is formed on the whole surface area of the transparent insulation substrate SUB1 by means of the plasma CVD method, for example, to have a thickness of 200 to 700 nm, preferably 300 to 500 nm. Then, the photolithographic technique is used to etch the surface protecting layer PAS so that the through-hole TH for exposing a part of the image signal electrode SD constituting the source/drain electrode of the thin film transistor TFT is formed in the pixel area. Further, the through-hole TH is extended to reach the gate insulation layer GI positioned in a lower layer of the surface protection layer PAS, so that a through-hole TH for exposing a part of the pad electrode TC1 for the scanning signal line terminal GTM is formed in the area for forming the scanning signal line terminal GTM and a through-hole TH for exposing the extension portion of the image signal line DL is formed in the area for forming the image signal line terminal DTM.

Process (F)

The ITO layer constituting the lower transparent conductive layer is formed on the whole surface area of the transparent insulation substrate SUB1 by means of the spattering method, for example, to have a thickness of 50 to 300 nm, preferably 70 to 200 nm. Then, the photolithographic technique is used to etch the ITO layer so that the pixel electrode PX connected to the image signal electrode SD constituting the source/drain electrode of the thin film transistor TFT through the through-hole TH is formed in the pixel area and the pad electrode TC2 of the terminal portion is formed in the area for forming the image signal line terminal DTM.

Process (G)

The photolithographic technique is used to selectively etch the gate insulation layer GI and a part of the surface protection layer of the thin film transistor TFT. The etched area is a part of the area where the pixel electrode PX does not exist in the area where the common signal line electrode CE is disposed.

The TFT substrate side is completed by the above processes.

In the embodiment, the fabrication method of the CF substrate side and the structure of the liquid crystal and the polarizing plates POL1 and POL2 are the same as those of the embodiment 1 and the description thereof is omitted.

Further, in the embodiment, the position where the common signal line CL is disposed is nearer to the liquid crystal LC than the common signal electrode CE, although the order of layers may be reversed so that the position where the common signal electrode CE is disposed is nearer to the liquid crystal LC than the common signal line CL as shown in the first embodiment. In this case, the processes (a) and (b) shown in the TFT substrate forming process is reversed and the terminal portion of the line for the scanning signal electrode GE is formed into the same shape as the above embodiment 1.

Embodiment 3

A third embodiment of the present invention is now described with reference to FIGS. 19 to 28.

In FIGS. 19 to 28, the same components as those of the foregoing embodiments are designated by the same reference symbols and its repeated description is omitted. OIL2 is a second applied-type insulation layer for improving the yield of the process.

Figure 19:
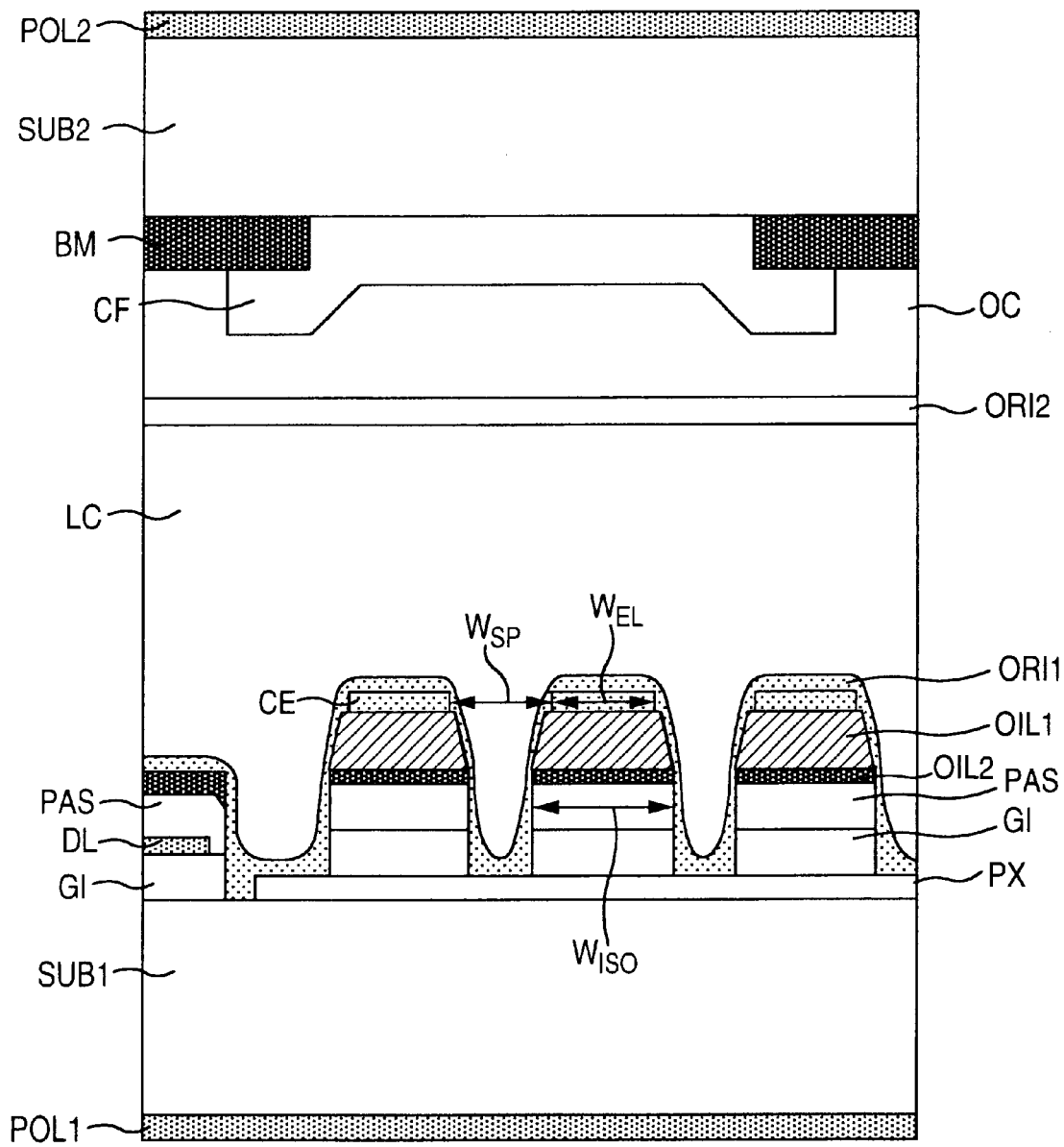
FIG. 19 is a cross sectional view including a pair of substrates opposite to each other, showing a third embodiment of the present invention, and taken along line shown by A–A' of FIG. 20 described below.
Figure 20:
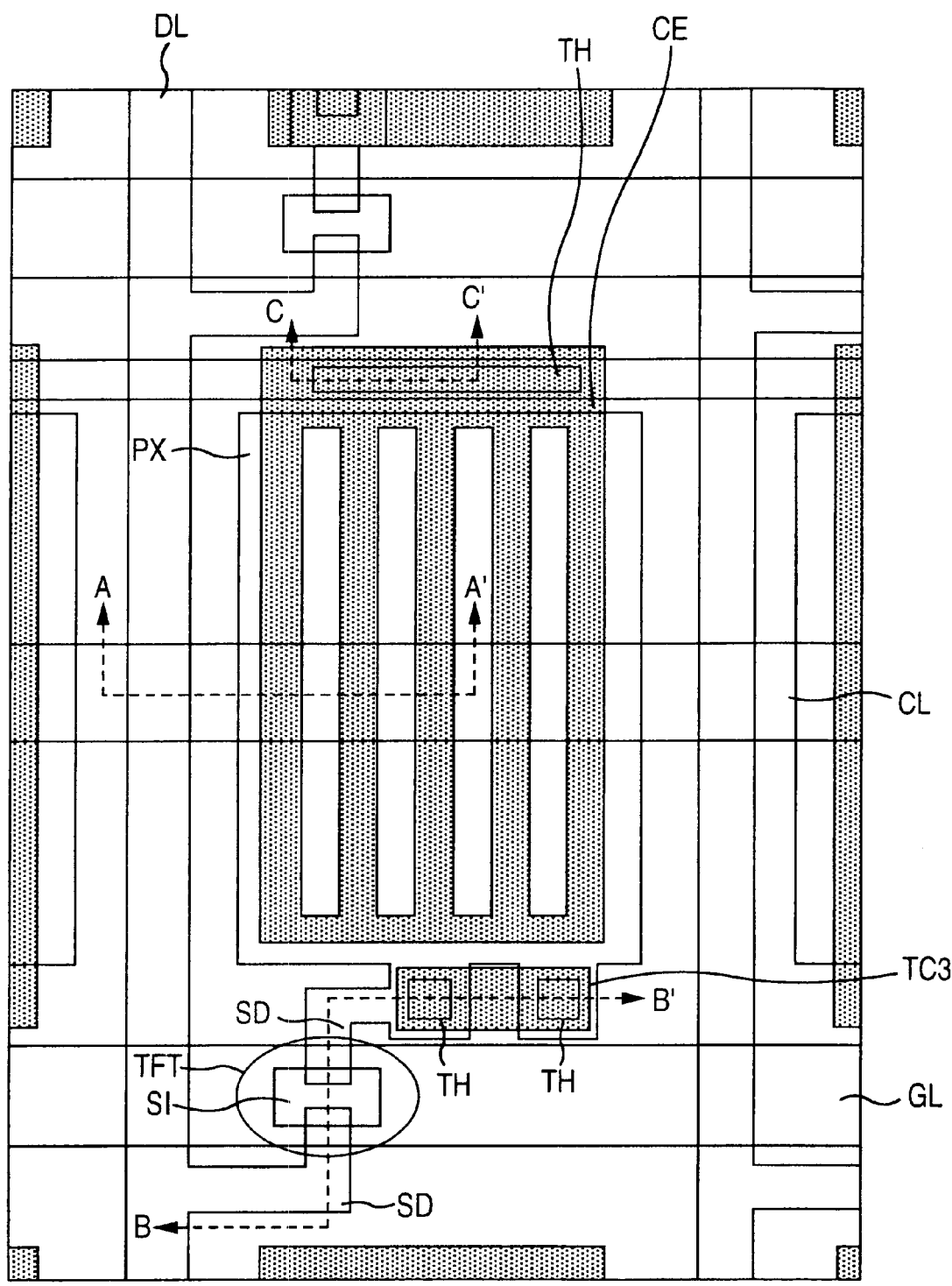
FIG. 20 is a plan view showing a surface on a TFT substrate side of a unit pixel of an active matrix type liquid crystal display unit showing the third embodiment of the present invention.
Figure 21:
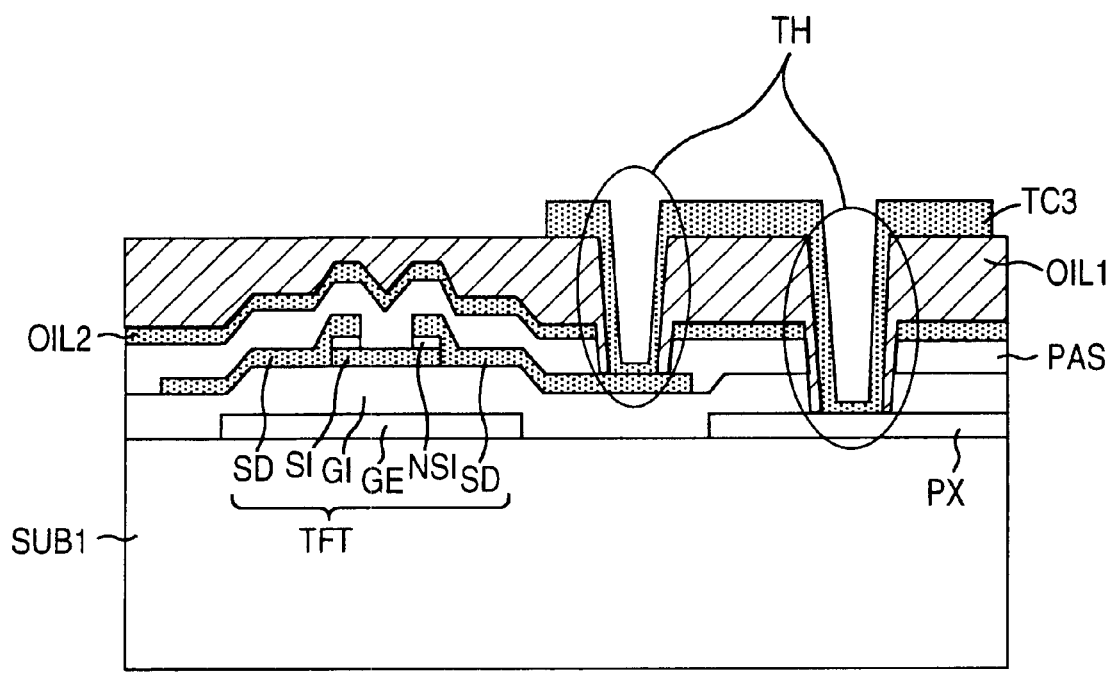
FIG. 21 is a cross sectional view on the TFT substrate side taken along line shown by B–B' of FIG. 20.
Figure 22:
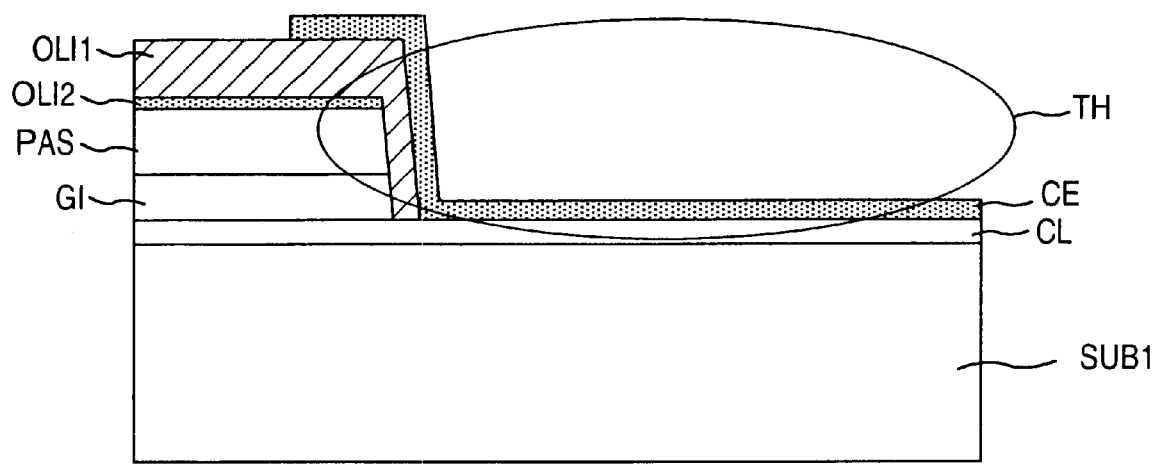
FIG. 22 is a cross sectional view on the TFT substrate side taken along line shown by C–C' of FIG. 20.

FIG. 19 is a cross sectional view, taken along line shown by A–A' of FIG. 20 described below, of the active matrix type liquid crystal display unit showing the third embodiment of the present invention, FIG. 20 is a plan view showing a surface on the TFT substrate side of a unit pixel of an active matrix type liquid crystal display unit showing the third embodiment of the present invention, FIG. 21 is a cross sectional view on the TFT substrate side taken along line shown by B–B' of FIG. 20, and FIG. 22 is a cross sectional view on the TFT substrate side taken along line shown by C–C' of FIG. 20.

In the third embodiment, the inter-layer insulation layer between the electrodes constituted by the two upper and lower transparent conductive layers includes the gate insulation layer GI, the surface protection layer PAS of the thin film transistor, the second applied-type insulation layer OIL2 and the first applied-type insulation layer OIL1 formed in the laminated structure.

According to the embodiment, by forming the applied-type insulation layer OIL1 in the area which is positioned above the pixel electrode PX and where the common signal electrode CE exists, the effects described in the embodiment 1 can be obtained and the parasitic capacitance can be reduced without increase of a driving voltage. On the other hand, by selectively forming the gate insulation layer GI and the surface protection layer PAS of the thin film transistor in the area which is positioned above the pixel electrode PX and where the common signal electrode CE exists rather than the area which is positioned above the pixel electrode PX and where the common signal electrode CE does not exist, that is, by selectively removing the gate insulation layer GI and the surface protection layer PAS of the thin film transistor in the area which is positioned above the pixel electrode PX and where the common signal electrode CE does not exist, the effect described in the embodiment 2 can be obtained and the driving voltage can be reduced. In other words, in the embodiment, the parasitic capacitance, the writing time of voltage to the liquid crystal and the driving voltage of the liquid crystal can be reduced.

Further, in the embodiment, the second applied-type insulation layer OIL2 is added newly. The thickness of the second applied-type insulation layer OIL2 is 100 to 1000 nm, more desirably 150 to 500 nm. The second applied-type insulation layer OIL2 has the function of preventing melting of the lower transparent electrode upon processing of the upper transparent electrode. When the TFT substrate is fabricated in this process, the gate insulation layer GI, the surface protection layer PAS of the thin film transistor and the second applied-type insulation layer OIL2 are disposed in the laminated structure in the area where the pixel electrode PX exists upon formation of the common signal electrode CE. Even if pinholes, crack or defective portions such as peripheral defects of step getting-over portions exist in the gate insulation layer GI and the surface protection layer of the thin film transistor TFT, the insulative characteristic of the portions can be ensured by embedding and coating effect of the second applied-type insulation layer. The pixel electrode PX can be prevented from being melted without arrival of the etching solution at the surface of the pixel electrode PX upon processing of the common signal electrode CE. Further, since the second applied-type insulation layer OIL2 is removed in the process (H) shown in FIG. 26 described later, the second applied-type insulation layer OIL2 is never left in the area which is positioned above the pixel electrode PX and where the common signal electrode CE exists when the TFT substrate is completed. Accordingly, the second applied-type insulation layer OIL2 never becomes the factor for causing increase of the driving voltage.

FIG. 21 shows a method of electrically connecting the image signal electrode SD constituting the source/drain electrode of the thin film transistor TFT to the pixel electrode PX. As shown in FIG. 21, the source/drain electrode SD of the thin film transistor is not directly connected to the pixel electrode PX and is connected thereto through the pad electrode TC2 formed of the same material and in the same process when the common signal electrode CE is formed. The reason is that a process of forming a through-hole TH in only the gate insulation layer GI is newly required in order to directly connect the source/drain electrode SD of the thin film transistor TFT to the pixel electrode PX. Accordingly, the direct connection method is not desirable since it increases the number of processes, so that the throughput is reduced and the production cost is increased. Therefore, in the embodiment, as a method of capable of forming the through-hole TH for the gate insulation layer GI and the surface protection layer of the thin film transistor TFT only by the through-hole forming process described later in the process (E) shown in FIG. 26, when the common signal electrode CE is formed, a pad electrode TC3 formed of the same material and in the same process is newly formed to connect therebetween.

In the embodiment, the area where the first applied-type insulation layer OIL1 is disposed is formed in the area which is positioned above the pixel electrode PX and where the common signal electrode CE, the through-hole TH and the terminal exposing portion do not exist. The reason is that the first applied-type insulation layer is used as a mask to make etching when the gate insulation layer GI, the surface protection layer PAS of the thin film transistor and the second applied-type insulation layer OIL2 are selectively formed as described later. With such structure, the photo-lithographic process for the selective formation can be omitted and accordingly reduction of the throughput can be suppressed as low as possible.

Furthermore, in the embodiment, the diameter of the through-hole of the first applied-type insulation layer OIL1 is made smaller than that of the surface protection layer PAS of the thin film transistor and the gate insulation layer GI. The reason is that disconnection failure caused by step getting-over processing of the common signal electrode CE is reduced. By making the diameter of the through-hole TH of the first applied-type insulation layer OIL1 smaller than that of the surface protection layer PAS of the thin film transistor and the gate insulation layer GI, the step or difference in level by the gate insulation layer GI and the protection layer of the thin film transistor TFT produced in the end portion of the through-hole TH is reduced by the leveling effect of the first applied-type insulation layer OIL1 and is formed into a gently-sloping shape. Further, since photo-image type material is used as the first applied-type insulation layer OIL1 in the embodiment, the shape of the step of the first applied-type insulation layer OIL1 has a smoothly curved surface. Consequently, the common signal electrode CE can get over the step easily and defective portions due to disconnection can be reduced.

The common signal line CL and the common signal electrode CE are connected through the through-hole TH as shown in FIG. 22. The common signal electrode CE is formed of the same material and in the same process as the scanning signal electrode GE and is formed on the first applied-type insulation layer OIL1. The diameter of the through-hole TH of the first applied-type insulation layer OIL1 formed here is made smaller than that of the through-hole TH formed in the gate insulation layer GI and the surface protection layer PAS of the thin film transistor because of the reason described in conjunction with FIG. 21 and the step of the getting-over portion is mitigated by the leveling effect of the applied-type insulation layer OIL1.

Figure 23:
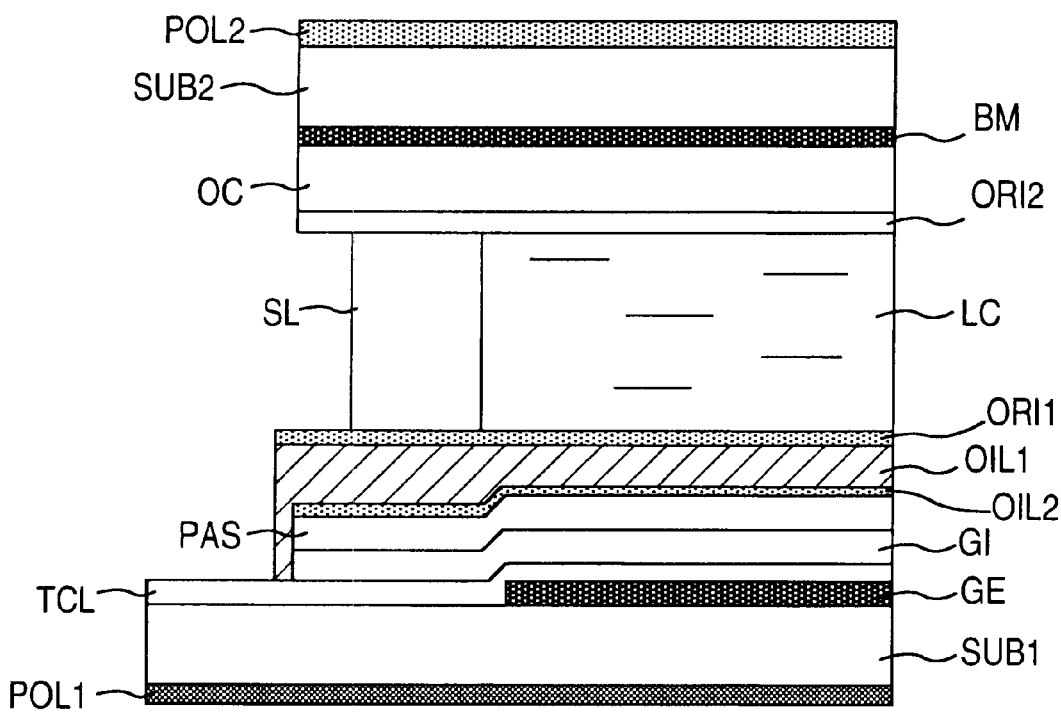
FIG. 23 shows cross sections illustrating an and of a substrate of the active matrix type liquid crystal display unit according to the embodiment of the resent invention.
Figure 23:
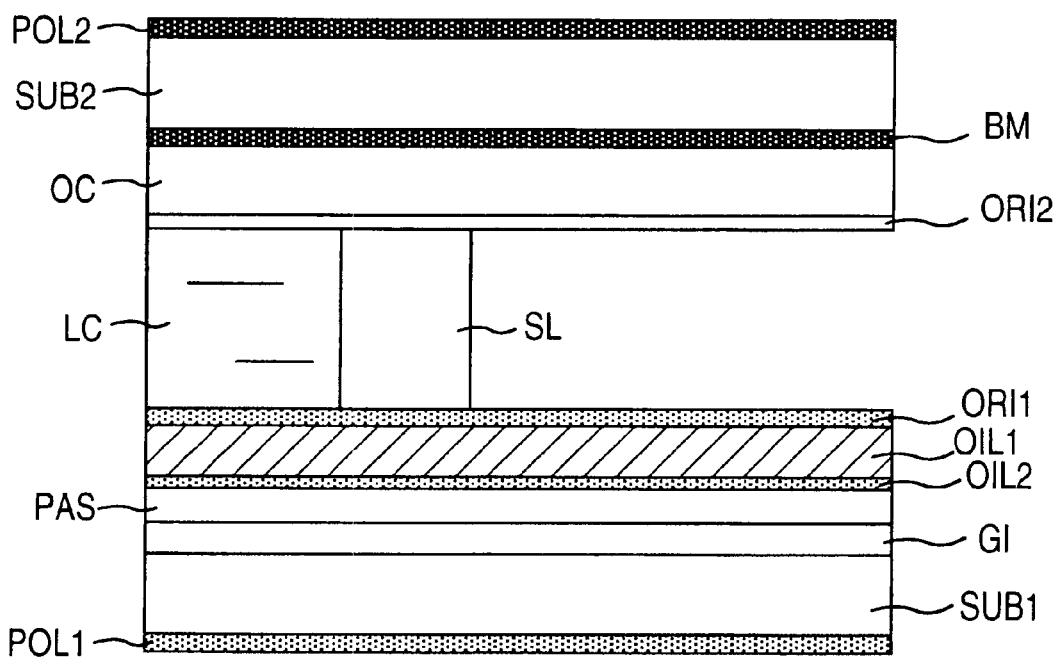
Figure 24:
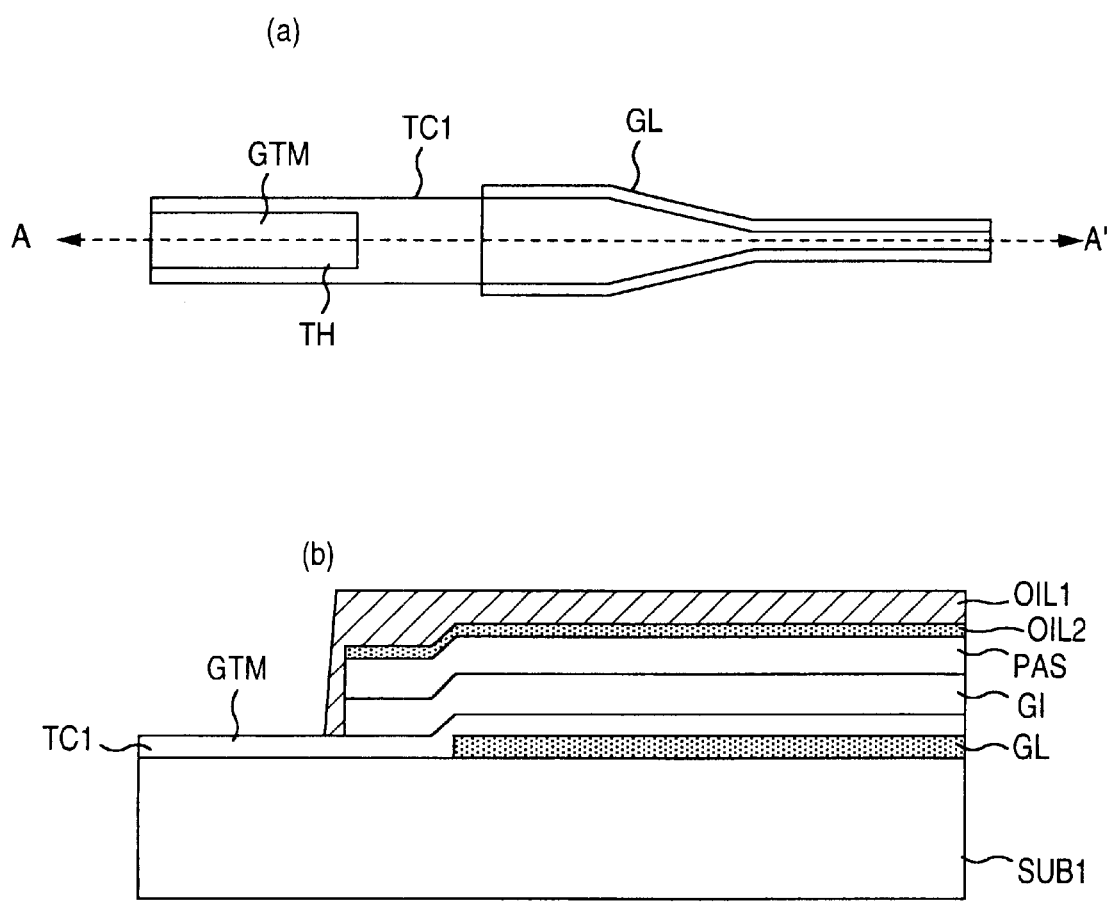
FIG. 24 shows a terminal GTM portion for a scanning signal line GL of the active matrix type liquid crystal display unit according to the present invention in plan view (a) and in cross section (b) taken along line shown by A–A'.
Figure 25:
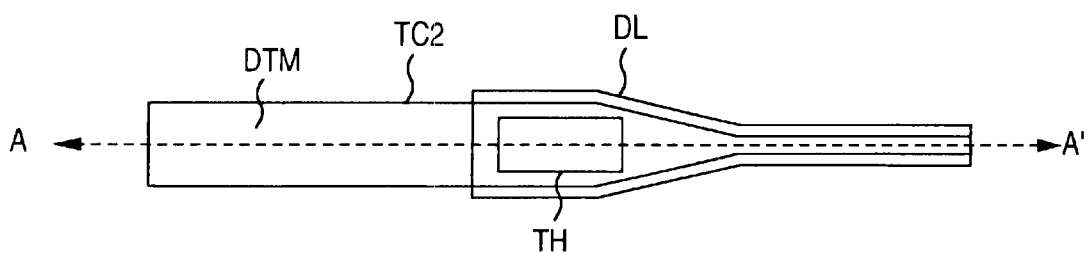
FIG. 25 shows a terminal DTM portion for an image signal line DL of the active matrix type liquid crystal display unit according to the present invention in plan view (a) and in cross section (b) taken along line shown by A–A'.
Figure 25:
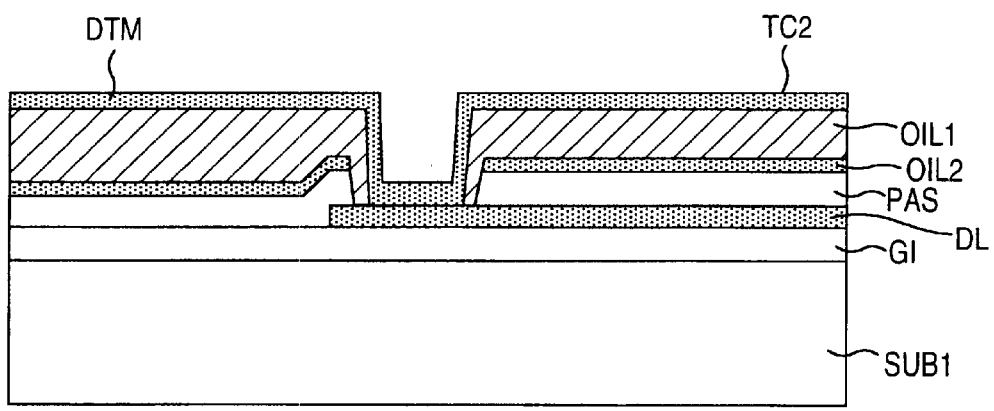

FIG. 23 shows cross sections of an end of a substrate of the active matrix type liquid crystal display unit according to the embodiment of the present invention, in which FIG. 23($a$) shows the end on the side that the scanning signal line terminal GTL is disposed and FIG. 23($b$) shows the end on the side of the liquid crystal sealing opening. FIG. 24 shows the terminal GTM portion for scanning signal line of the active matrix type liquid display unit according to the third embodiment in plan view (a) and in cross section (b) taken along line shown by A–A'. FIG. 25 shows the terminal DTM portion for the image signal line of the active matrix type liquid crystal display unit according to the third embodiment in plan view (a) and in cross section (b) taken along line shown by A–A'.

In the embodiment, the electric circuit of the liquid crystal display unit is the same as that of the embodiment 1 and the drawing and the description thereof are omitted.

In the embodiment, the shape of the end of the substrate shown in FIG. 23 is the same as that of the embodiment 1 except the shape of the scanning signal line terminal GTM and the description there of is omitted.

In the embodiment, the scanning signal line terminal GTM shown in FIG. 24 has the same structure as that of the embodiment 1 except that the second applied-type insulation layer OIL1 is disposed on the surface protection layer PAS of the thin film transistor TFT and the description thereof is omitted.

The image signal line terminal DTM is shown in FIG. 25, while the diameter of the through-hole of the first applied-type insulation layer OIL1 is made smaller than that of the surface protection layer PAS of the thin film transistor and the gate insulation layer GI for the purpose of mitigation of the step of the getting-over portion and the terminal portion for the image signal line DL is also structured in the same manner. Other structure is the same as the embodiment 1 and the description thereof is omitted.

In the embodiment, the width of the pixel electrodes PX processed in the form of slits and a space therebetween were both set to 3 $\mu$m, for example. The width of the pattern formed in the area which is positioned above the common signal electrode of the first applied-type insulation layer OIL1 and where the pixel electrode PX exists in conformity with the shape of the pixel electrode PX was set to 4 $\mu$m. Further, the width of the pattern of the second applied-type insulation layer OIL2, the surface protection layer PAS of the thin film transistor and the gate insulation layer GI is 4 $\mu$m since the first applied-type insulation layer OIL1 is used as a mask to form them as described later.

Even in the embodiment, similarly to the embodiments 1 and 2, the pattern width $W_{ISO}(\mu m)$ of the selectively formed insulation layer has desirably a margin or space with respect to the width $W_{EL}$ ($\mu$m) of the pixel electrode PX in consideration of the alignment accuracy of pattern and the accuracy of the processing dimensions in the photolithographic process. Concretely, it is preferable that the pattern width $W_{ISO}$ of the insulation layer satisfies the condition of $W_{ISO} \leq W_{EL}+2(\mu m)$ where $W_{ISO}>0$, $W_{ISO}<W_{EL}+W_{SP}$ and $W_{SP}$ ($\mu$m) is a space between the pixel electrodes. In the embodiment, a width of one protrusion was set to a value larger than 0 $\mu$m and smaller than 1 $\mu$m, for example, 0.5 $\mu$m. That is, $W_{ISO}=W_{EL}+1(\mu m)$.

Figure 26:
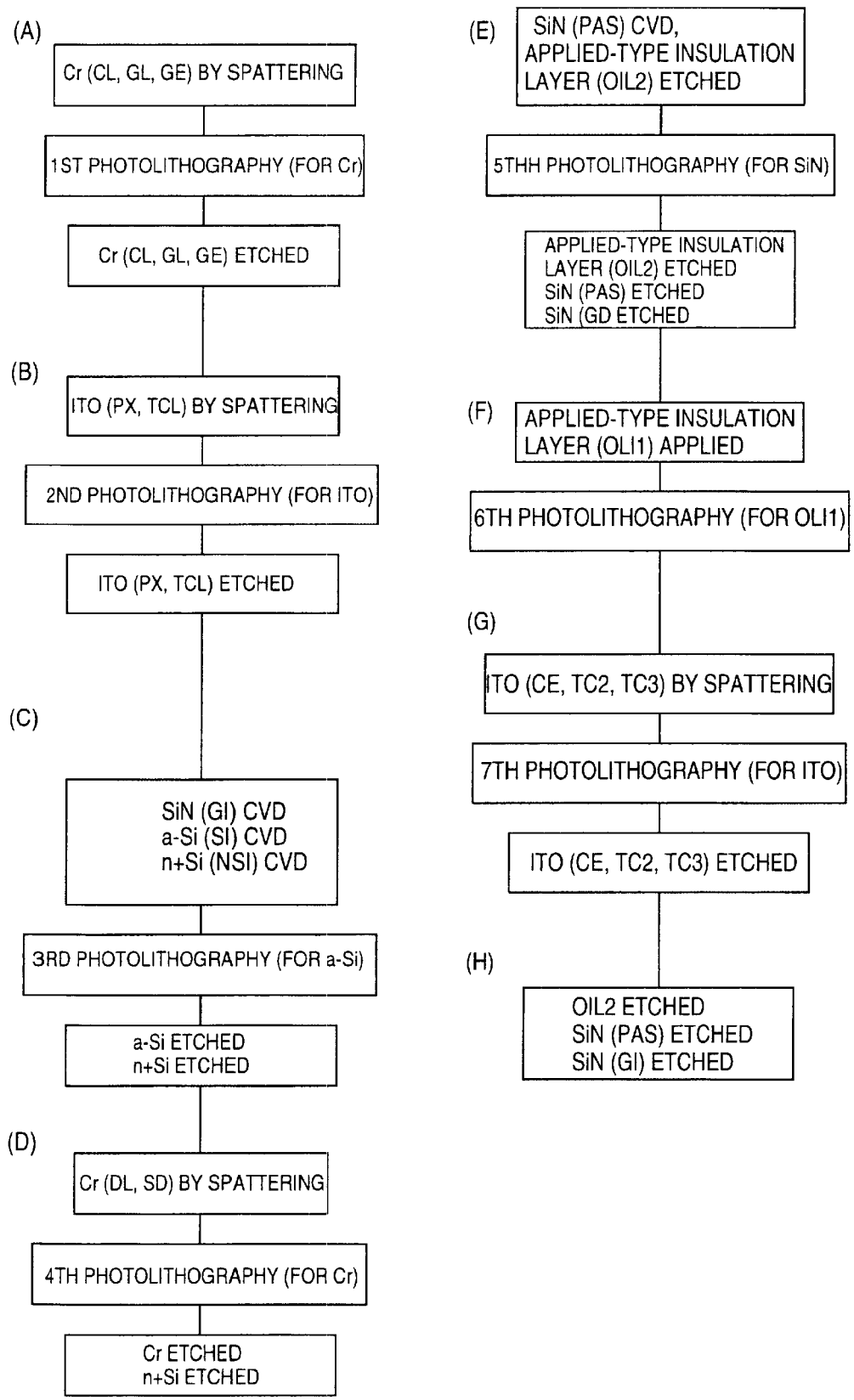
FIG. 26 is a diagram showing a processing flow for realizing structure of the third embodiment of the present invention.
Figure 27:
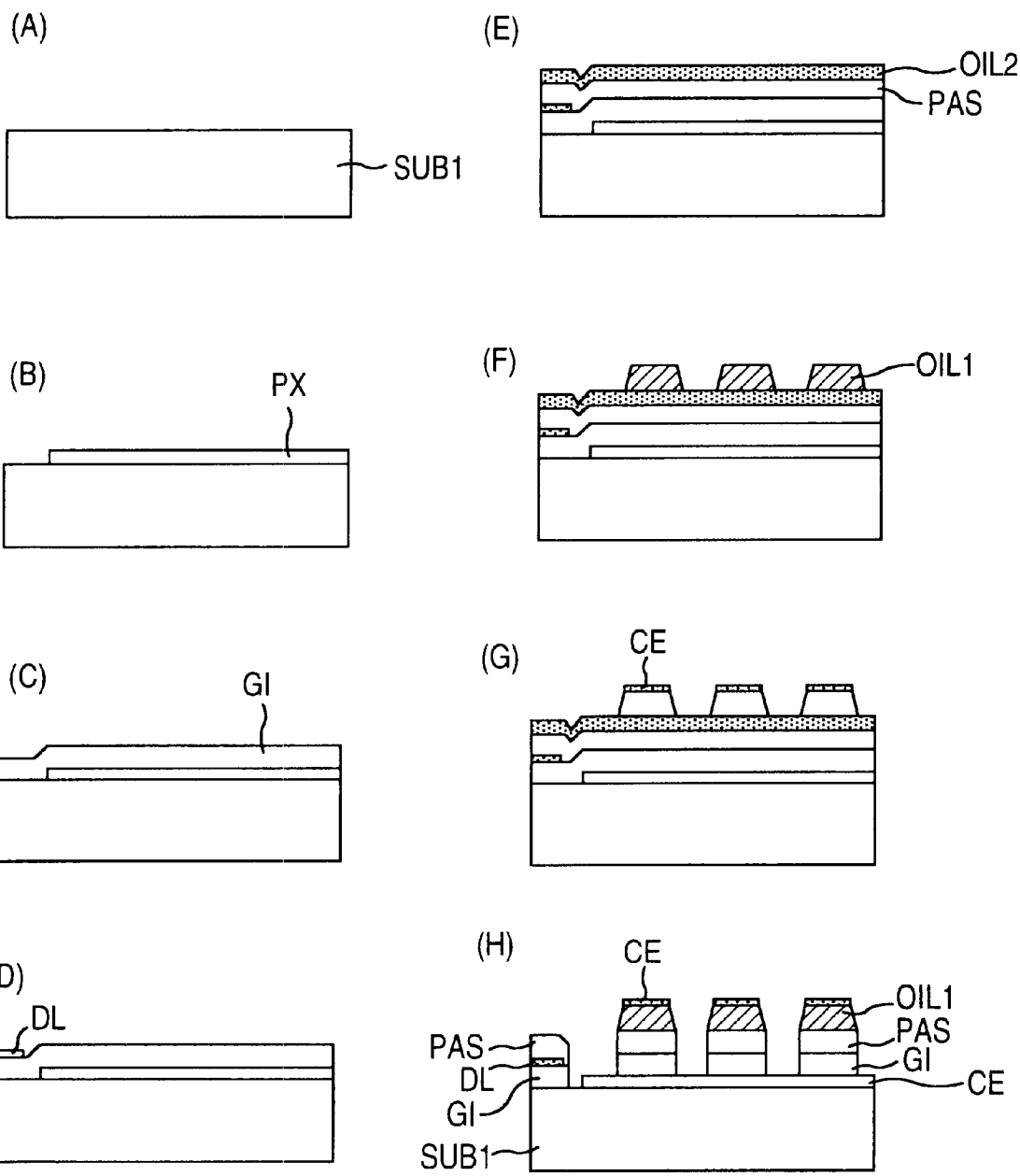
FIG. 27 shows cross sections taken along the line shown by A–A' of FIG. 20 in case where the TFT substrate is fabricated in accordance with the processing flow of FIG. 26.
Figure 28:
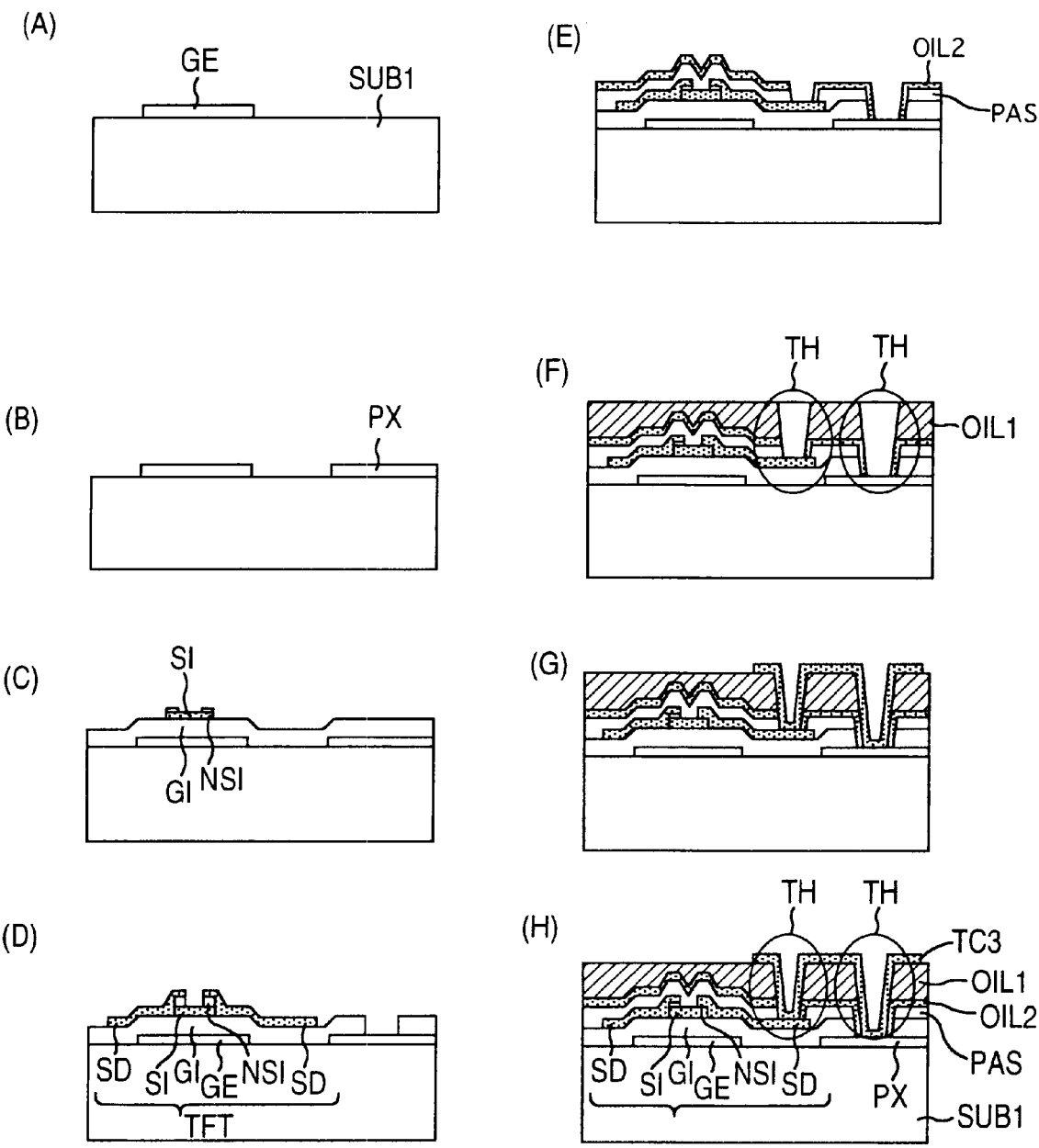
FIG. 28 shows cross sections taken along the line shown by B–B' of FIG. 20 in case where the TFT substrate is fabricated in accordance with the processing flow of FIG. 26.

In the third embodiment, a definite example of the forming method is now described by using cross-sectional views for fabricating processes of the TFT substrate shown in FIGS. 26 to 28. FIG. 26 is a diagram showing processing flows for realizing structure of the third embodiment of the present invention. FIG. 27 shows cross sections taken along line shown by A–A' of FIG. 20 in case where the TFT substrate is fabricated in accordance with the processing flows of FIG. 26. FIG. 28 shows cross sections taken along line shown by B–B' of FIG. 20 in case where the TFT substrate is fabricated in accordance with the processing flows of FIG. 26.

In the embodiment 3, the TFT substrate is completed by way of eight photolithographic processes (A) to (H) concretely. Description is now made in order of processes.

Process (A)

The transparent insulation substrate SUB1 is provided and the Cr layer is formed on the whole surface area of the transparent insulation substrate SUB1 by means of the spattering method, for example, to have a thickness of 100 to 500 nm, preferably 150 to 350 nm. Then, the photolithographic technique is used to selectively etch the Cr layer so that the scanning signal electrode GE, the scanning signal line GL and the common signal line CL are formed in the pixel area and the extension portion of the scanning signal line GL is formed in the area for forming the scanning signal line terminal GTM.

Process (B)

The transparent conductive layer such as the ITO layer is formed on the whole surface area of the transparent insulation substrate SUB1 by means of the spattering method, for example, to have a thickness of 50 to 300 nm, preferably 70 to 200 nm. Then, the photolithographic technique is used to etch the ITO layer so that the pixel electrode PX is formed in the pixel area and the pad electrodes TC1 for the scanning signal line terminals GTM and the terminal CTM for the common signal line CL are formed in the area for forming the scanning signal line terminals GTM and the area for forming the common signal line terminal CTM, respectively.

Process (C)

The silicon nitride layer constituting the gate insulation layer GI is formed on the whole surface area of the transparent insulation substrate SUB1 by means of the plasma CVD method, for example, to have a thickness of about 200 to 700 nm, preferably 300 to 500 nm. Further, an amorphous silicon layer is formed on the whole surface area of the gate insulation layer GI to have a thickness of 50 to 300 nm, preferably 100 to 200 nm and an amorphous silicon layer doped with phosphorus as n-type impurity is further formed thereon to have a thickness of 10 to 100 nm, preferably 20 to 60 nm successively by means of the plasma CVD method, for example. Then, the photolithographic technique is used to etch the amorphous silicon layer so that the semiconductor layer SI of the thin film transistor TFT is formed in the pixel area.

Process (D)

The Cr layer is formed on the whole surface area of the transparent insulation substrate SUB1 by means of the spattering method, for example, to have a thickness of 100 to 500 nm, preferably 150 to 350 nm. Then, the photolithographic technique is used to etch the Cr layer so that the image signal electrode SD constituting the source/drain electrode of the thin film transistor TFT and the image signal line DL which is the extension portion of the image signal electrode SD are formed in the pixel area and the extension portion of the image signal line DL is formed in the area for forming the image signal line terminal DTM. Thereafter, the pattern obtained by etching the Cr layer is used as a mask to etch the amorphous silicon layer doped with phosphorus as n-type impurity.

Process (E)

An silicon nitride layer constituting the surface protection layer PAS of the thin film transistor TFT is formed on the whole surface area of the transparent insulation substrate SUB1 by means of the plasma CVD method, for example, to have a thickness of 200 to 700 nm, preferably 300 to 500 nm. Further, the second applied-type insulation layer OIL2 made of insulation layer such as various organic resins containing polyimide system, acryl system polymer, epoxy system polymer and benzine cyclo buden system polymer or inorganic polymer containing Si meltable in organic solvent, for example SOG layer is formed on the whole surface area of the surface protection layer by means of the spin coat method, for example, to have a thickness of 100 nm to 1000 nm, preferably 150 to 500 nm. Then, the photolithographic technique is used to etch the surface protection layer PAS and the second applied insulation layer OIL2 so that the through-hole TH for exposing a part of the pixel electrode PX and the image signal electrode SD constituting the source/drain electrode of the thin film transistor TFT is formed in the pixel area. Further, the through-hole TH is extended to reach the gate insulation layer GI positioned in a lower layer of the surface protection layer PAS, so that a through-hole TH for exposing a part of the pad electrode TC1 for the scanning signal line terminal GTM is formed in the area for forming the image signal line terminal DTM. A through-hole TH for exposing the extension portion of the image signal line DL is formed in the area for forming the image signal line terminal DTM and a through-hole TH for exposing a part of the common signal line CL is formed on the common signal line CL.

Process (F)

The first applied-type insulation layer OIL1 made of insulation layer such as various organic resins containing polyimide system, acryl system polymer, epoxy system polymer and benzine cyclo buden system polymer or inorganic polymer containing Si meltable in organic solvent, for example SOG layer, is formed on the whole surface area of the transparent insulation substrate SUB1 by means of the spin coat method, for example, to have a thickness of 200 nm to 4 $\mu$m, preferably 500 to 2 $\mu$m. Then, the photolithographic technique is used to selectively form the applied-type insulation layer. The area where the applied-type insulation layer is a part of the area obtained by removing the area where the through-hole TH is formed in the process (H) and the area which is positioned above the pixel electrode PX and where the common signal electrode CE formed in the later process does not exist.

Process (G)

The transparent conductive layer such as the ITO layer is formed on the whole surface area of the transparent insulation substrate SUB1 by means of the spattering method, for example, to have a thickness of 50 to 300 nm, preferably 70 to 200 nm. Then, the photolithographic technique is used to etch the ITO layer so that the common signal electrode CE connected through the through-hole TH to the common signal line CL and the pad electrode TC3 for electrically connecting the drain line of the thin film transistor TFT to the pixel electrode PS are formed in the pixel area and the pad electrode TC2 is formed in the area for forming the image signal line terminal DTM.

Process (H)

The selectively formed first applied-type insulation layer OIL1 fabricated in the process (F) is used as a mask to selectively form the second applied-type insulation layer OIL2, the surface protection layer PAS of the thin film transistor and the gate insulation layer GI. The portion where the applied-type insulation layer OIL1, the protection layer for the thin film transistor TFT and the gate insulation layer GI are left by means of this process is only the area where the applied-type insulation layer OIL1 formed in the process (F) exists.

The TFT substrate side is completed by the above processes.

In the embodiment, the fabrication method of the CF substrate side and the structure of the liquid crystal and the polarizing plates POL1 and POL2 are the same as those of the embodiment 1 and the description thereof is omitted.

In the embodiment, three laminated insulation layers including the second applied-type insulation layer OIL2, the surface protection layer of the thin film transistor TFT and the gate insulation layer GI are selectively removed by the etching process (H) of FIG. 26, while at this time the first applied-type insulation layer formed in the process (F) is used as a mask to form the pattern in self-alignment manner collectively without implementation of the exposure and development process using the resist. Thus, the structure shown in the embodiment can be realized while the number of processes is suppressed as low as possible. Further, by implementing this system, not only the process is not increased but also the surface protection layer of the thin film transistor TFT and the gate insulation layer GI can be removed without any deviation in alignment of the pattern with the second applied-type insulation layer OIL1. In this case the second applied-type insulation layer is formed in a part of the area excepting the area which is positioned above the terminal exposing portion, the through-hole TH and the pixel electrode PX and where the common signal electrode CE does not exist. It is needless to say that the exposure and development process using the resist may be added newly to form the inter-layer insulation layer collectively without using the applied-type insulation layer OIL1 formed in the process (F) as a mask.

In the embodiment, the second applied-type insulation layer is added newly in order to protect the pixel electrode PX, metal wire and electrodes upon processing of the common signal electrode CE, while only one applied-type insulation layer OIL1 having the effect of the OIL2 described in the embodiment may be provided to obtain the same effects. In this case, the OIL1 has the structure in which the thin film is left in the selectively formed area instead of removal of all of insulation layers except the selectively formed area in the exposure and development process of the process (F).

In the embodiment, the photo-image formation type insulation layer is used as the first applied-type insulation layer OIL1, while the pattern of the first applied-type insulation layer OIL1 may be formed by etching using the photolithographic process as the above embodiment 1. Further, thermosetting insulation layer may be used as the first applied-type insulation layer OIL1 to form the pattern by the dry etching method or the ion milling method using the oxygen as reaction gas. In this case, it is necessary to thicken the resist layer used in the photolithographic process, by the etching method in consideration of the thickness etched. Further, when the pattern is formed by the etching process, the applied-type insulation layer OIL1 can be formed by etching the pattern by using the resist used when the common signal electrode CE is formed after formation of the common signal electrode CE. However, it is necessary to previously form the through-hole TH in the terminal portion of the image signal line DL before the process of forming the common signal electrode CE. However, by implementing the above process, it is needless to say that there occurs the effect that deviation in alignment is not produced since the common signal electrode and the first applied-type insulation layer OIL1 are patterned in self-alignment manner.

Embodiment 4

Figure 29:
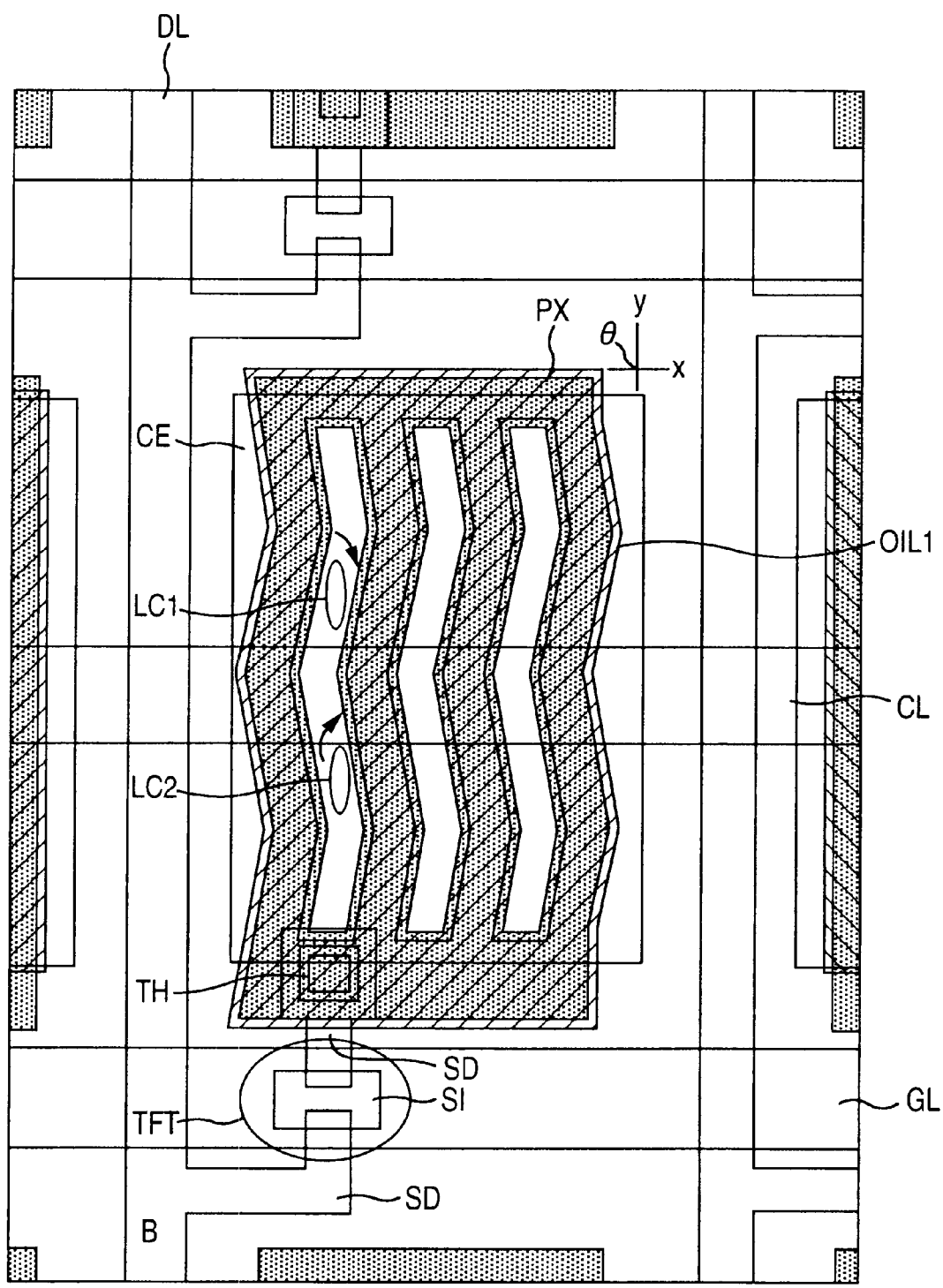
FIG. 29 is a plan view showing a surface on a TFT substrate side of a unit pixel of an active matrix type liquid crystal display unit showing a fourth embodiment of the present invention.

FIG. 29 is a plan view showing a surface on the TFT substrate side of a unit pixel of the active matrix type liquid crystal display unit showing a fourth embodiment of the present invention.

In FIG. 29, the same components as those of the above embodiments are designated by the same reference symbols and the repeated description thereof is omitted.

In the fourth embodiment, the electric circuit, the cross sectional view of the active matrix type liquid crystal display unit, the shape of the terminals, the terminal portion GTM for the scanning signal line, the terminal portion for the image signal line and the processing flow for realizing the structure are the same as those of the embodiment 1 and the description thereof is omitted. Further, since the effects of the applied-type insulation layer OIL1 are the same as those of the embodiment 1, description thereof is omitted.

In the embodiment, a curved portion is provided in the pixel electrode PX in the embodiment 1. In the embodiment, the above embodiment 1 is applied to a so-called multi-domain system liquid crystal display unit.

The multi-domain system is to form, in the pixel areas, areas in which directions of the electric field (horizontal field) produced in the spreading direction of the liquid crystal are different so that the twisted direction of liquid crystal molecules in each area (LC1 and LC2 in FIG. 29) is reversed to thereby provide the effect for canceling difference in coloration produced when a display area is viewed from right and left. More particularly, as shown in FIG. 29, belt-shaped pixel electrodes PX extending in one direction and put side by side in the orthogonal direction to the one direction are inclined or curved repeatedly zigzag at an angle (−2θ) to the one direction (the range of 5 to 45 degrees is proper when the rubbing direction of the orientation layer ORI1 is brought in line with the direction of the image signal line DL in the P-type liquid crystal) and are disposed above the common signal electrode CE through the insulation layer, so that the effect of the multi-domain system can be attained. Particularly, the electric field produced between the common signal electrode and the pixel electrode in the vicinity of the curved portions of the pixel electrode PX is confirmed to be produced in the quite same manner as the electric field produced between the common signal electrode CE and the pixel electrode PX in other portions of the pixel electrode PX and the light transmission factor is not reduced in the vicinity of the curved portions of the pixel electrode PX. (Heretofore, it is named a so-called discrimination area and the twisted direction of the liquid crystal molecules becomes random so that impermeable portions are produced.) Further, in the embodiment, the pixel electrode PX is extended in the y direction in FIG. 29, while the pixel electrode may be extended in the x direction in FIG. 29 and be formed with curved portions so that the effect of the multi-domain system can be provided.

According to the embodiment, the effect of the multi-domain system can be obtained in addition to the effect of the reduced parasitic capacitance described in the embodiment 1.

In the embodiment, with the structure that the gate insulation layer GI and the surface protection layer PAS of the thin film transistor TFT are selectively formed and the insulation layer is not disposed in the area which is positioned above the lower transparent electrode and where the upper transparent electrode exists, the effect of the reduced driving voltage can be also obtained in addition to the effect of the reduced parasitic capacitance.

Embodiment 5

Figure 30:
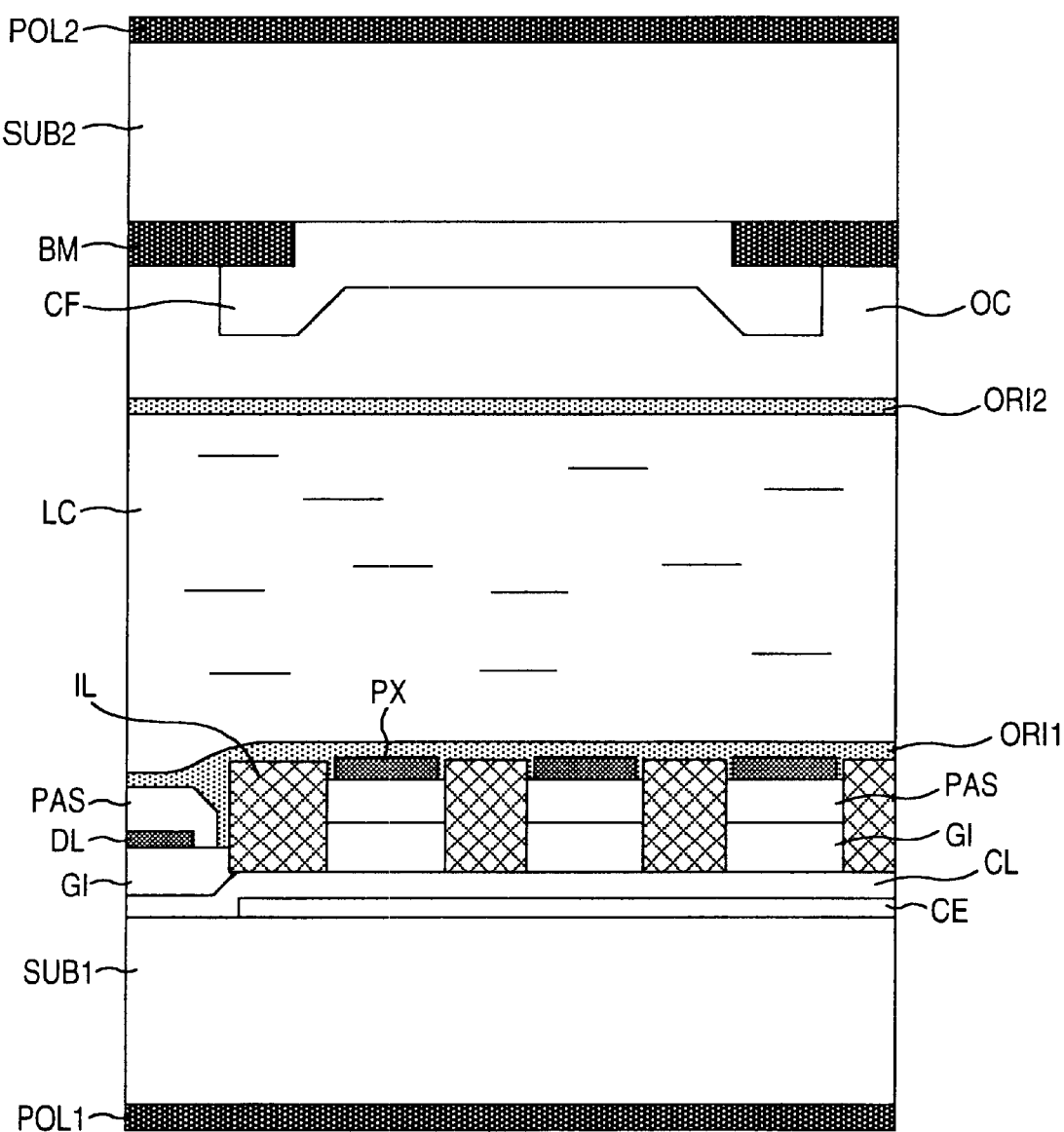
FIG. 30 is a cross sectional view illustrating an active matrix type liquid crystal display unit showing a fifth embodiment of the present invention.

FIG. 30 is a cross sectional view of the active matrix type liquid crystal display unit showing a fifth embodiment of the present invention.

In FIG. 30, the same components as those of the above embodiments are designated by the same reference symbols and the repeated description thereof is omitted.

IL represents an insulation layer which is newly inserted in order to reduce the driving voltage.

In the fifth embodiment, the plan view of the active matrix type liquid display unit, the shape of the terminals, the scanning signal line terminal portion GTM, the image signal line terminal portion and the processing flow for realizing the structure are the same as those of the embodiment 2 and the description thereof is omitted.

In the embodiment, the insulation layer IL is selectively formed newly in the area which is positioned above the common signal electrode CE and where the pixel electrode PX does not exist after the processing flow described in the embodiment 2 in order to reduce the driving voltage. The insulation layer IL is characterized in that the dielectric constant thereof is higher than that of the insulation layer removed selectively in the same area. Further, the insulation layer IL is also characterized in that the insulation layer IL is formed below the orientation layer ORI1 in the area which is positioned above the common signal electrode CE and where the pixel electrode PX does not exist and the thickness of the insulation layer IL is substantially equal to a sum of a total thickness of the insulation layers in the area which is positioned above the common signal electrode CE and where the pixel electrode PX exists and the thickness of the pixel electrode PX.

According to the embodiment, by newly forming the insulation layer having the higher dielectric constant in the area where the insulation layer is selectively removed, the driving voltage can be reduced without influence of the dielectric constant of the liquid crystal. In this case, the higher the dielectric constant of the insulation layer IL is, the more the effect of reducing the driving voltage is.

Moreover, according to the embodiment, the insulation layer IL is disposed in the area where the gate insulation layer GI and the surface protection layer of the thin film transistor are selectively removed, so that difference of gaps due to a step of the liquid crystal disposed between the TFT substrate and the CF substrate can be reduced to about 0 to attain satisfactory display without display failure due to scattered gaps.

Figure 31:
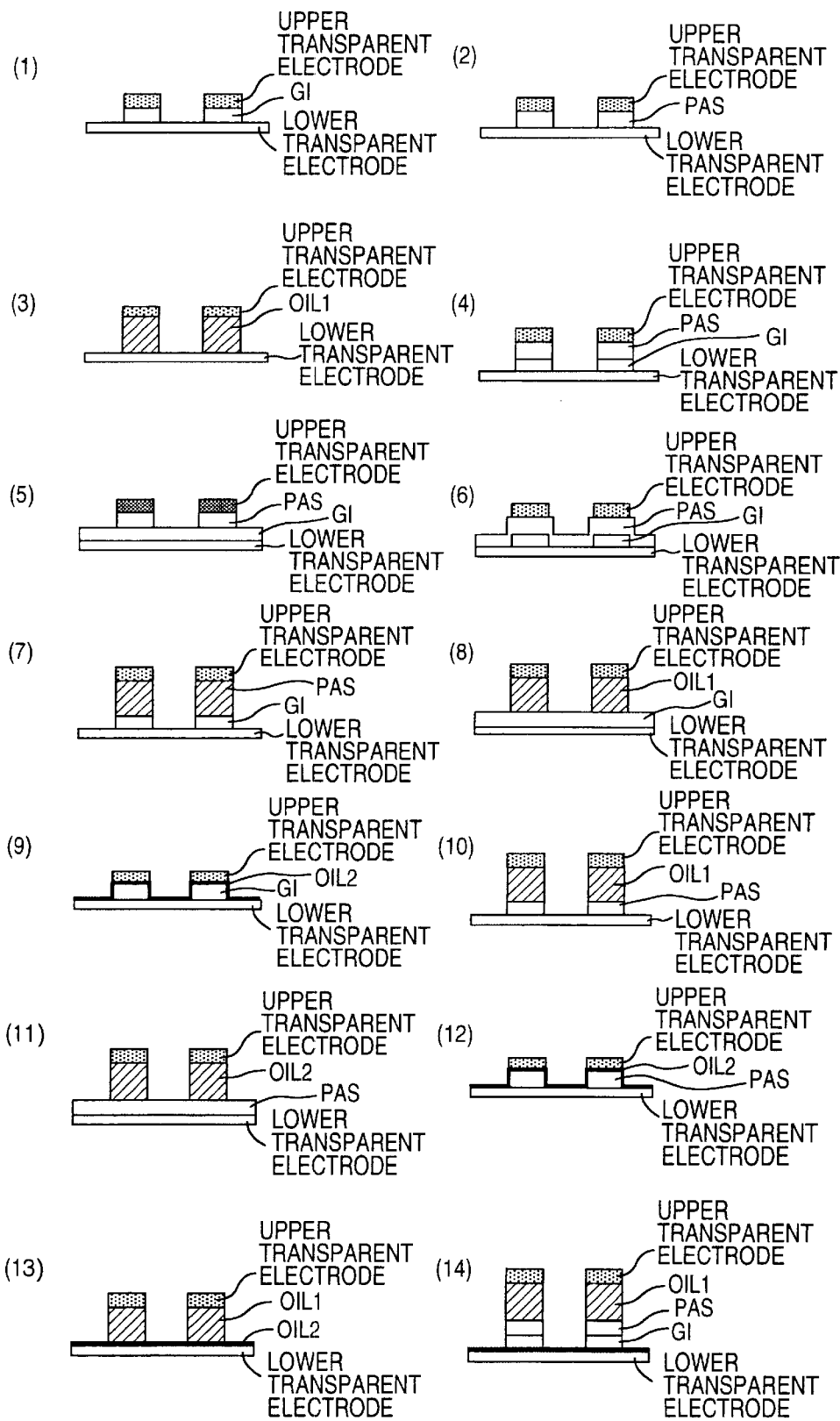
FIG. 31 shows various insulation layers formed between two upper and lower transparent electrodes in the first to fifth embodiments.
Figure 32:
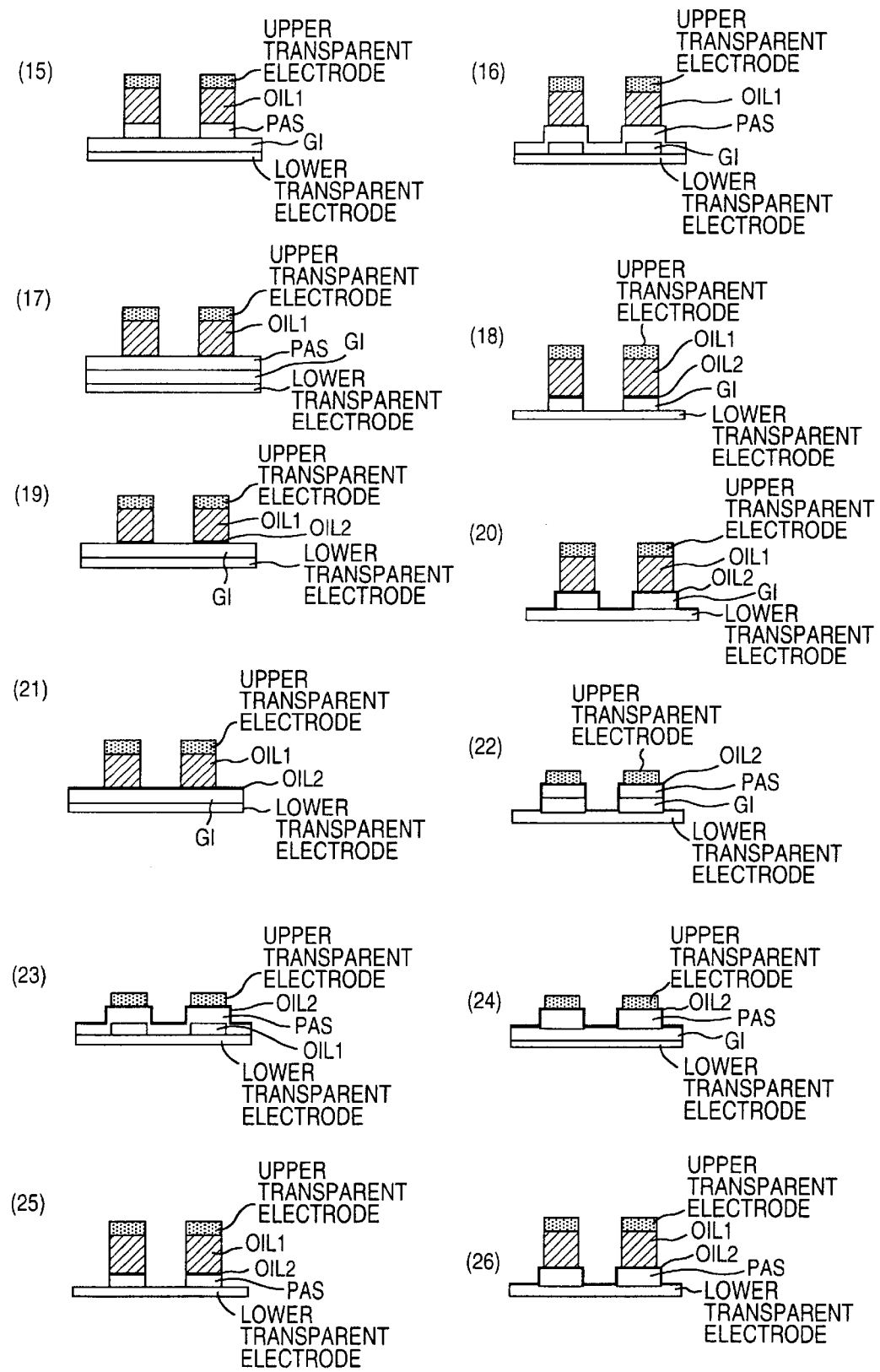
FIG. 32 shows various insulation layers formed between two upper and lower transparent electrodes in the first to fifth embodiments.
Figure 33:
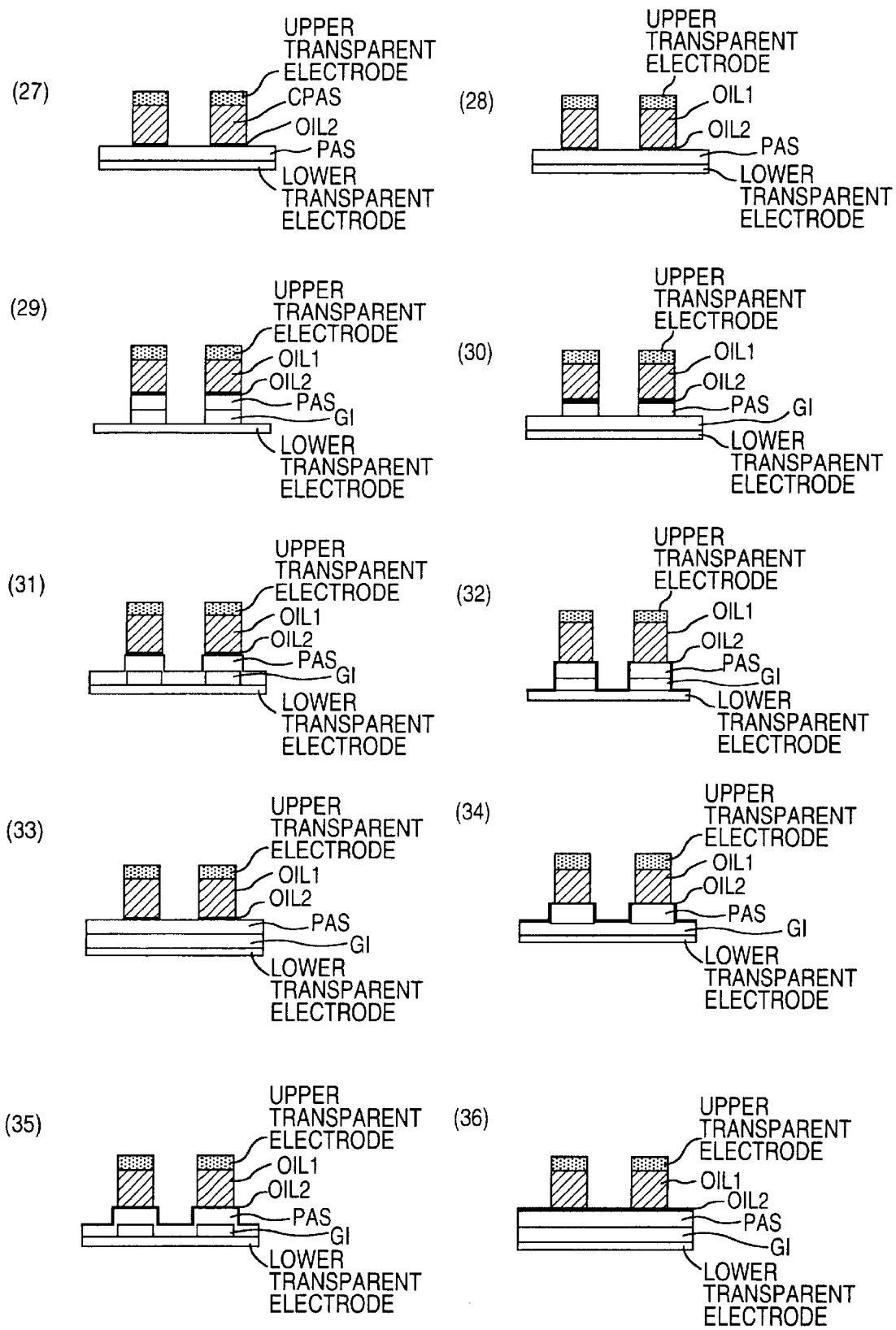
FIG. 33 shows various insulation layers formed between two upper and lower transparent electrodes in the first to fifth embodiments.

In addition to all of the embodiments described above, there are various realization methods depending on kinds of the insulation layers formed between the two upper and lower transparent layers and kinds of the insulation layers formed selectively. FIGS. 31 to 33 show examples of structures of realizable insulation layers. Concretely, the kinds and the shape of insulation layers formed in the processes existing while the two upper and lower transparent electrodes are formed in each of the structures of (1) to (36) are described individually. As described so far, since the first applied-type insulation layer OIL1 is material disposed in order to reduce the parasitic capacitance without increase of the driving voltage, it is natural that the first applied-type insulation layer OIL1 is formed selectively in the area which is positioned above the lower transparent electrode and where the upper transparent electrode layer exists between the two upper and lower transparent electrode layers. Accordingly, it is not described below that the first applied-type insulation layer OIL1 is formed selectively. The selective removal of the gate insulation layer GI, the surface protection layer PAS of the thin film transistor TFT and the second applied-type insulation layer OIL2 is to reduce the driving voltage. Accordingly, the area where the gate insulation layer GI and the surface protection layer PAS of the thin film transistor are removed selectively is not described below, while the area is the area which is positioned above the lower transparent electrode and where the upper transparent electrode does not exist.

(1) The single gate insulation layer GI is disposed between the two upper and lower transparent electrodes and in order to reduce the driving voltage the gate insulation layer GI is removed selectively.

(2) The single surface protection layer PAS of the thin film transistor TFT is disposed between the two upper and lower transparent electrodes and in order to reduce the driving voltage the surface protection layer PAS of the thin film transistor TFT is removed selectively.

(3) Only the first applied-type insulation layer is disposed between the two upper and lower transparent electrodes.

(4) Two laminated layers including the gate insulation layer GI and the surface protection layer PAS of the thin film transistor TFT are disposed between the two upper and lower transparent electrodes and both of the gate insulation layer GI and the surface protection layer PAS of the thin film transistor TFT are removed selectively. This structure is that of the above embodiment 2.

(5) Two laminated layers including the gate insulation layer GI and the surface protection layer PAS of the thin film transistor TFT are disposed between the two upper and lower transparent electrodes and only the surface protection layer PAS of the thin film transistor TFT is removed selectively.

(6) Two laminated layers including the gate insulation layer GI and the surface protection layer PAS of the thin film transistor TFT are disposed between the two upper and lower transparent electrodes and only the gate insulation layer GI is removed selectively.

(7) Two laminated layers including the gate insulation layer GI and the first applied-type insulation layer OIL1 are disposed between the two upper and lower transparent electrodes and the gate insulation layer GI is removed selectively.

(8) Two laminated layers including the gate insulation layer GI and the first applied-type insulation layer OIL1 are disposed between the two upper and lower transparent electrodes.

(9) Two laminated layers including the gate insulation layer GI and the second applied-type insulation layer OIL2 are disposed between the two upper and lower transparent electrodes and the gate insulation layer GI is removed selectively.

(10) Two laminated layers including the surface protection layer PAS of the thin film transistor TFT and the first applied-type insulation layer OIL1 are disposed between the two upper and lower transparent electrodes and the surface protection layer PAS of the thin film transistor TFT is removed selectively.

(11) Two laminated layers including the surface protection layer PAS of the thin film transistor TFT and the first applied-type insulation layer OIL1 are disposed between the two upper and lower transparent electrodes.

(12) Two laminated layers including the surface protection layer PAS of the thin film transistor TFT and the second applied-type insulation layer OIL2 are disposed between the two upper and lower transparent electrodes and the surface protection layer PAS of the thin film transistor TFT is removed selectively.

(13) Two laminated layers including the first applied-type insulation layer OIL1 and the second applied-type insulation layer OIL2 are disposed between the two upper and lower transparent electrodes.

(14) Three laminated layers including the gate insulation layer GI, the surface protection layer PAS of the thin film transistor TFT and the first applied-type insulation layer OIL1 are disposed between the two upper and lower transparent electrodes and both of the gate insulation layer GI and the surface protection layer PAS of the thin film transistor TFT are removed selectively.

(15) Three laminated layers including the gate insulation layer GI, the surface protection layer PAS of the thin film transistor TFT and the first applied-type insulation layer OIL1 are disposed between the two upper and lower transparent electrodes and the surface protection layer of the thin film transistor TFT is removed selectively.

(16) Three laminated layers including the gate insulation layer GI, the surface protection layer PAS of the thin film transistor TFT and the first applied-type insulation layer OIL1 are disposed between the two upper and lower transparent electrodes and the gate insulation layer GI is removed selectively.

(17) Three laminated layers including the gate insulation layer GI, the surface protection layer PAS of the thin film transistor TFT and the first applied-type insulation layer OIL1 are disposed between the two upper and lower transparent electrodes. This structure is that of the embodiments 1 and 4.

(18) Three laminated layers including the gate insulation layer GI, the second applied-type insulation layer OIL2 and the first applied-type insulation layer OIL1 are disposed between the two upper and lower transparent electrodes and both of the gate insulation layer GI and the second applied-type insulation layer OIL1 are removed selectively.

(19) Three laminated layers including the gate insulation layer GI, the second applied-type insulation layer OIL2 and the first applied-type insulation layer OIL1 are disposed between the two upper and lower transparent electrodes and the second applied-type insulation layer OIL1 is removed selectively.

(20) Three laminated layers including the gate insulation layer GI, the second applied-type insulation layer OIL2 and the first applied-type insulation layer OIL1 are disposed between the two upper and lower transparent electrodes and the gate insulation layer GI is removed selectively.

(21) Three laminated layers including the gate insulation layer GI, the second applied-type insulation layer OIL2 and the first applied-type insulation layer OIL1 are disposed between the two upper and lower transparent electrodes.

(22) Three laminated layers including the gate insulation layer GI, the surface protection layer PAS of the thin film transistor TFT and the second applied-type insulation layer OIL2 are disposed between the two upper and lower transparent electrodes and the gate insulation layer GI and the surface protection layer PAS of the thin film transistor are removed selectively.

(23) Three laminated layers including the gate insulation layer GI, the surface protection layer PAS of the thin film transistor TFT and the second applied-type insulation layer OIL2 are disposed between the two upper and lower transparent electrodes and the gate insulation layer GI is removed selectively.

(24) Three laminated layers including the gate insulation layer GI, the surface protection layer PAS of the thin film transistor TFT and the second applied-type insulation layer OIL2 are disposed between the two upper and lower transparent electrodes and the surface protection layer PAS of the thin film transistor is removed selectively.

(25) Three laminated layers including the surface protection layer PAS of the thin film transistor TFT, the second applied-type insulation layer OIL2. and the first applied-type insulation layer OIL1 are disposed between the two upper and lower transparent electrodes and both of the surface protection layer PAS of the thin film transistor TFT and the second applied-type insulation layer OIL1 are removed selectively.

(26) Three laminated layers including the surface protection layer PAS of the thin film transistor TFT, the second applied-type insulation layer OIL2 and the first applied-type insulation layer OIL1 are disposed between the two upper and lower transparent electrodes and the surface protection layer PAS of the thin film transistor TFT is removed selectively.

(27) Three laminated layers including the surface protection layer PAS of the thin film transistor TFT, the second applied-type insulation layer OIL2 and the first applied-type insulation layer OIL1 are disposed between the two upper and lower transparent electrodes and the second applied-type insulation layer OIL1 is removed selectively.

(28) Three laminated layers including the surface protection layer PAS of the thin film transistor TFT, the second applied-type insulation layer OIL2 and the first applied-type insulation layer OIL1 are disposed between the two upper and lower transparent electrodes.

(29) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the gate insulation layer GI, the surface protection layer PAS of the thin film transistor TFT and the second applied-type insulation layer OIL2 are removed selectively. This structure is that of the above embodiment 3.

(30) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the surface protection layer PAS of the thin film transistor TFT and the second applied-type insulation layer OIL2 are removed selectively.

(31) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the gate insulation layer GI and the second applied-type insulation layer OIL2 are removed selectively.

(32) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the gate insulation layer GI and the surface protection layer PAS of the thin film transistor TFT are removed selectively.

(33) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the second applied-type insulation layer OIL2 is removed selectively.

(34) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes and the surface protection layer PAS of the thin film transistor TFT is removed selectively.

(36) Four laminated layers including the gate insulation layer GI, the surface protection layer PAS of the thin film transistor TFT, the second applied-type insulation layer OIL2 and the first applied-type insulation layer OIL1 are disposed between the two upper and lower transparent electrodes.

In FIGS. 31 to 33, one of the upper and lower transparent electrodes is the pixel electrode PX and the other is the common signal electrode CE, while when the roles of the upper and lower transparent electrodes are reversed, the effects of the present invention are obtained. Further, the applied-type insulation layer OIL1 is disposed on the side nearer to the upper transparent electrode than the gate insulation layer GI and the surface protection layer PAS of the thin film transistor TFT between the two upper and lower transparent electrodes, while even if the applied-type insulation layer OIL1 may be disposed on the side nearer to the lower transparent electrode than the gate insulation layer GI and the surface protection layer PAS of the thin film transistor TFT, the same effects are also obtained. In this case, however, it is desirable that the applied-type insulation layer OIL1 does not exist in the area where the thin film transistor TFT is disposed for the purpose of the stability of operation and the reliability of the thin film transistor TFT.

Moreover, in FIGS. 31 to 33, there are the structures that the gate insulation layer GI is formed selectively and the surface protection layer PAS of the thin film transistor TFT is not formed selectively, while the structure can be realized by etching only the gate insulation layer GI after etching the semiconductor layer SI. However, one photolithographic process is increased in this case.

In addition, in the structures shown in FIGS. 31 to 33, by newly adding the insulation layer IL having the higher dielectric constant in the area which is positioned above the lower transparent electrode and where the upper transparent electrode does not exist as described in the embodiment 5, the driving voltage can be reduced irrespective of the dielectric constant of the liquid crystal layer LC.

In all the embodiments, there has been described the example in case where the transparent conductive layer structure of the present invention is applied to the liquid crystal display unit using the reverse-staggered type TFT as the switching element, while the present invention is not limited thereto and the present invention can be applied to that using a TFT having a different structure such as a normal-staggered type TFT or a coplanar type TFT.

Any one of the roles of the two upper and lower transparent electrodes is described in each embodiment, while it is needless to say that the same effects are obtained if one of the two upper and lower transparent electrodes is the common signal electrode CE and the other is the pixel electrode PX.

The metal layer constituting the scanning signal electrode GE and line GL, the image signal electrode SD and line DL, and the common signal line CL uses Cr by way of example, while the metal layer may be formed of, for example, metal having high melting point such as Cr, Mo, Ta, Ti, Nb and W formed by the spattering method or the evaporation method, or alloy or silicide of such metal, or Al or alloyed Al which is low-resistance wiring material, or a laminated layer of such material.

The amorphous silicon layer is used as the silicon layer constituting the electrode NSI made of semiconductor or silicon layer doped with impurity, while a polycrystal silicon layer crystallized by thermally treating or laser annealing amorphous silicon layer, for example, may be used.

The silicon nitride layer formed by the plasma CVD method or the spattering method, for example, is used as the gate insulation layer GI and the protection insulation layer, while the gate insulation layer GI and the protection insulation layer may be formed of insulation layer such as, for example, silicon oxide layer. The gate insulation layer GI may be formed of insulation layer obtained by oxidizing a part of a surface of metal constituting the scanning signal electrode GE and line.

The insulation layers between the two upper and lower transparent electrodes has a laminated structure including both of the gate insulation layer GI and the surface protection layer PAS of the thin film transistor TFT, although if any one or both of them do not exist, there is no problem.

ITO is used as the upper and lower transparent conductive layers, although any transparent conductive layer such as, for example, Indium Zinc Oxide (IZO) can be used to thereby obtain the same effects.

The structure having the curved portion provided in the upper transparent electrode described in the embodiment 4 is shown as the modified structure of that of the embodiment 1, while it is needless to say that the curved portion is disposed in the upper transparent electrode in the embodiments 2, 3 and 5 to thereby obtain the effects of the multi-domain system in addition to the respective effects of the embodiments 2, 3 and 5.

In the above embodiments, the common signal line CL uses metal wiring formed of the same material in the same process and in the same layer as the scanning signal electrode GE and line GL, while it is a matter of course that the common signal line CL may be formed of the same material in the same process and in the same layer as the image signal electrode SD and line DL and the transparent conductive layer constituting the common signal electrode CE may be extended as it is to form the common signal line CL.

According to the present invention, the liquid crystal display unit of the horizontal electric field system including the pixel electrode and the common signal electrode constituted by two transparent conductive layers disposed on the upper and lower sides so that the inter-layer insulation layer is disposed between the two transparent conductive layer comprises one inter-layer insulation layer newly disposed between the two upper and lower transparent electrodes and selectively formed in the area which is positioned above the lower transparent electrode and where the upper transparent electrode exists and accordingly the writing time to the liquid crystal can be reduced. Further, the inter-layer insulation layer disposed in the related art structure can be selectively removed in the area which is positioned above the lower transparent electrode and where the upper transparent electrode does not exist to thereby reduce the driving voltage of the liquid crystal.

In addition, the structure having two combined effects can realize both of reduced writing time and reduced driving voltage to the liquid crystal. Further, in the structure of the present invention, by constituting the newly added insulation layer by the applied-type insulation layer, when the upper transparent electrode is etched, defective portions of the insulation layer can be embedded and coated, so that corrosion, disconnection and the like suffered by the lower transparent electrode, electrodes and wiring made of metal can be reduced and insulation defect between the two upper and lower transparent electrodes can be reduced, so that the liquid crystal display unit having high transmission factor and high performance can be fabricated with large yield.

Industrial Applicability

As described above, according to the present invention, it is useful to provide the liquid crystal display unit having the structure capable of being fabricated with large yield.

What is claimed is:

1. A liquid crystal display unit including a pair of substrates, a liquid crystal layer disposed between said pair of substrates, a plurality of scanning signal lines, a plurality of image signal lines intersecting said plurality of scanning signal lines in matrix manner and a plurality of thin film transistors each formed in the vicinity of each intersection between said scanning signal lines and said image signal lines disposed on one of said substrates, a plurality of pixels at least one of which is formed in each area enclosed by said plurality of scanning signal lines and image signal lines and each of which includes a common signal electrode connected across a plurality of pixels and a pixel electrode connected to said thin film transistor corresponding thereto, said common signal electrode and said pixel electrode partially overlapping each other through an inter-layer insulation layer, at least part of each of said pixel electrode and said common signal electrode being constituted by a transparent conductive layer, one of said pixel electrode and said common signal electrode disposed on the side of said liquid crystal layer through an insulation layer being formed into slits or teeth of a comb, wherein at least one of insulation layers included in said inter-layer insulation layer is selectively formed in an area which is positioned above one of said pixel electrode and said common electrode which is disposed nearer to said one of substrates with said insulation layer therebetween and where said pixel electrode or said common electrode disposed above does not exist; and wherein a liquid crystal having $\Delta\epsilon$ of a negative value is used as said liquid crystal layer and when $$\frac{1}{\sum_{k=1}^{n} \frac{d_k}{\epsilon_k}}$$

is $S_A$ where the number of insulation layers included in said inter-layer insulation layer is n and a dielectric constant of a k-th insulation layer is $\epsilon_k$, a thickness thereof being $d_k$, and $$\frac{1}{\left(\sum_{i=1}^{m} \frac{d_1}{\epsilon_1}\right) + \frac{\sum_{k=1}^{n} d_k - \sum_{i=1}^{m} d_1}{\epsilon_{LC}}}$$

(where $m \geq 1$) is $S_B$ where the number of insulation layers disposed between a first orientation layer disposed above a first substrate and a first electrode of said pixel electrode and said common electrode, nearer to said first substrate through insulation layers in an area which is positioned above said first electrode and where a second electrode does not exist is m and a dielectric constant of an insulation layer constituting a first layer is $\epsilon_1$, a thickness thereof being $d_1$, a dielectric constant of a liquid crystal in a vertical direction to a director of the liquid crystal being $\epsilon_{LC}$, $S_A < S_B$ is satisfied.

2. A liquid crystal display unit according to claim 1, wherein when $$\frac{1}{\sum_{k=1}^{n} \frac{d_k}{\epsilon_k}}$$

is $S_A$ where any insulation layer does not exist between said first orientation layer disposed above said first substrate and said first electrode in the area which is positioned above said first electrode of said pixel electrode and said common electrode nearer to said first substrate through the insulation layers and where said second electrode does not exist and the number of insulation layers included said inter-layer insulation layer is n, a dielectric constant of said k-th insulation layer being $\epsilon_k$, a thickness thereof being $d_k$ and $$\frac{\epsilon_{LC}}{\sum_{k=1}^{n} d_k}$$

is $S_B$ where a dielectric constant of the liquid crystal in the vertical direction to the director of the liquid crystal $\epsilon_{LC}$, $S_A < S_B$ is satisfied.

3. A liquid crystal display unit including a pair of substrates, a liquid crystal layer disposed between said pair of substrates, a plurality of scanning signal lines, a plurality of image signal lines intersecting said plurality of scanning signal lines in matrix manner and a plurality of thin film transistors each formed in the vicinity of each intersection between said scanning signal lines and said image signal lines disposed on one of said substrates, a plurality of pixels at least one of which is formed in each area enclosed by said plurality of scanning signal lines and image signal lines and each of which includes a common signal electrode connected across a plurality of pixels and a pixel electrode connected to said thin film transistor corresponding thereto, said common signal electrode and said pixel electrode partially overlapping each other through an inter-layer insulation layer, at least part of each of said pixel electrode and said common signal electrode being constituted by a transparent conductive layer, one of said pixel electrode and said common signal electrode disposed on the side of said liquid crystal layer through an insulation layer being formed into slits or teeth of a comb, wherein at least one of insulation layers included in said inter-layer insulation layer is selectively formed in an area which is positioned above one of said pixel electrode and said common electrode which is disposed nearer to said one of substrates with said insulation layer therebetween and where said pixel electrode or said common electrode disposed above does not exist; and wherein a liquid crystal having $\Delta \in$ of a positive value is used as said liquid crystal layer and when $$\frac{1}{\sum_{k=l}^{n} \frac{d_k}{\varepsilon_k}}$$

is $S_A$ where the number of insulation layers included in said inter-layer insulation layer is n and a dielectric constant of a k-th insulation layer is $\in_k$, a thickness thereof being $d_k$, and $$\frac{1}{\left(\sum_{i=l}^{m} \frac{d_i}{\varepsilon_i}\right) + \frac{\sum_{k=l}^{n} d_k - \sum_{i=l}^{m} d_i}{\varepsilon_{LC}}}$$

(where m≧1) is $S_B$ where the number of insulation layers disposed between a first orientation layer disposed above a first substrate and a first electrode of said pixel electrode and said common electrode, nearer to said first substrate through insulation layers in an area which is positioned above said first electrode and where a second electrode does not exist is m and a dielectric constant of an insulation layer constituting a first layer is $\in_1$, a thickness thereof being $d_1$, a dielectric constant of a liquid crystal in the parallel direction to a director of the liquid crystal being $\in_{LC}$, $S_A < S_B$ is satisfied.

4. A liquid crystal display unit according to claim 1, wherein when $$\frac{1}{\sum_{k=1}^{n} \frac{d_k}{\varepsilon_k}}$$

is $S_A$ where any insulation layer does not exist between said first orientation layer disposed above said first substrate and said first electrode in the area which is positioned above said first electrode of said pixel electrode and said common electrode nearer to said first substrate through the insulation layers and where said second electrode does not exist and the number of insulation layers included said inter-layer insulation layer is n, a dielectric constant of said k-th insulation layer being $\in_k$, a thickness thereof being $d_k$ and $$\frac{\varepsilon_{LC}}{\sum_{k=1}^{n} d_k}$$

is $S_B$ where a dielectric constant of the liquid crystal in the parallel direction to the director of the liquid crystal being $\in_{LC}$, $S_A < S_B$ is satisfied.

5. A liquid crystal display unit according to any of claims 1 to 4, wherein at least one of the number of layers, a thickness of material forming the layers and a dielectric constant of the material forming the layers is different among said inter-layer insulation layer and insulation layers disposed between said first orientation layer formed above said first substrate and said first electrode in the area which is positioned above said first electrode and where said second electrode does not exist.

6. A liquid crystal display unit according to any of claims 1–4, wherein said inter-layer insulation layer is constituted by a single layer and said single layer is selectively formed in conformity with a shape of said second electrode in a part of an area where said second electrode is disposed rather than the area which is positioned above said first electrode and where said second electrode does not exist.

7. A liquid crystal display unit according to claim 6, wherein said inter-layer insulation layer is a part of a first insulation layer having function of a gate insulation layer of said thin film transistor or a part of a second insulation layer having function of a surface protection layer of said thin film transistor.

8. A liquid crystal display unit according to claim 6, wherein said inter-layer insulation layer is a third insulation layer other than a first insulation layer having function of a gate insulation layer of said thin film transistor or a second insulation layer having function of a surface protection layer of said thin film transistor.

9. A liquid crystal display layer according to any of claims 1–4, wherein said inter-layer insulation layer is constituted by two layers and at least one layer thereof is selectively formed in conformity with a shape of said second electrode in a part of an area where said second electrode is disposed rather than the area which is positioned above said first electrode and where said second electrode does not exist.

10. A liquid crystal display layer according to claim 9, wherein said inter-layer insulation layer is constituted by two layers including a part of a first insulation layer having function of a gate insulation layer of said thin film transistor and a part of a second insulation layer having function of a surface protection layer of said thin film transistor.

11. A liquid crystal display unit according to claim 9, wherein one layer of said inter-layer insulation layers is a part of a first insulation layer having function of a gate insulation layer of said thin film transistor or a part of a second insulation layer having function of a surface protection layer of said thin film transistor and the other is a third insulation layer other than said first and second insulation layers, which is selectively formed in conformity with the shape of said second electrode in the part of the area where said second electrode is disposed rather than the area which is positioned above said first electrode and where said second electrode does not exist.

12. A liquid crystal display unit according to claim 9, wherein one layer of said inter-layer insulation layers is any of a part of a first insulation layer having function of a gate insulation layer of said thin film transistor or a part of a second insulation layer having function of a surface protection layer of said thin film transistor and the other is a fourth insulation layer other than said first and second insulation layers, which is formed in a part of an area except an area for forming a through-hole for connecting said second electrode to other electrode wiring and an area for exposing a terminal.

13. A liquid crystal display unit according to claim 9, wherein said inter-layer insulation layer is constituted by a laminated layer including a third insulation layer other than a first insulation layer having function of a gate insulation layer of said thin film transistor or a second insulation layer having function of a surface protection layer of said thin film transistor, which is selectively formed in conformity with the shape of said second electrode in the part of the area where said second electrode is disposed rather than the area which is positioned above said first electrode and where said second electrode does not exist, and a fourth insulation layer formed in a part of an area except an area for forming a through-hole for connecting said second electrode to other electrode wiring and an area for exposing a terminal.

14. A liquid crystal display unit according to any of claims 1–4, wherein said inter-layer insulation layer is constituted by three or more layers and at least one layer thereof is selectively formed in conformity with a shape of said second electrode in a part of an area where said second electrode is disposed rather than the area which is positioned above said first electrode and where said second electrode does not exist.

15. A liquid crystal display unit according to claim 14, wherein said inter-layer insulation layer includes a part of a first insulation layer having function of a gate insulation layer of said thin film transistor, a part of a second insulation layer having function of a surface protection layer of said thin film transistor, and all of a third insulation layer except said first and second insulation layers, which is selectively formed in conformity with the shape of said second electrode in a part of an area which is positioned above said first electrode and where said second electrode is disposed.

16. A liquid crystal display unit according to claim 14, wherein said inter-layer insulation layer includes a part of a first insulation layer having function of a gate insulation layer of said thin film transistor, a part of a second insulation layer having function of a surface protection layer of said thin film transistor, and all of a fourth electrode except said first and second electrodes, which is formed in a part of an area except an area for forming a through-hole for connecting said second electrode to other electrode wiring and an area for exposing a terminal.

17. A liquid crystal display unit according to claim 14, wherein said inter-layer insulation layer includes at least any one of a part of a first insulation layer having function of a gate insulation layer of said thin film transistor and a part of a second insulation layer having function of a surface protection layer of the thin film transistor, a third insulation layer except said first and second insulation layers, which is selectively formed in conformity with a shape of said second electrode in a part of an area which is positioned above said first electrode and where said second electrode is disposed, and a fourth insulation layer formed in a part of an area except an area for forming a through-hole for connecting said second electrode to other electrode wiring and an area for forming a terminal.

18. A liquid crystal display unit according to any of claims 1–4, wherein when a width of a pattern of said insulation layer selective formed in conformity with said second shape in a part of the area where said second electrode is disposed rather than the area which is positioned above said first electrode and where said second electrode does not exist is $W_{ISO}$ ($\mu$m) and a width of said second electrode and a space between said second electrodes formed into slits or teeth of a comb are $W_{EL}$ ($\mu$m) and $W_{SP}$ ($\mu$m), respectively, $$W_{ISO} \leq W_{EL} \leq W_{ISO}+2$$

$$W_{ISO} > 0$$

$$W_{ISO} < W_{EL}+W_{SP}$$

are satisfied.

19. A liquid crystal display unit according to claim 17, wherein said third and fourth insulation layers are constituted by applied-type insulation layers.

20. A liquid crystal display unit according to claim 19, wherein said applied-type insulation layer is formed by means of printing, spin coat or the like and more particularly said applied-type insulation layer is an insulation layer made of organic resin or Si.

21. A liquid crystal display unit according to claim 19, wherein said applied-type insulation layer used as said third insulation layer is of photo-image type.

22. A liquid crystal display unit according to claim 19, wherein said third insulation layer is processed in self-alignment with said second electrode collectively, so that said first area is formed in said second area selectively.

23. A liquid crystal display unit according to claim 19, wherein a thickness of said third insulation layer is 0.2 $\mu$m to 4.0 $\mu$m.

24. A liquid crystal display unit according to claim 19, wherein a dielectric constant of said third insulation layer is 1.5 to 6.5.

25. A liquid crystal display unit according to claim 19, wherein a thickness of said applied-type insulation layer used as said fourth insulation layer is 0.1 $\mu$m to 2 $\mu$m.

26. A liquid crystal display unit according to claim 17, wherein when a fifth insulation layer having a dielectric constant equal to or larger than 7.0 is selectively formed in a first area which is positioned above said first electrode and where said second electrode does not exist and a thickness of a fifth insulation layer is $D_A$, a total thickness of insulation layers disposed between a first orientation layer disposed above said first substrate and said first electrode in an area which is positioned above said first electrode and where said second electrode does not exist being $D_B$, a thickness of said inter-layer insulation layer being $D_C$, a thickness of said second electrode being $D_D$, $D_A+D_B \leq D_C+D_D$ is satisfied.

* * * * *